United States Patent
Bennett et al.

(10) Patent No.: US 12,488,884 B2
(45) Date of Patent: Dec. 2, 2025

(54) ARTIFICIAL INTELLIGENCE-BASED MEDICAL PATIENT SERVICE SYSTEM AND ECOSYSTEM

(71) Applicant: Helen Now, LLC, Grand Rapids, MI (US)

(72) Inventors: Jeffrey T. Bennett, Grand Rapids, MI (US); Mahmoud Bdeir, Livonia, MI (US); Michael Ranville, Grand Rapids, MI (US)

(73) Assignee: Helen Now, LLC, Grand Rapids, MI (US)

( * ) Notice: Subject to any disclaimer, the term of this patent is extended or adjusted under 35 U.S.C. 154(b) by 0 days.

(21) Appl. No.: 18/760,770

(22) Filed: Jul. 1, 2024

(65) Prior Publication Data
US 2025/0054612 A1    Feb. 13, 2025

Related U.S. Application Data

(60) Provisional application No. 63/518,098, filed on Aug. 7, 2023.

(51) Int. Cl.
*G16H 40/20*   (2018.01)
(52) U.S. Cl.
CPC .................. *G16H 40/20* (2018.01)
(58) Field of Classification Search
CPC .................................................. G16H 40/20
See application file for complete search history.

(56) References Cited

U.S. PATENT DOCUMENTS

| | | |
|---|---|---|
| 7,263,669 B2 | 8/2007 | Denholm |
| 7,945,457 B2 | 5/2011 | Zaleski |
| 8,183,987 B2 | 5/2012 | Traughber et al. |
| 9,185,202 B2 | 11/2015 | Herbst et al. |
| 9,934,427 B2 | 4/2018 | Derenne et al. |
| 10,643,749 B1 | 5/2020 | Warner et al. |
| 11,062,707 B2 | 7/2021 | Judy et al. |
| 11,264,128 B2 | 3/2022 | Brown et al. |
| 11,398,305 B2 | 7/2022 | Girardeau et al. |
| 11,410,096 B2 | 8/2022 | Perry et al. |
| 11,482,323 B2 | 10/2022 | Srivathsa et al. |

(Continued)

FOREIGN PATENT DOCUMENTS

WO    2023018390 A1    2/2023
WO    WO-2023186571 A1 * 10/2023

*Primary Examiner* — Fonya M Long
*Assistant Examiner* — Anthony Balaj
(74) *Attorney, Agent, or Firm* — NEO IP

(57) ABSTRACT

A system for managing requests and workflows for patients in a medical facility includes receiving requests from different patients through voice commands or through selection via a computer application. An artificial intelligence module automatically interprets the requests from each patient and routes the requests to appropriate personnel depending on the contents of the request. The system is able to utilize profiles of support team members in the medical facility noting particularly talent, expertise, and time for each support team member in order to route requests and build teams for particular purposes. The system is also able to include a financial incentive system for encouraging personnel to complete particular requests for patients and includes gamification elements including leaderboard functionality.

15 Claims, 25 Drawing Sheets

(56) References Cited

U.S. PATENT DOCUMENTS

| | | | |
|---|---|---|---|
| 11,540,801 B2 | 1/2023 | Wu et al. | |
| 11,929,166 B2 | 3/2024 | Bechtel et al. | |
| 2011/0010197 A1* | 1/2011 | Schoenberg | G06Q 10/10 |
| | | | 715/708 |
| 2012/0140068 A1* | 6/2012 | Monroe | H04N 7/183 |
| | | | 348/143 |
| 2013/0267873 A1 | 10/2013 | Fuchs | |
| 2014/0365258 A1* | 12/2014 | Vestal | G06Q 10/063114 |
| | | | 901/1 |
| 2016/0027289 A1 | 1/2016 | Hargis | |
| 2018/0268346 A1* | 9/2018 | Cronin | G06Q 10/063116 |
| 2019/0108909 A1* | 4/2019 | Lee | G01C 21/3484 |
| 2021/0193302 A1* | 6/2021 | Day | G06Q 10/0631 |
| 2021/0241890 A1* | 8/2021 | Tsuria | G16H 40/20 |
| 2021/0280286 A1* | 9/2021 | Ravindranathan | |
| | | | A61N 1/36021 |
| 2021/0280303 A1* | 9/2021 | Olson | H04W 4/029 |
| 2022/0386270 A1* | 12/2022 | Suresh | G01S 5/08 |
| 2023/0031071 A1* | 2/2023 | Carr | G16H 80/00 |
| 2023/0045394 A1* | 2/2023 | Toleti | G16H 50/70 |
| 2023/0062727 A1 | 3/2023 | Etchison et al. | |
| 2024/0232942 A1* | 7/2024 | Burris, Jr. | G06Q 30/0254 |

\* cited by examiner

PRIOR ART FIG. 1

Commands List

| Icon | Command | Description | Service Type | Max Resps | Actors | Enabled Command | Edit |
|---|---|---|---|---|---|---|---|
| | 1:1 feeds | 1:1 feeds | Service Request | 0 | Nurse | | ✎ |
| | 1860 Mask | 1860 Mask | Item Delivery | 1 | Nurse | | ✎ |
| | 1860s Mask | 1860s Mask | Item Delivery | 1 | Nurse | | ✎ |
| | Abdominal Pad | 9x10 white and blue disposable gauze pad | Item Delivery | 2 | Patient, Nurse | | ✎ |
| | ACT Machine | ACT Machine | Service Request | 1 | Nurse | | ✎ |
| | Adjust bed to low | Adjust my bed to low | Service Request | 1 | Patient, Nurse | | ✎ |
| | Adjust room temperature | Adjust my room temperature | Service Request | 1 | Patient, Nurse | | ✎ |
| | Admit Patient and Open Room 65 | Admit Patient and Open Room 65 | Item Delivery | 1 | Nurse | | ✎ |
| | Alcohol swabs | Change and white rectangular 2-ply alcohol prep pad | Item Delivery | 2 | Nurse | | ✎ |
| | Abs Education Packet | Abs Education Packet | Item Delivery | 1 | Nurse | | ✎ |

FIG. 18

Open Room

| Command | qty | | | |
|---|---|---|---|---|
| Scan room to confirm clea... | 1 | 🗑 | ↑ | ↓ |
| Remove non standard equi... | 1 | 🗑 | ↑ | ↓ |
| Ensure standard equipmen... | 1 | 🗑 | ↑ | ↓ |
| Lower bedside table | 1 | 🗑 | ↑ | ↓ |
| Place welcome bin on bed... | 1 | 🗑 | ↑ | ↓ |
| Sheets - Top sheets | 1 | 🗑 | ↑ | ↓ |
| Sheets – Small Comfort Gl... | 1 | 🗑 | ↑ | ↓ |

1-7 of 12   <   >

ADD SUB COMMAND     CLOSE   SAVE

FIG. 19

ARTIFICIAL INTELLIGENCE-BASED MEDICAL PATIENT SERVICE SYSTEM AND ECOSYSTEM

CROSS REFERENCES TO RELATED APPLICATIONS

This application is related to and claims priority from the following U.S. patents and patent applications. This application claims priority to and the benefit of U.S. Application No. 63/518,098, filed Aug. 7, 2023, which is incorporated herein by reference in its entirety.

BACKGROUND OF THE INVENTION

1. Field of the Invention

The present invention relates to medical facility request management systems, and more specifically to artificial intelligence-based request management systems for efficiently allocating personnel to requests.

2. Description of the Prior Art

It is generally known in the prior art to provide patient request systems, especially those using simple indication systems that a patient needs some sort of assistance.

Prior art patent documents include the following:

U.S. Pat. No. 11,929,166 for Managing patient requests for assistance in a healthcare facility by inventors Bechtel et al., filed Aug. 26, 2019 and issued Mar. 12, 2024, discloses systems and methods for managing patient assistance requests in a healthcare facility, documenting items (e.g., minor, routine, and/or frequently-performed items) in association with a patient's records in an Electronic Healthcare Information System, and cancelling patient requests for assistance. Indications that requests for assistance have been received and/or are being addressed by an appropriate healthcare team member may be audibly output from a speaker associated with a personal assistant device. Healthcare team members may verbally provide items for documentation in association with a patient's medical records, the items for documentation being received by a listening component of a personal assistant device and transmitted to an EHIS for documentation. Healthcare team members may verbally cancel patient requests for assistance upon the healthcare team member addressing the request and, in some instances, verification of the healthcare team member as an approved source for documenting the item(s) in association with the patient.

U.S. Pat. No. 11,398,305 for Patient request system and method by inventors Girardeau et al., filed Apr. 24, 2020 and issued Jul. 26, 2022, discloses a patient request system including a tablet computer that configured for entry of patient requests. The tablet computer is configured to display a first menu corresponding to basic request categories for a patient. The tablet computer is configured to display a second menu that corresponds to specific patient requests falling under the basic request category selected by the patient using the first menu. A server is configured to receive a specific patient request made by the patient. A notification device is configured to display the specific patient request to a caregiver. A patient request method is also disclosed.

US Patent Pub. No. 2023/0062727 for Patient request system having patient falls risk notification and caregiver notes access by inventors Etchison et al., filed Jul. 15, 2022 and published Mar. 2, 2023, discloses a patient request system including a tablet computer configured for entry of patient requests. The tablet computer is configured to display a first menu corresponding to basic request categories for a patient. The tablet computer is configured to display a second menu that corresponds to specific patient requests falling under the basic request category selected by the patient using the first menu. A server is configured to receive a specific patient request made by the patient. A notification device is configured to display the specific patient request to a caregiver. A patient request method is also disclosed.

U.S. Pat. No. 8,183,987 for Method and system for advanced patient communication by inventors Traughber et al., filed Jul. 17, 2007 and issued May 22, 2012, discloses a method and system for advanced patient communication. According to one embodiment, a computer-implemented method comprises providing a patient communication device through which a patient communicates a first message from a hospital bed. The first message is received at a central processing server. The first message is processed to identify an urgency level of the message. One or more additional messages are generated based on the first message. The one or more additional messages are transmitted to specific health care provider devices of specific health care providers who are expected to respond to the patient.

U.S. Pat. No. 11,062,707 for Voice recognition for patient care environment by inventors Judy et al., filed Jun. 11, 2019 and issued Jul. 13, 2021, discloses a location monitoring system tracking a location of a user within a healthcare facility. When the user is detected in a patient room an electronic controller activates a voice command database having a plurality of voice commands specific to the user. A microphone located in the patient room receives one of the plurality of voice commands. The electronic controller transmits the one of the plurality of voice commands to a remote device positioned outside of the patient room.

U.S. Pat. No. 7,263,669 for Patient communication method and system by inventor Denholm, filed Nov. 8, 2002 and issued Aug. 28, 2007, discloses a healthcare communication system including a patient terminal having a keyboard unit with message keys for transmitting different ones of one or more programmed messages, and alphanumeric keys for composing messages. The patient terminal can be communicatively linked to a patient terminal display for presenting the programmed messages and composed messages. Each of the message keys can include identifying indicia associated with a programmed message transmitted upon selection of the message key. The patient terminal keyboard also can include one or more destination keys for specifying one of multiple destination addresses within the healthcare communication system for delivering individual ones of the messages.

US Patent Pub. No. 2016/0027289 for Communication system by inventor Hargis, filed Jul. 23, 2014 and published Jan. 28, 2016, discloses a communication system permitting communication between hospital staff and a patient, while allowing for communication between at least two staff members and the patient, and permitting efficient determination of the type and urgency of the service needed by the patient.

U.S. Pat. No. 9,185,202 for Alert management utilizing mobile devices by inventors Herbst et al., filed Dec. 31, 2012 and issued Nov. 10, 2015, discloses methods, computer systems, and computer-storage medium for managing patient alerts using a mobile device. A mobile device associated with a patient caregiver receives a critical alert related to the patient, and the alert is presented on the mobile device. The alert includes important contextual information that enables the caregiver to make a quick assessment of how to effectively address the alert. The alert includes options for accepting the alert or rejecting the alert. Acceptance of the alert enables the caregiver to communicate the alert to selected caregivers that can assist in managing the alert. Rejecting the alert causes the alert to be automatically communicated to additional caregivers associated with patient.

WIPO Patent Publication No. 2023/018390 for Patient request system and method by inventor Kaya, filed Nov. 9, 2021 and published Feb. 16, 2023, discloses a system that enables the detailed determination of the needs of patients in clinical/hospital environments and the appointment of appropriate HCPs according to the request characterized in that it comprises a mobile device containing an interface that enables the user to create a request alarm by determining the request type and details for the service they need, a server that comprises a database that contains the records of all HCPs working at the relevant healthcare institution, receives the request, which is created on the said interface, incoming from the user device, assigns the HCPs by determining the appropriate HCPs according to the request type, informs the HCPs that it assigns, records the requests created by the users, and reports the data that it has and records with machine learning algorithms by analyzing them.

US Patent Pub. No. 2012/0140068 for Medical Situational Awareness System by inventors Monroe et al., filed Jun. 3, 2011 and published Jun. 7, 2012, discloses a visual condition of a patient being monitored by defining an authorized patient zone, placing a video camera in a location to capture a visual image of the patient zone, defining a base visual image of the patient zone, monitoring the visual image at a remote location, identifying any change in the captured image from the base visual image, and generating an alert in the event a change is detected. Certain changes in the zone may occur without generating an alert. Authorized personnel may enter and leave the zone without generating an alert. In a typical application the system for practicing the method is networked based for providing medical appliance data directly to key personnel at a standard computer station. The system also includes video monitoring in real-time or near real-time, providing visual as well as technical monitoring of the patient wherever he is located. In one aspect of the invention, the system is IP based, permitting access to the information anywhere on the World Wide Web.

U.S. Pat. No. 7,945,457 for Distributed system for monitoring patient video, audio and medical parameter data by inventor Zaleski, filed Apr. 4, 2008 and issued May 17, 2011, discloses a distributed patient monitoring system visually monitoring patients and patient parameters using multiple portable processing devices. The system includes an authentication processor enabling a user to obtain access authorization to access patient data. A clinical application display image identifies multiple different patients in corresponding multiple different locations and enables a user to select a particular patient. A data processor uses access information in acquiring live video and vital sign parameters of the particular patient from a room associated with the particular patient. A display processor initiates generation of data representing an image sequence comprising a composite image including a first area showing acquired live video of the particular patient and a second area presenting acquired vital sign parameters of the particular patient using the clinical application display image.

US Patent Pub. No. 2013/0267873 for Systems and methods for monitoring patients with real-time video by inventor Fuchs., filed Apr. 10, 2012 and published Oct. 10, 2013, discloses a method and system for monitoring remotely located patients that includes real-time video of the remotely located patients. The method and system may be implemented as part of a central nursing station, a remote ICU, or a remote patient monitor. The method and system may also allow for real-time audio communication with the remotely located patients. The real-time video and real-time audio may permit improved response to alarms by allowing medical practitioners to reduce the rate of false-positive and false-negative alarms. Further, the real-time video and real-time audio may be used to generate additional alarm criteria. A camera for generating the real-time video may be part of a patient monitor or may be a separate system. Settings for the camera may be controlled from remotely.

U.S. Pat. No. 11,540,801 for Automating a medical environment by inventors Wu et al., filed Oct. 27, 2020 and issued Jan. 3, 2023, discloses systems, methods and instrumentalities for automating a medical environment. The automation may be realized using one or more sensing devices and at least one processing device. The sensing devices may be configured to capture images of the medical environment and provide the images to the processing device. The processing device may determine characteristics of the medical environment based on the images and automate one or more aspects of the operations in the medical environment. These characteristics may include, e.g., people and/or objects present in the images and respective locations of the people and/or objects in the medical environment. The operations that may be automated may include, e.g., maneuvering and/or positioning a medical device based on the location of a patient, determining and/or adjusting the parameters of a medical device, managing a workflow, providing instructions and/or alerts to a patient or a physician, etc.

U.S. Pat. No. 9,934,427 for Video monitoring system by inventors Derenne et al., filed Dec. 22, 2014 and issued Apr. 3, 2018, discloses a monitoring system including cameras adapted to capture images and depth data of the images. A computer device processes the image signals and depth data from the cameras according to various software modules that monitor one or more of the following: (a) compliance with patient care protocols; (b) patient activity; (c) equipment usage; (d) the location and/or usage of assets; (e) patient visitation metrics; (f) data from other sensors that is integrated with the image and depth data; (g) gestures by the patient or caregivers that are used as signals or for controls of equipment, and other items. Alerts may be issued if any conditions of importance are detected.

U.S. Pat. No. 11,264,128 for Machine-learning framework for coordinating and optimizing healthcare resource utilization and delivery of healthcare services across an integrated healthcare system by inventors Brown et al., filed Jun. 28, 2019 and issued Mar. 1, 2022, discloses optimizing operations of an integrated healthcare system in real-time using a machine learning framework. In one embodiment, a method comprises monitoring, by a system operatively coupled to a processor, activity of healthcare workers of a healthcare system over a defined timeframe in association with operation of the healthcare system, including monitoring performance of healthcare tasks scheduled for performance over the defined timeframe. The method further comprises determining, by the system based on the monitoring, a timeslot within the defined timeframe in which a healthcare worker of the healthcare workers is not performing, anticipated to perform, or scheduled to perform a healthcare task of the healthcare tasks, and determining, by the system, a supplemental healthcare task for performance by the healthcare worker during the timeslot.

U.S. Pat. No. 10,643,749 for Computer network architecture with machine learning and artificial intelligence and automated insight generation by inventors Warner et al., filed Sep. 30, 2019 and issued May 5, 2020, discloses computer network architectures for machine learning, artificial intelligence, and automated insight generation. Embodiments of computer network architecture automatically identify, measure, and generate insight reports of underperformance and over performance in healthcare practices. Embodiments may generate the insight reports of performance either occasionally on demand, or periodically, or as triggered by events such as an update of available data. Embodiments may include a combination of system databases with data provided by system users, and third-party databases to generate the insight reports, including social media data, financial data, socio-economic data, medical data, search engine data, e-commerce site data, and other databases.

U.S. Pat. No. 11,410,096 for Systems and methods for automated task scheduling and management by inventors Perry et al., filed Mar. 18, 2019 and issued Aug. 9, 2022, discloses computer-implemented systems and methods for automated task scheduling and management. In some embodiments, a system for automated task scheduling may comprise at least one processor configured to receive a request with information for a task to be performed by a respondent. The one or more processors may retrieve employee information and, based on one or more attributes in the employee information and one or more attributes in the task information, identify one or more employees to complete the task. The one or more processors may assign the task to the identified employee(s), and monitor a status of the task based on periodic inputs from the employee.

U.S. Pat. No. 11,482,323 for Enhancing patient care via a structured methodology for workflow stratification by inventors Srivathsa et al., filed Oct. 1, 2019 and issued Oct. 25, 2022, discloses a system, device and method for modifying workflows in a hospital environment. The system includes a workflow stratification server configured to receive and analyze event messages from a nurse call system and interface devices. The workflow stratification server determines a current state of the hospital environment and relevant applicable conditions for each event message identified as a trigger event. That way, the workflow stratification server prioritizes the trigger events and provides responses to the trigger events in a manner that takes into account resources in the hospital environment.

SUMMARY OF THE INVENTION

The present invention relates to medical facility request management systems, and more specifically to artificial intelligence-based request management systems for efficiently allocating personnel to requests.

It is an object of this invention to provide a system using artificial intelligence to more efficiently utilize the time of nurses and other personnel in a medical facility by ensuring that nurses are called primarily for medical-related issues, while other requests are routed to other facility personnel who are capable of addressing the issues.

In one embodiment, the present invention includes a system for managing requests and workflows to serve patients in a medical facility, including at least one server in network communication with at least one support team device, at least one provider team device, at least one administrative team device, at least one family member device, and/or at least one patient device, wherein the at least one server is operable to receive one or more requests from the at least one patient device, the at least one administrative team device, the at least one provider team device, the at least one family member device, the at least one support team device, and/or from an artificial intelligence-based algorithm that predicts patient needs and/or creates routine care-maintenance requests implementing medical facility patient care policy, wherein an artificial intelligence module of the at least one server analyzes the one or more requests from the at least one patient device, the at least one administrative team device, the at least one provider team device, the at least one family member device, the at least one support team device, and/or the artificial intelligence-based algorithm and determines to which of the at least one support team device to send the one or more requests, and wherein the at least one support team device to which the one or more requests are sent is based, at least in part, on a location, urgencies of the one or more requests, types of the one or more requests, and/or a sender of the one or more requests.

In another embodiment, the present invention includes a system for managing requests and workflows to serve patients in a medical facility, including at least one server in network communication with at least one support team device and at least one patient device, wherein the at least one server is operable to receive one or more requests from the at least one patient device, wherein the at least one server automatically analyzes the one or more requests from the at least one patient device and determines one or more devices of the at least one support team device to send the one or more requests, and wherein the one or more devices of the at least one support team device to which the one or more requests are sent are determined based on a location of the one or more devices of the at least one support team device relative to the at least one patient device and/or based on a number of recent requests already accepted by the one or more devices of the at least one support team device.

In yet another embodiment, the present invention includes a system for managing requests and workflows to serve patients in a medical facility, including at least one server in network communication with at least one support team device and at least one provider team device, wherein the at least one server is operable to receive one or more requests from the at least one provider team device, wherein an artificial intelligence module of the at least one server automatically analyzes the one or more requests from the at least one provider team device and determines to which of the at least one support team device to send the one or more requests, and wherein the at least one support team device to which the one or more requests are sent is based on a location of the at least one support team device relative to at least one patient device, and/or based on a number of recent requests already accepted by the at least one support team device.

These and other aspects of the present invention will become apparent to those skilled in the art after a reading of the following description of the preferred embodiment when considered with the drawings, as they support the claimed invention.

BRIEF DESCRIPTION OF THE DRAWINGS

PRIOR ART

FIG. 18 is a graphical user interface including a list of commands generated for a particular environment according to one embodiment of the present invention.

FIG. 19 is a graphical user interface for managing a bundled command for a single room according to one embodiment of the present invention.

DETAILED DESCRIPTION

Figure 1:
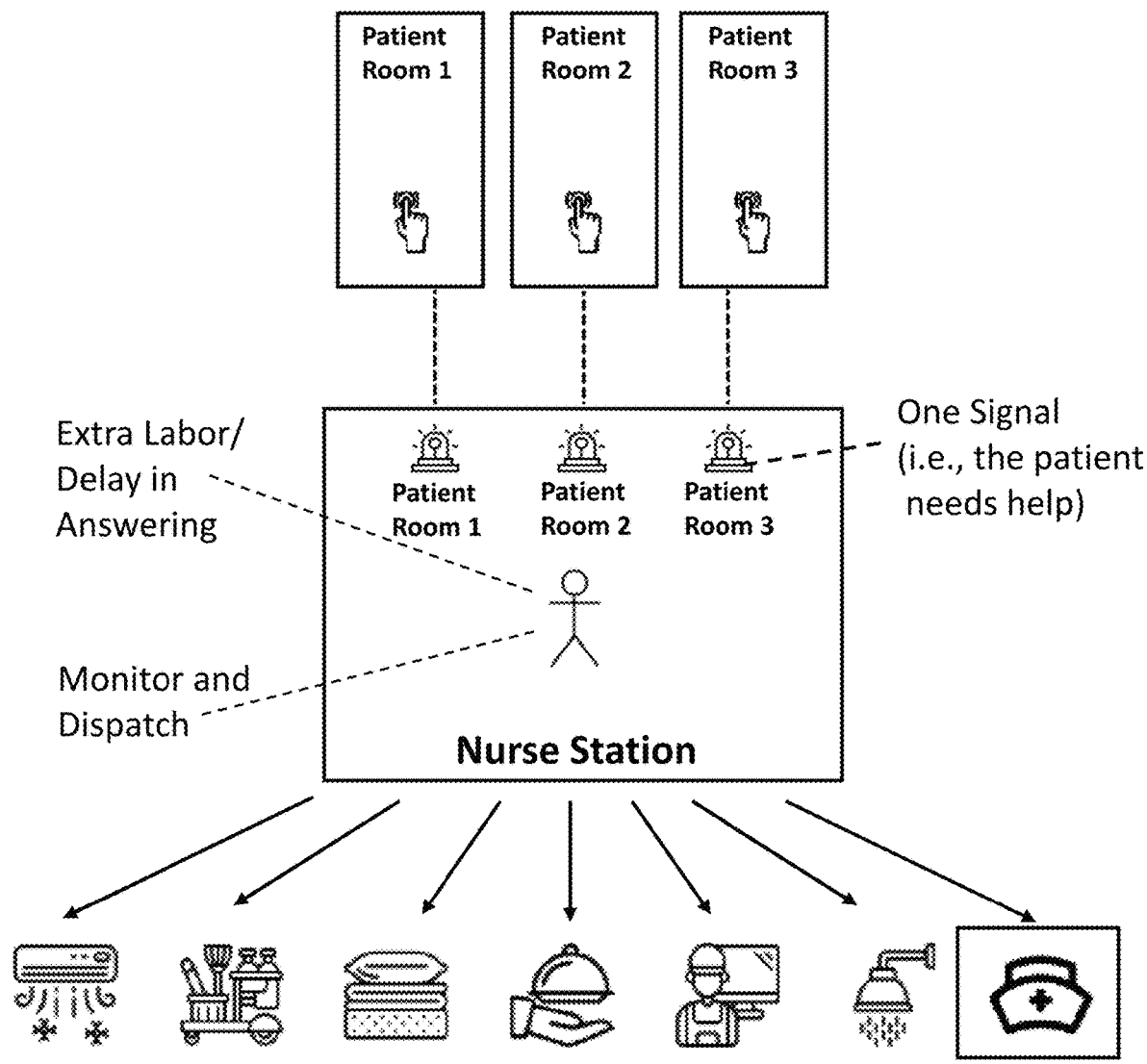
FIG. 1 is a schematic diagram of a prior art push-button system for managing patient requests in a medical facility.

The present invention is generally directed to medical facility staff management systems, and more specifically to artificial intelligence-based patient request and response systems for efficiently allocating personnel to patient-generated requests.

In one embodiment, the present invention includes a system for managing requests and workflows to serve patients in a medical facility, including at least one server in network communication with at least one support team device, at least one provider team device, at least one administrative team device, at least one family member device, and/or at least one patient device, wherein the at least one server is operable to receive one or more requests from the at least one patient device, the at least one administrative team device, the at least one provider team device, the at least one family member device, the at least one support team device, and/or from an artificial intelligence-based algorithm that predicts patient needs and/or creates routine care-maintenance requests implementing medical facility patient care policy, wherein an artificial intelligence module of the at least one server analyzes the one or more requests from the at least one patient device, the at least one administrative team device, the at least one provider team device, the at least one family member device, the at least one support team device, and/or the artificial intelligence-based algorithm and determines to which of the at least one support team device to send the one or more requests, and wherein the at least one support team device to which the one or more requests are sent is based, at least in part, on a location, urgencies of the one or more requests, types of the one or more requests, and/or a sender of the one or more requests.

In another embodiment, the present invention includes a system for managing requests and workflows to serve patients in a medical facility, including at least one server in network communication with at least one support team device and at least one patient device, wherein the at least one server is operable to receive one or more requests from the at least one patient device, wherein the at least one server automatically analyzes the one or more requests from the at least one patient device and determines one or more devices of the at least one support team device to send the one or more requests, and wherein the one or more devices of the at least one support team device to which the one or more requests are sent are determined based on a location of the one or more devices of the at least one support team device relative to the at least one patient device and/or based on a number of recent requests already accepted by the one or more devices of the at least one support team device.

In yet another embodiment, the present invention includes a system for managing requests and workflows to serve patients in a medical facility, including at least one server in network communication with at least one support team device and at least one provider team device, wherein the at least one server is operable to receive one or more requests from the at least one provider team device, wherein an artificial intelligence module of the at least one server automatically analyzes the one or more requests from the at least one provider team device and determines to which of the at least one support team device to send the one or more requests, and wherein the at least one support team device to which the one or more requests are sent is based on a location of the at least one support team device relative to at least one patient device, and/or based on a number of recent requests already accepted by the at least one support team device.

According to a 2020 survey conducted by the American Nurses Association, 62% of nurses, nearly two-thirds, experience burnout, with the numbers being even worse for new, younger nurses. This number is made even more concerning in light of an aging population in the United States and in most developed nations, increasing the demand for nurses. Burnout not only harms the mental wellbeing of the nursing staff, but also decreases quality of care to patients as the nurses are stretched increasingly thin to keep up with the quantity of requests they need to deal with. The combination of increased demand for nurses and high burnout of those nurses creates a self-perpetuating issue, with the remaining nurses often forced to work longer hours to meet demand, thereby increasing burnout even further. Therefore, it is imperative to employ any systems possible to decrease the amount of time and stress placed on nursing staff, and other medical professionals, to ensure that patient needs are still able to be met.

One aspect that prevents addressing the issue of burnout is antiquated patient request systems. Patients have many different needs or wants that need to be addressed in a hospital, but many of these needs are not strictly medical in nature and therefore do not require the attention of trained nursing staff, or even of nursing assistants. For example, patients often have requests to fix their in-room television, for food, for adjustments in their bed, or for other non-medical issues that do not require someone with the training of a nurse. In many current patient request systems, the patient call button is a single button for each patient that merely indicates to central nursing staff that a patient needs attention. Because of the lack of specificity of this request, a nurse often needs to respond in case of emergency, in order to at least check on the patient and receive the actual request. Even in situations where the nurse does not end up addressing the problem (i.e., the nurse does not spend time fixing a television), the check-in itself adds sufficiently to the duties so as to pile up workload. Furthermore, nurses may feel uncomfortable assigning someone else to a relatively quick request, such as a bed adjustment, even if it is not actually the nurse's responsibility. One common issue, which the present invention addresses, is the replacement of batteries, which does not require nurses to be involved, but has the potential to take a large amount of a nurse's time in aggregate.

The prior art only provides small solutions for addressing only a single part of a complete complex system such as a hospital. The present invention provides systems and methods for holistic management of all jobs, requests, and services in a hospital and other environments. The present system provides for selection and customization of processes and requests, allowing for someone with no experience in information technology (IT) or programming to create requests, bundle commands, and otherwise implement the functionality of the present invention selectively and in various combinations to customize workflows and processes for their environment. For example, opening a room in a hospital is operable to include different subcommands such as changing the sheets, opening the curtains, and sanitizing surfaces. Different commands are able to be bundled together based on the protocols for the hospital and the needs or preferences of different patients. For patients who receive a higher level of service, such as VIP patients, different commands are operable to be bundled, such as providing fresh food, flowers, or music as part of opening the room. This provides a high level of customizability for the system.

PRIOR ART FIG. 1 provides an illustration of this issue, with each patient room having a single push button, causing an indication light or sound to activate in a nurse station to cause a nurse responsible for monitoring and dispatch to personally go to the patient's room or to delegate someone to do so. This not only potentially wastes the time of the nursing staff, but also potentially leads to worse outcomes for the patients as well. For example, if five different patients request help in quick succession, without any differentiation in the signal for the nurse, there is no way of knowing which of the patients are having genuine emergencies and which are not. Therefore, if the nurses merely respond to the patients in the order that the signals are received or through an arbitrary method, patients having genuine emergencies will have help delayed, even if only briefly, which is potentially dangerous for the patient.

Some systems have been proposed which use voice assistants to deliver patient requests, such as is those described in U.S. Pat. No. 11,929,166, but these systems do not include intelligent routing to particular support team members based on the contents of the request. The '166 patent describes that if a particular person or role is explicitly mentioned in the request, then the request can be routed to that person, but this system is flawed in that it requires patients to actually know who is responsible for which request, and does not efficiently assign requests between individuals who have nominally the same role. Similarly, the tablet-based system proposed in U.S. Pat. No. 11,398,305 also does not include intelligent routing, but merely marks which patient made the request and allows various support team members to accept the request. While these methods may provide an improvement to traditional methods of delivering patient requests, the lack of intelligent routing decreases the possible improvements to efficiency that the present invention provides.

The present invention is also distinct from the system described in U.S. Pat. No. 11,264,128 in that the present invention is not merely a request optimization system for employees in a healthcare environment, but provides for patient-directed commands (not merely administrator generated jobs) and therefore dynamic allocation of requests to accommodate these commands. Furthermore, the present invention provides for additional functionality beyond efficient, AI-based allocation of requests, providing for an integrated system for patient (and in one embodiment, inventory) management and engagement, while also providing tools, such as a wayfinder system, for better facilitating the ability of support team members to complete assigned commands and jobs.

The present invention is also not limited to a mere voice-control system or companion tablet. While voice input represents one way in which new requests are provided to the system by patients in the present invention, voice input is merely one form of input. Prior art technology focuses primarily on the input to the system with different devices, rather than the complexities that come with many different user devices providing requests to many different potential support team members and the balance of these inputs to achieve a high level of patient care, as well as efficiency and satisfaction for the support team member team. Several prior art systems rely only on voice commands through a voice-activated hands-free device such as ALEXA by AMAZON. One problem with using just voice commands received by these devices is that voice commands from a patient with a first device are received by a second device assigned to another patient if both patients are in the same room and the first and second devices are hence in open air proximity to each other. This causes requests to be fulfilled for a second patient who did not request any services. In one embodiment, no voice commands are used or voice commands are not used as the primary activation. The present invention does not need to rely on the use of voice commands or use voice commands as its primary source of input, but it is able to in one embodiment.

None of the prior art discloses the use of artificial intelligence-based routing of different requests including specific types of patient requests, family member requests, doctor requests, nurse requests, or any localized incentive system for different support team members to respond to particular patients.

What is further needed and what the present invention provides is a system that is flexible for people, including leadership teams and CEOs, to walk into different facilities and different areas and immediately take one or more actions based on their observations. For example, a hospital system CEO walks into one hospital out of the twenty hospitals in the hospital system and is presented with a list of available commands or requests to be delivered to team members of that facility through the platform of the present invention. In one embodiment, geolocation is utilized on a mobile device of the CEO to automatically update the interface on the mobile device to provide this functionality. The present invention provides this functionality by providing, through the interface, an updated list of available actions that are able to be taken, such as rewarding particular team members or assigning different team members to address issues that arise. This allows an individual to see something positive or negative and immediately take action to address it, which is both advantageous and unique relative to any existing system. The list of available team members to whom requests are routed is also updated automatically based on device location. Similarly, support team members or provider team members, as defined below, are able to move locations within a facility, such as to a different floor, unit, or even room, or to a different facility and automatically be provided with available actions.

In addition to the technological system of the present invention, staffers able to complete functions apart from traditional nursing functions are provided with requests to better balance a medical facility environment. For the purposes of the present invention, the term "support team" or "support team member" is used and refer to anyone able to serve patient needs in different ways, expressly not including nurses, nursing assistants, and doctors, but including concierges hired from outside a medical facility, hospital-hired staff including in-facility concierges, technicians, food servers, maintenance workers, patient transporters and other transportation services, laundry or linen workers, environmental services workers, nutrition service workers, and other personnel qualified to perform requests created by the system. The definition of a "support team" excludes certified medical professionals such as nurses, nursing assistants, physician assistants, doctors, and surgeons because the present invention solves the long-felt, unmet need of assigning non-medical requests in a facility to personnel other than these medical professionals through the concierge applications provided by the platform of the present invention. Different support teams are operable to be made up of different subsets of the overall support team members, such as a support team for only maintenance workers, a support team for only environmental services workers, and so on. Other support teams are operable to include members in various roles, such as a concierge, a patient transporter, and a maintenance worker. By definition, these support teams are highly customizable depending on the specific needs of a facility or area of a facility. The grouping of different personnel for different operational teams provides for operational efficiencies within facilities and other environments, including for distributed teams (e.g., remote teams).

For the purposes of the present invention, the term "provider team" is used to refer to medical staff, including nurses, nursing assistants, and doctors. The "administrative team" includes C-suite personnel, officers of organizations, supervisors, operators, and/or other managers of personnel including the provider team and support team. The distinctions between these three types of team members, i.e., support team members, provider team members, and administrative team members is important for the purposes of the present invention because different team members perform different roles in a facility or environment. Distinctions among different support teams, such as the linen team, environmental services team, and concierge team, are also important for the purposes of the present invention because these different support teams are assigned different requests based on their skillsets and qualifications, which are stored in the platform of the present invention and updated over time.

Although the present invention is discussed primarily with respect to a hospital environment, the present invention is not limited to hospitals or even medical facilities. The present system provides for selection and customization of processes and requests for a variety of industries and settings. Typically, customization of application functionality is provided for IT professionals and programmers due to the knowledge and technical skill needed to design and launch an application. The present invention allows for customization of the application and functionality by someone with no experience in IT or programming. Custom commands are operable to be created based on the need of the specific industry, business, facility, and personnel. A catalog of commands (single and bundled) is operable to be provided, with the present invention providing for custom selection of commands for a specific environment, and customization or creation of commands based on the specific needs of a user, medical facility, and/or specific unit within a medical facility. Non-medical staff are provided with a seamless graphical user interface to maintain a Master Command Data File, which includes all required commands used at the medical facility or by other types of customers. The graphical user interface provides for facility users to manage these commands and includes options to edit or create new commands. Facility users are also able to define subcommands within bundled commands, thereby creating a mini workflow for support team members to follow. This workflow serves as a checklist for the worker, eliminating the need to remember procedural steps defined by the facility and reducing the risk of forgetting commands, thus minimizing mistakes. The present invention is able to be applied in hospitals, senior living centers, hospice care environments, doctor's offices, nursing home facilities, drug or alcohol rehabilitation centers, and/or other medical facilities. The present invention is also capable of being utilized outside of the healthcare sector to handle requests and to broker interactions between users/clients and concierges. The present invention is also able to be used for industrial applications, including warehouses and factories, educational environments (e.g., schools), staffing companies, sport stadiums, and any other setting or environment which requires commands and workflows. Each application includes customized unique and differentiated commands and workflows. One of ordinary skill in the art will therefore understand that the requests and commands below associated with a patient are also able to apply to these other environments as well. For example, different factories or warehouses within the same network are able to operate as clients to automatically transmit commands for types of jobs that need to be done on a particular day or other time period, and the system is able to automatically allocate workers to complete those requests based on the skills of the workers and the existing workload. Alternatively, workers in these facilities are also able to act as clients with concierges delivering goods (e.g., water, food, etc.) to the workers based on generated commands. Similarly, schools are able to generate requests to more efficiently allocate teachers and other personnel between schools or even within schools to complete certain requests. In a school environment, students or teachers are also able to act as clients to generate requests for certain objects (e.g., paper, teaching supplies, etc.). Staffing companies are able to utilize the present invention to allow different client companies to generate requests for the allocation of temporary workers with specific skillsets efficiently between the companies. Sports stadiums are also able to use the present invention to enable patrons to order food and beverages from their seats, with concierges delivering the orders. This invention includes a plug-and-play algorithm that routes orders based on the patron's seating section and the requested command. For instance, the stadium's facility management is able to assign concierges to specific sections and further allocate specific concession items to each concierge within those sections. Additionally, the invention allows for a dedicated concierge for VIP patrons, ensuring all requests from the VIP are consistently handled by the same concierge.

For the purposes of the present invention, a command is a definition of an action to be completed, which is a component of a workflow. A request is an order to execute a command, workflow, or checklist. A workflow is a series of commands that completes work needed. A bundled command is a combination of single commands grouped together to implement a workflow or a checklist. Automated commands are generated automatically upon the occurrence of an event. An example of an automated command is replacing a tablet which has a low battery. The event is the battery charge dropping below a certain percentage of charge, such as below thirty percent charge. This event triggers a request to replace the tablet with a fully charged tablet, or to charge the tablet with the low battery. Other events include the completion of a previous request or command within the system, or completion of a medical procedure such as completion of a surgery or an examination. Event-based commands are operable to be based on an event being completed, an event beginning, or the non-occurrence of an event. Time-based commands are a form of automated commands where the triggering event is passage of a certain amount of time. For example, every four hours a time-based command is triggered for a support team member to go to a patient's room to check on the patient. In another example, passage of four hours without a request being received from a patient triggers a time-based command for a support team member to go to the patient's room or to send a message to a device of the patient. Another example of a time-based command coupled with an event or is to check on a patient if a two-hour period has passed during which no requests from a patient have been sent and no other support team member has checked on the patient during that two-hour period. Checking supplies, inventory, or equipment status is another example of a time-based command; for example, this command is operable to be sent every day at 8:00 am or at predetermined time intervals throughout a day, week, month, or year.

Referring now to the drawings in general, the illustrations are for the purpose of describing one or more preferred embodiments of the invention and are not intended to limit the invention thereto.

Platform Ecosystem

Figure 2:
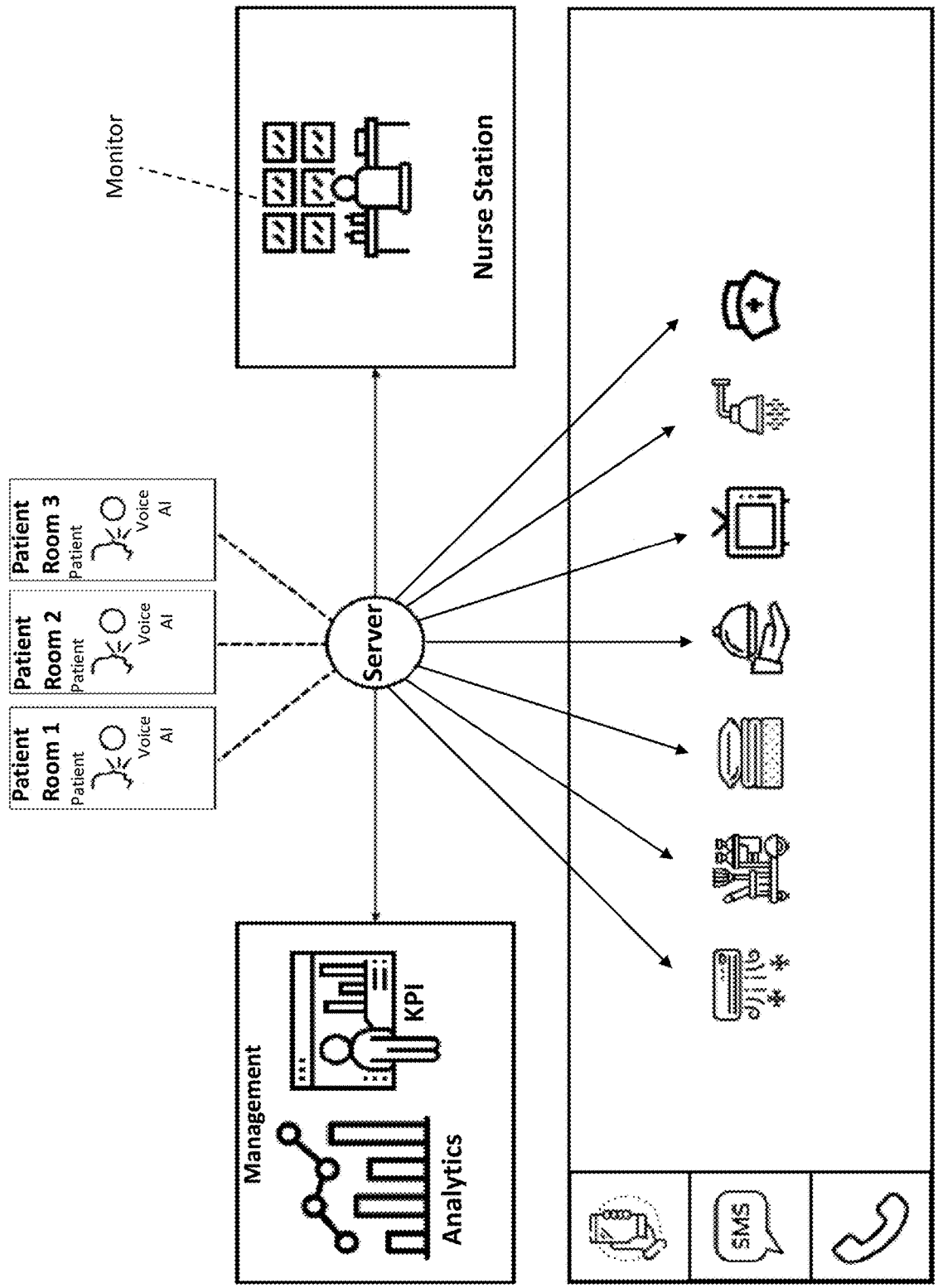
FIG. 2 is a schematic diagram of an artificial intelligence voice assist-driven system for managing patient requests in a medical facility according to one embodiment of the present invention.

FIG. 2 is a schematic diagram of an artificial intelligence voice assist-driven system for managing patient requests in a medical facility according to one embodiment of the present invention. The system of the present invention includes a server receiving requests from different patient rooms. The present invention is operable to include one or more servers, a cloud platform, one or more edge devices, and combinations thereof. In one embodiment, the server receives the requests through voice commands delivering through a voice assistant tool (e.g., ALEXA by AMAZON) or through voice input into a user device (e.g., a smartphone, a computer, a tablet, a smartwatch, etc.). In one embodiment, the voice assistant tool is an animatronic, or stationary, human head configured to provide a humanoid voice to speak commands to or receive information from (i.e., a "talking head"). In one embodiment, the talking head is configured to move lips to match the audio spoken by the talking head. Although several embodiments of the present application are discussed with regard to voice input, the present invention is operable to utilize text-based input, selection of an option from a plurality of options in an application, or through any other means of input known in the art. Preferably, an artificial intelligence module that is part of the server or is in communication with the server is able to interpret the request via natural language processing and/or via keyword recognition. The system is then able to route the requests to particular support team members having different specialties, not including nurses, nursing assistants, doctors, or anyone certified to perform any medical request, but including instead technicians, food providers, and/or other types of support team members. In one embodiment, if the intended destination of the request is unclear after the natural language processing, the raw requests are sent to a nurse station or other command station or an administrative team device for manual review and routing of the requests by a monitoring individual.

Figure 3:
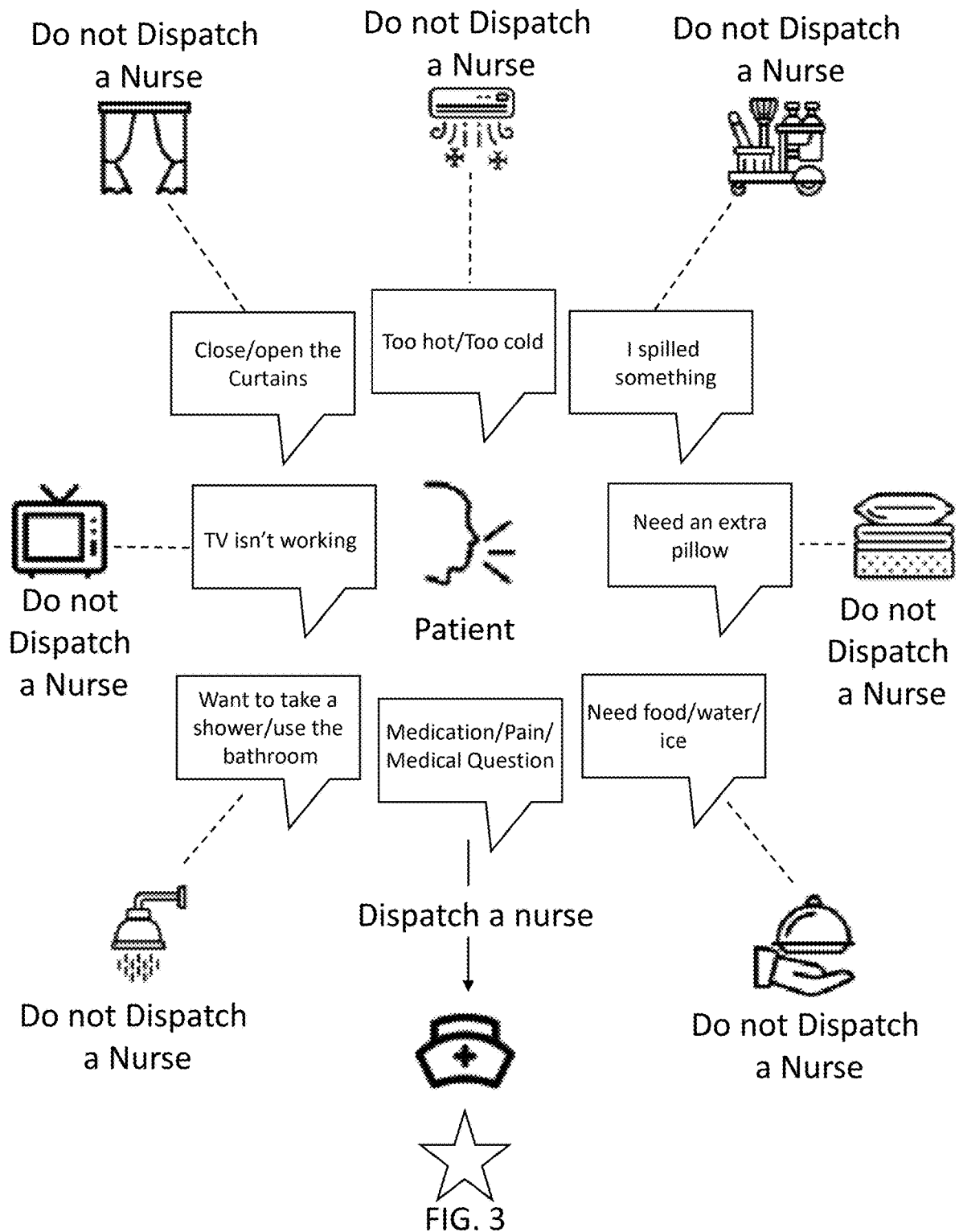
FIG. 3 is a schematic diagram showing different voice commands and decision-making by an artificial intelligence system determining which types of requests need to be routed to nursing staff according to one embodiment of the present invention.

FIG. 3 is a schematic diagram showing different voice commands and decision-making by an artificial intelligence system determining which types of requests need to be routed provider team members according to one embodiment of the present invention. FIG. 3 provides examples of types of requests that a patient is able to make and the appropriate classification of action for each request, as determined by the artificial intelligence module. For example, if a patient notes that the TV is not working, then the artificial intelligence module is operable to automatically route a request to fix the television to staff at the medical facility that has experience with such technical repairs, rather than a nurse or other provider team member. If a patient mentions needing food or water, that request is able to be routed to a support team member, the cafeteria directly, or to someone in contact with the cafeteria or another food provider, rather than a provider team member, thereby freeing up the nursing staff to respond to actual medication issues, medical questions, or reports of pain on behalf of the patients.

The natural language processing used in the present invention is able to include any known method of natural language processing known in the art. By way of example and not limitation, the domain-specific language processing discussed in applications such as U.S. Pat. No. 11,520,975, or the context-specific natural language processing discussed in U.S. Pat. No. 10,789,426, each of which is incorporated herein by reference in their entirety, are able to be used, as are other methods of natural language processing described anywhere in the art.

In one embodiment, requests are routed to all support team members overall or for a particular support team qualified to perform a specific type of request (e.g., all maintenance team members able to fix a television). Upon a support team member accepting the request, the request becomes unavailable to other support team members to prevent multiple personnel completing the same request. For requests which require multiple support team members, the appropriate number and type of support team members must accept the request before the request is made unavailable to other support team members. The present invention provides an interface allowing for communication and sharing of information between or among support team members who are engaged to complete a request, including provision of the geolocation of the other support team member(s) assigned to the request on a map of a building or other environment, automatic generation of a message thread between or among users, and provision of conference call functionality between or among the devices of the support team members upon activation of a single button on an application of one of the support team member devices.

The current invention is operable to be assign requests on a "round-robin" basis, whereby a first request is sent to a first support team member in a group (e.g., a single support team), a second request is sent to a second support team member in a group, a third request is sent to a third support team member in a group, and so on. This method ensures no one support team member is overloaded with requests. This round-robin algorithm is one of many plug-and-play algorithms implemented in the current invention for selecting support team members for assignments to incoming requests. The algorithm is able to be changed in real time or near real time during operations, permitting the platform to change how assignments are provided to support team members by the platform. In another embodiment, the present invention provides a "blast-mode" algorithm by which all support team members receive all requests originating from units they are assigned to. Support teams, or other groups, are operable to be formed based on skillsets, qualifications, assigned location within a facility, current location in a facility, and any other characteristic or metric known in the art. Skillsets are operable to be defined by a plurality of skills designated within the platform, with skills relating to hard skills (e.g., repair and maintenance of equipment) and/or soft skills (e.g., communication and problem solving). Skills are operable to be customized by users of the platform of the present invention based on the specific workplace or environment. Administrative team devices or other authorized devices are operable to assign skills to different users based on a variety of factors, including performance, professional certifications, and representations by the user for those skills.

In another embodiment, requests are only routed to a single support team member or set of support team members closest to the requesting patient to maximize efficiency. The routing system also automatically checks if the support team members to which the request is to be routed already have an unbalanced number of requests or commands or have a number of pending requests or commands above a given threshold. The routing system is operable to consider not only the number of requests, but the type of requests, including a projected length of time associated with completion of each request. The projected length of time is operable to be based on an average length of time associated with completing a request for that support team member, a support team member with the experience level and skillset comparable to the support team member, or the support teams as a whole. In one embodiment, a time to travel a distance between the location of a first request and the location of a second request is also considered in assigning requests to a support team member. For example, if the support team member has accepted a first request which requires moving a patient from the fifth floor of a hospital to the hospital entrance for discharge and a second request on the sixth floor of a hospital, the system considers the travel time between the fifth floor of the hospital, the ground floor of the hospital, and the sixth floor of the hospital in determining whether to send a request to this support team member. If support team members within a predetermined proximity of the new request have a full list of pending requests or a list of pending requests which are above a certain number or expected duration for completion, the system is able to allocate the request to qualified support team members that are further away who have fewer pending requests to improve efficiency and avoid piling on too many requests to a single support team member or group of support team members.

Support team members are operable to be grouped by location such that a first group of support team members serves a particular floor or floors of a medical facility, or certain rooms on a certain floor. Requests are operable to be sent to all support team members within a certain group or support team, to support team members within a certain group based on their command or request queue, to a next support team member in a list based on requests sent to other support team members in the list, or selected support team members within a certain group based on the present geolocation of the support team member as determined by the platform of the present invention and the present geolocation of the patient.

In one embodiment, if a support team member accepts a request but does not begin to complete the requests or commands associated with that request within a given time period, the platform determines the fulfillment of this request has been delayed and is operable to automatically reroute the request to one or more other support team members. Geolocation is also operable to be utilized in this embodiment to determine the location of the support team member device. If the support team member device has not moved towards a location associated with completing the request or commands associated with the request within a predetermined time period, the request is automatically rerouted by the platform to another support team member.

In yet another embodiment, a particular support team member is assigned one or more specific requests or types of requests and is solely responsible for fulfilling these requests. For example, requests relating to repair of a wheelchair are all sent to a maintenance concierge who has the skills to repair the wheelchair.

The different types of request routing described above are operable to be implemented individually or in combination. By way of example, a concierge dedicated to maintenance work handles all requests relating to repairs of wheelchairs and hospital beds regardless of the location of the wheelchairs or hospital beds within the hospital, and other requests are routed to support team member devices based on the grouping of the support team member devices (such as by units or location assigned within a facility). The system is operable to automatically recognize when a support team member is on a scheduled break or not working based on a schedule integrated with the platform of the present invention, administrative or support team member input regarding schedule, or geolocation of a support team member device (e.g., a support team member device not being present at a facility for a certain period of time indicates the support team member is on break or not working). In one embodiment, a support team member is operable to turn off receipt of new requests or pause receipt of new requests for a certain time period if the support team member is not able to accept new requests at that time.

Figure 4:
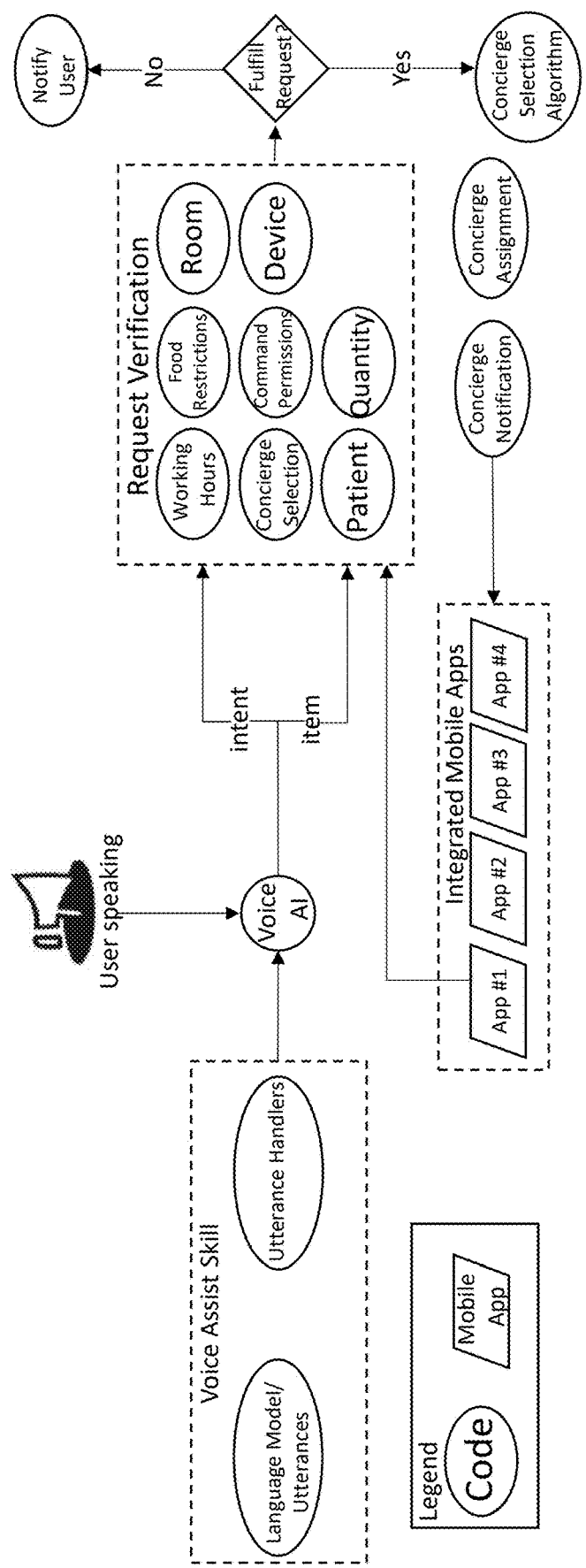
FIG. 4 is a schematic diagram showing a workflow of receiving voice requests from a patient and automatically determining a response to the patient according to one embodiment of the present invention.

FIG. 4 is a schematic diagram showing a workflow of receiving voice requests from a patient and automatically determining a response to the patient according to one embodiment of the present invention. As shown in FIG. 4, a voice assist device (e.g., ALEXA) or application on a user device (e.g., a smartphone, a tablet, etc.) receives vocal commands from a patient. The voice assist device or application is able to infer both the intent (e.g., the general sort of request from the patient) and the item (e.g., the specific contents of the request). In one embodiment, the voice assist device or application is limited to a narrow range of intents to ensure that the device is both not abused by patients (e.g., executing payments at a medical facility's expense) and such that the device recognizes what is requested by the patient according to a set of available actions or requests. For example, in one embodiment, the intents able to be recognized by the device or application are limited to only sending requests or requesting information. This limitation is able to be imposed even where third party devices are utilized, with functionality provided with the third-party devices by the manufacturer being removed or locked from usage by patients to allow the system to be more focused and less prone to misunderstandings.

In one embodiment, the voice assist device or application is primed for each patient ahead of time or early in the patient's stay either by the patient themselves or by a support team member on behalf of the patient in order to establish baseline parameters for a patient's stay and to assist support team members in adequately taking care of the patient. In one embodiment, these parameters include the patient's name. By including a patient's name as part of a voice request, the system associates each request from the patient with the patient to enable support team members to identify where to deliver the request responses. The responses are also more personable responses, as opposed to merely identifying by room number. Patient comfort is increased when the patient's name is used in fulfillment of requests. In one embodiment, the baseline parameters include a room number. Providing the room number is important as the voice assist device or user devices with the application are able to be moved between rooms. Baseline parameters are operable to be adjusted each time a patient or device moves rooms. In order for the system to take into account location in deciding to which support team member to route requests, the location of the patient (i.e., room number) needs to be ascertained. While the voice assist device or application uses hardware which provides geolocation to provide geographic information in one embodiment, in certain instances the precision of such geolocation data is not sufficient to enable discrimination between rooms mere meters away in the same facility. Thus, a device is associated with a room number in one embodiment of the present invention.

The voice assist device or application is also able to receive food restrictions (e.g., allergies, other dietary restrictions) for a particular patient. In one embodiment, based on the food restrictions, an integrated food service application automatically eliminates certain menu items to prevent a user from receiving food that is potentially harmful to them. In another embodiment, the menu items are not eliminated, but a notice is transmitted to a support team member or food preparer of the allergies such that recipes are able to be adjusted and/or so that the patient is able to be warned about the contents of particular menu items if they order those items.

The voice assist device or application is also able to receive a selection of one or more designated support team members. This allows the system to preferentially route requests to one or more particular support team members. This is able to limit requests to those one or more particular support team members, or merely more heavily weight those support team members such that requests are routed to them even if they are further away or have more assigned requests than preferred. This system is useful in situations where having a common assigned support team member is particularly beneficial to a patient and/or where a patient has a particular special need that requires special support from one or more specific support team members. The system is able to receive information, on a management or support team side, of a list of available support team members and working hours for each support team member such that the system knows which support team members are valid for sending requests at specific times. This list is able to be updated regularly to remove support team members who leave, add new support team members, or change working hours of support team members as needed.

In one embodiment, the voice assist device or application is able to receive specific command permissions for a particular patient which limits certain requests from patients or requests that include particular keywords based on a certain patient's needs. This is useful if a patient has particular requests that are deleterious to their health (e.g., the patient has a condition which a lower room temperature or bed temperature could adversely affect their health, and the room or bed temperature should not be lowered) and allows the voice assist device or application to either inform the patient that such decisions cannot be taken or send a warning to support team members with the requests that the requests should not be completed.

In one embodiment, the voice assist device or application is able to set particular parameters for the use of the device (e.g., unique wake words). The system is able to leverage several different voice-assist skills, including utterance handlers and/or language models (e.g., natural language processors, large language models, etc.) to interpret and classify requests. In this way, artificial intelligence-based handling of requests is able to be split between interpretation functions performed at a device level before being transmitted to the server, while the artificial intelligence-based routing is able to be performed at the server level. Alternatively, in another embodiment, both functions are performed at the server level or at the device level.

In one embodiment, if a request is unable to be completed, either because the request is of the type that is just not allowed to be performed or because the requests go against a particular restriction associated with the patient, then the voice assist device or application is able to provide feedback to the patient in the form of an auditory notification, text notification, or through other notification means. If the request is able to be completed, then the request is routed by the artificial intelligence module to one or more support team members who are able to respond.

The artificial intelligence module is further operable to anticipate requests which are desired by a patient, nurse, doctor, concierge, or any other personnel using the system of the present invention and suggest these requests to the appropriate user. In one embodiment, the present invention provides for suggesting requests based on a variety of factors such as requests completed by other users in the system, the time of day, the day of the week, environmental data such as temperature and weather, data about a patient, data about a doctor, data about a nurse, data about a concierge, and any other data available to the system of the present invention. The suggested requests are operable to be displayed on a GUI of the appropriate user device, and the relevant user is operable to accept the request via selection of the element on the GUI, voice command, gesture, or any other method of interaction with an electronic device known in the art.

The present invention is able to include multiple different integrated mobile applications to allow the system to deliver, handle, and/or respond to requests. For example, in one embodiment, one mobile application is designed to receive various types of requests by patients and handle and transmit those requests on an individual patient level. In one embodiment, another second mobile application is able to facilitate support team members receiving requests. This second mobile application is able to include financial incentives for fulfilling certain requests, track amount of time on the job, track number of completed requests, and/or provide other information on a support team member level.

Figure 5:
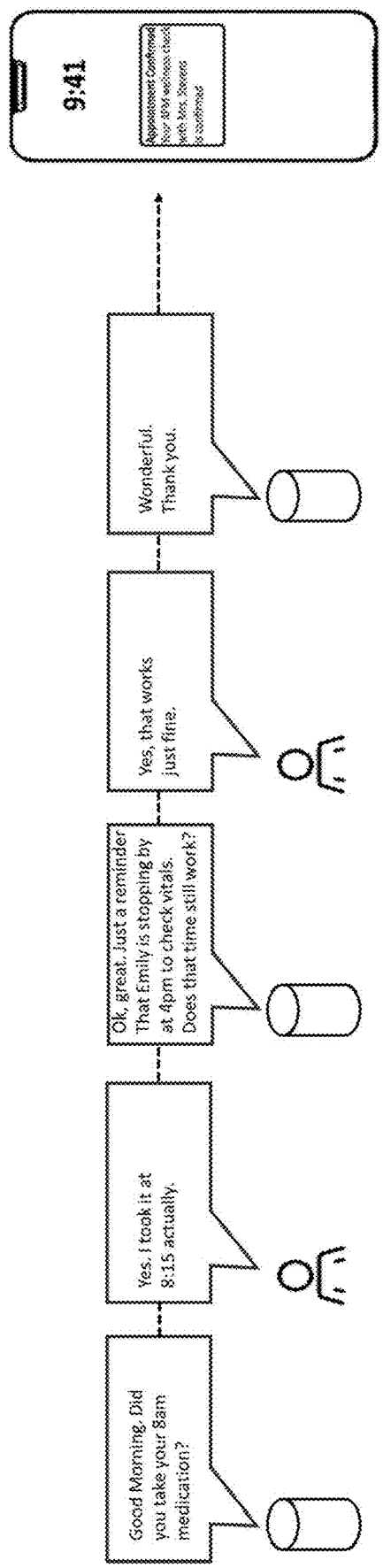
FIG. 5 is a schematic diagram showing a conversation with an artificial intelligence assistant for setting appointments for a patient according to one embodiment of the present invention.

FIG. 5 is a schematic diagram showing a conversation with an artificial intelligence assistant for setting appointments for a patient according to one embodiment of the present invention. In one embodiment, a voice assist device or application is able to prompt patients at set times to check if medication was taken, if treatment was performed, if the patient has eaten, and/or if other expected actions were taken for or by a patient. Furthermore, the voice assist device or application is able to automatically, or at the prompting of a patient, provider team member, administrative team member, or support team member, set items on the schedule for a patient (e.g., physician meetings, medication checkups, etc.), reserve food for a future meal, and automatically add items to the schedule as a result or prime future requests to be sent at a later time.

Figure 6:
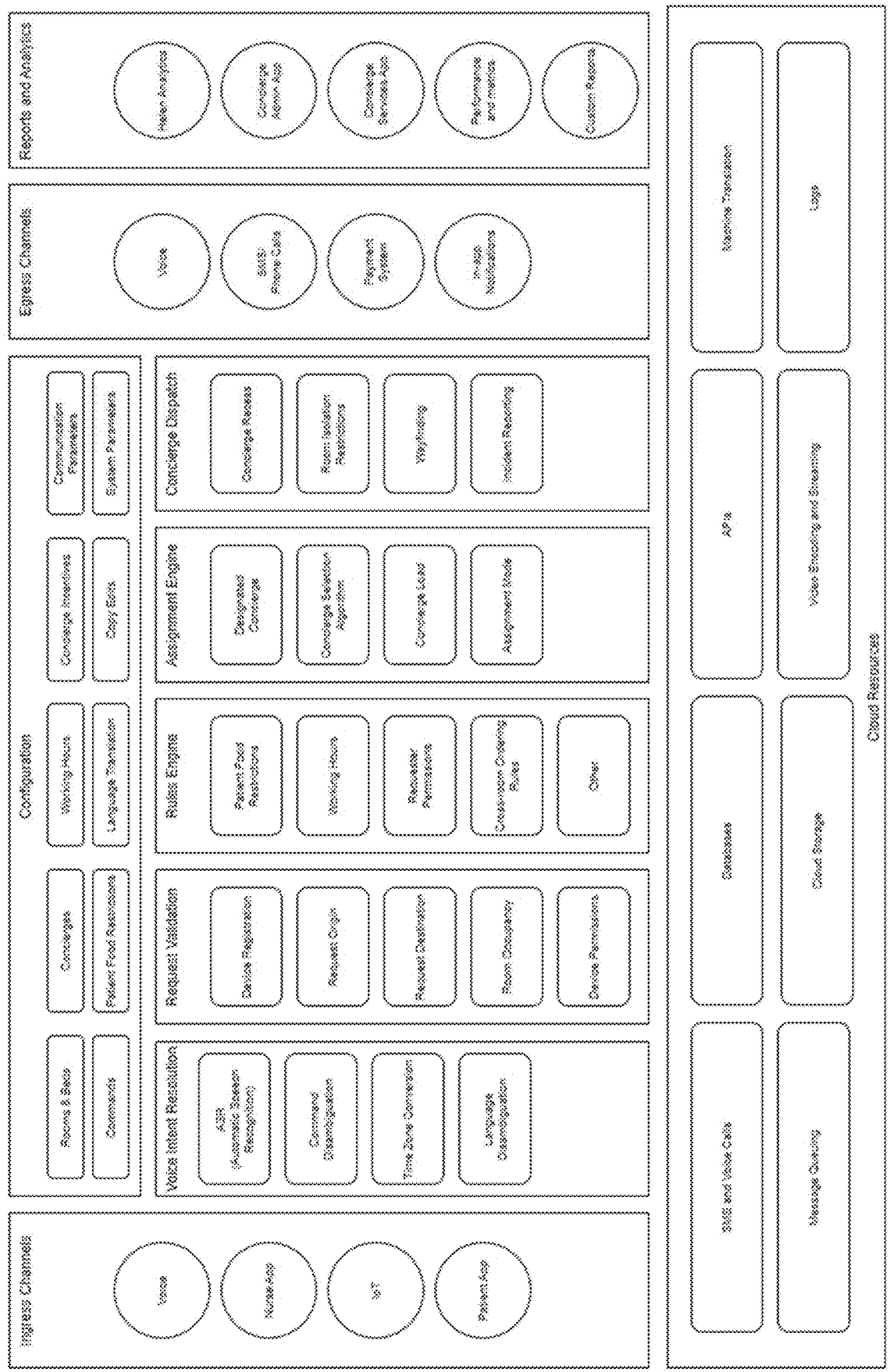
FIG. 6 is a schematic diagram of components of a server platform according to one embodiment of the present invention.

FIG. 6 is a schematic diagram of components of a server platform according to one embodiment of the present invention. FIG. 6 provides a broad overview of elements of the platform according to one embodiment. In one embodiment, ingress channels into the system (i.e., methods by which the system receives data and commands) include a voice command module, a support team member-facing application with text, voice, or visual input, a patient-facing application with text, voice, or visual input, and/or one or more connected IoT devices (e.g., able to report status, current settings, received commands, etc. to the server). In one embodiment, egress channels from the system (i.e., ways in which the platform transmits information or commands) include voice output (e.g., to talk to a patient or support team member), text or phone call-based automated notifications and other messages, a payment system for automatically coordinating payment execution with at least one external payment system (e.g., via a bank, via a payment software application, etc.) based on input from a support team member or patient, and/or in-app notifications to a patient or support team member.

To process the voice or other audio input, the system includes a voice intent resolution system as a subcomponent of an artificial intelligence module. The voice intent resolution system is able to include automatic speech recognition (ASR), command disambiguation, time zone conversion (especially useful where patients and support team members are in different time zones), and language disambiguation. Time zone conversion is especially useful when the command from the patient or support team member includes a time, which must be translated across time zones to accurately align calendars of different participants, rather than merely literally transcribing the spoken words for the time. Methods of command or language disambiguation able to be used with the present invention include, but are not limited to, those described in U.S. Pat. Nos. 7,881,936 and/or 9,786,273, each of which is incorporated herein by reference in its entirety. Systems for ASR that are compatible with the present invention include, but are not limited to, those described in U.S. Pat. Nos. 9,620,110, 10,373,612, and 10,319,250, each of which is incorporated herein by reference in its entirety.

In one embodiment, the present invention does not utilize voice or audio inputs but rather only uses non-audio inputs, such as text, selection of one or more elements on an interface, or video or image inputs including gesture recognition. In another embodiment, the present invention uses audio inputs in combination with vocal recognition, geolocation of a person or device associated with the command, or other techniques to provide for identification of the patient or patient device associated with the command. In embodiments where only voice inputs are utilized without additional parameters being utilized to determine the relevant patient for the voice command, it is possible for a voice command to be received by multiple devices such as multiple smart home devices. A support team member could provide services or goods to a patient who did not request the services or goods, and which may be detrimental to the patient. This potentially causes unnecessary work for support team members and confusion for patients. Accordingly, in embodiments of the present invention in which voice or audio inputs are utilized, the present invention preferably includes additional parameters with the voice or audio inputs to ensure that the correct patient receives a support team member response.

In one embodiment, the platform includes a request validation system, which is able to receive requests to register a particular device with the system or within a particular ecosystem of the system, so that the device is able to be uniquely recognized in the future. Subsequently, when receiving requests, the request validation system is able to automatically detect a request origin and a request destination (either the platform or another device) in order to correctly route or handle requests. The request validation system is able to verify whether a device being used to generate a requests originates from a room that has been previously designated to be occupied (and has not since been designated as unoccupied) and is able to send a notification to at least one support team member profile or at least one administrative team profile in the event that a request is received from a room that is meant to be unoccupied to either prompt investigation or correction of the occupancy status. The request validation system is also able to handle device permissions, thereby automatically rejecting specific types of requests from particular devices (e.g., based on a patient's health, age, previous behavior, dietary restrictions, etc.).

In one embodiment, the platform includes a rules engine to ensure that requests comply with several registered restrictions before completing those requests. Important rules that the rules engine is able to validate include dietary restrictions for specific patients and the rules engine is able to automatically reject requests from particular patients for food or drink that violates the dietary restrictions of the patient, optionally sending a notification to the patient profile or a support team member profile that such a rejection has been made and/or on what basis the rejection was made. The rules engine is also able to check requester permissions and cross-room ordering rules to ensure that the request is one that the particular patient profile is able to make and that the designated recipients or executors of the request are valid recipients. This helps, for example, keep requests within the ecosystem of a requesting patient, rather than allowing stray requests to go to other care facilities. The rules engine is also able to handle support team member-side egress permissions (e.g., based on holiday schedules or working hours) to prevent a support team member profile from receiving requests (or being the sole recipient of requests) when particular support team members are not currently active, thereby preventing dropped requests and reducing frustration on the part of both support team members and patients.

The platform also includes an assignment engine as a subcomponent of the artificial intelligence module, wherein the assignment engine is able to allocate requests from patients to support team members (or between support team members) in a manner previously described. The assignment engine designates one or more support team member profiles to execute a request via a support team member, or concierge, selection algorithm. The assignment engine is cognizant of the load at each given time currently on each support team member, preventing the system from aggregating requests on a limited number of support team members.

After assigning particular requests, the concierge dispatch system of the platform is then able to provide tools for allowing the support team member to reach and help the requesting patient. Such tools include an in-facility wayfinding map, as described below, notifications for incidents in the care facility (whether or not related to the particular patient), and room isolation restrictions.

Beyond handling requests and dispatching, the platform is also able to perform analytics both to update internal artificial intelligence models and to provide data to external sources (e.g., an insurance provider). For example, analytics is able to be performed on patient demographics, patient requests, request completion efficiency of support team members, other parameters, or cross-associations of these parameters and provide some amount of these analytics through a support team member profile and/or an administrator profile. The system is able to both automatically perform analytics and to perform specific analytical measurements to generate custom reports for one or more users. The present invention also provides key performance indicators for support team members, employees, contractors, and other personnel, as well as key performance indicators for divisions or departments of businesses and businesses as a whole.

The cloud resources able to be leveraged by the platform include short message service (SMS) and voice calls, databases, APIs, machine translation, message queueing, cloud storage, video encoding and streaming, and activity logs.

Inputs are able to be provided to modify request generation, assignment, and completion for the present invention, including rooms and beds (and corresponding devices), support team member names and details, working hours for each support team member or administrator, support team member incentive rewards, communication parameters, a valid list of commands, patient food restrictions, language translation services, copy edits, and/or other parameters.

Although the present invention has been described primarily with respect to support team members including provider team members and concierges, the functionality of the present invention is operable to be used in connection with other medical facility requests including environmental services, maintenance, linen services, patient transportation, janitorial services, and other functions. The platform of the present invention provides for not only patients to submit requests, but for doctors, surgeons, nurses, concierges, administrators, volunteers, executives, chaplains, front desk personnel, and other personnel to send requests to each other and to any personnel connected to the platform of the present invention. These users are operable to receive requests directly from patients, as applicable. For example, the platform provides for a nurse to send a request to a janitor, and for a doctor to send a request to a nurse. Different groups of personnel are operable to be perform according to functions within the medical facility, such as post-operation personnel and pre-operation personnel. These groups are operable to include different types of users, such as a doctor, a nurse, and two concierge users. In one embodiment, the platform provides for doctors to select specific nurses for a request, and for nurses to select specific concierge users for a request.

In one embodiment, the concierges include robots able to complete commands automatically upon receiving requests. The robots do not need to receive requests and respond, but instead are able to operate immediately in response to the request. In one embodiment, the robots are humanoid in appearance, but one of ordinary skill in the art will understand that non-humanoid robots, such as floor cleaner robots are also contemplated herein.

Patient-Facing Application

Figure 7:
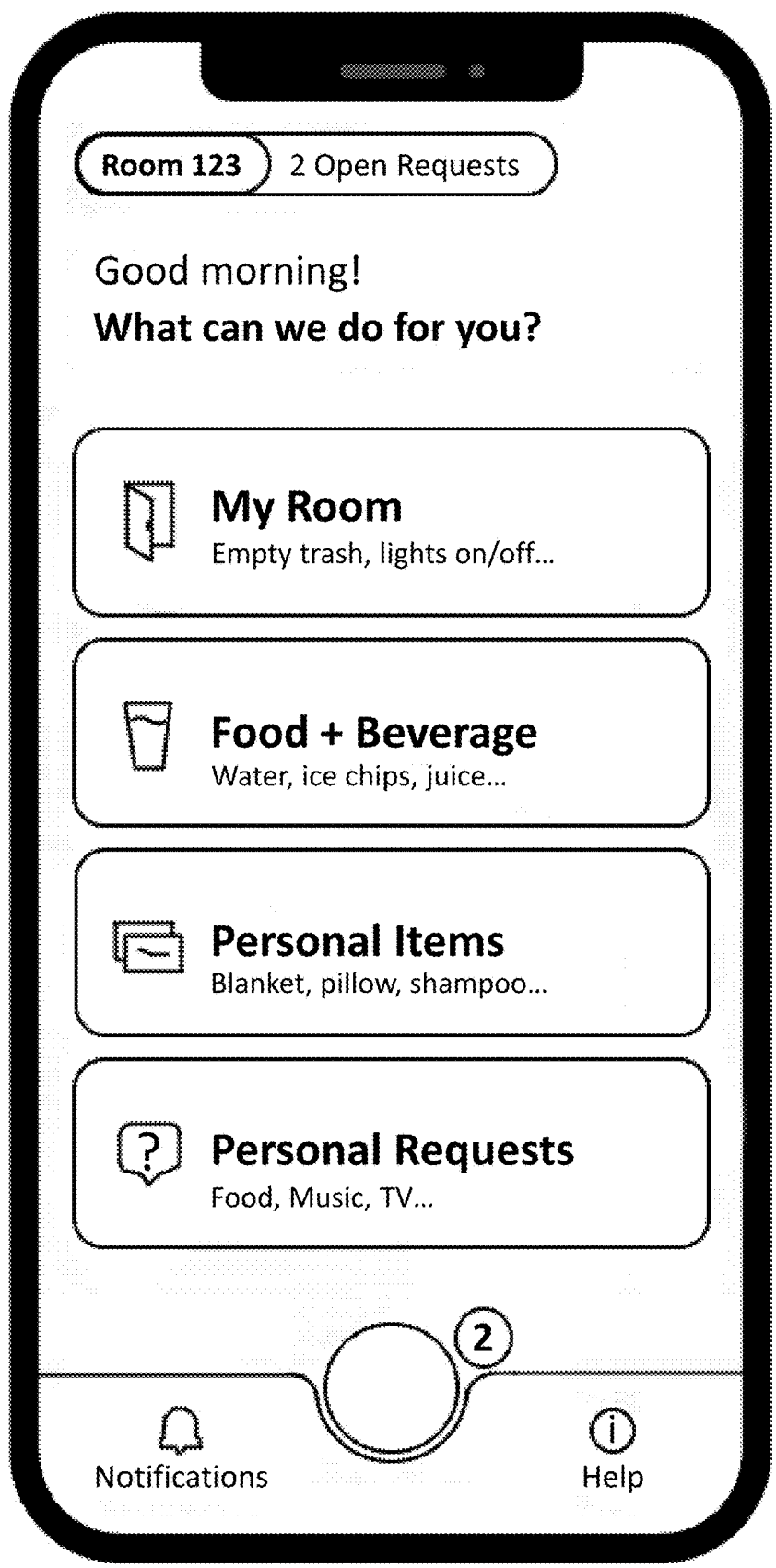
FIG. 7 is a graphical user interface of a request placement system for a patient-facing application for different requests in a medical facility according to one embodiment of the present invention.

FIG. 7 is a graphical user interface of a dashboard for a patient-facing application according to one embodiment of the present invention. In one embodiment, a patient-facing application associated with the present invention is able to receive commands through a patient user device (e.g., a smart phone, a tablet, a computer, etc.) and thereby create a patient profile. In one embodiment, a patient profile includes patient demographic information (e.g., age, gender, sex, race, ethnicity, etc.), previous medical history, location of the patient (e.g., room, home location, etc.), previously sent requests, one or more financial balances, and/or other information regarding a patient. In one embodiment, the patient profile includes one or more images of the patient. In one embodiment, one or more cameras, or other visual sensors, are operable to recognize via artificial intelligence-based machine vision, patients based on correspondence of video or photo data from the one or more cameras, or other visual sensors, with the one or more images of the patient in the patient profile. In this way, the system is able to identify patients simply based on visual data and able to note a patient location based on such data.

In one embodiment, the patient-facing application includes a graphical user interface (GUI) with a plurality of selectable buttons. In one embodiment, requests are generated purely through selection of buttons in the graphical user interface. For example, selection of a water request button (nested within the larger food+beverage menu) automatically sends a request for water, with an associated patient name and/or patient room such that the target of the request is able to be identified. For each item, the GUI is operable to receive an input of a number of the items requested (e.g., 2 socks, 1 blanket, 2 pillows, etc.) and a time for the items to be delivered (e.g., now, in an hour, in two hours, etc.). Alternatively, in one embodiment, the GUI does not include any button selects for types of requests and instead directly receives voice commands from a patient user to generate the requests and classify them from an initial level. Alternatively, these two systems are able to be combined such that a button is selected for initial broad type of request (e.g., personal item request) and then receive a voice command that already has an initial classification with the need for natural language processing (though NLP is able to be used for further subclassification) and the request is then able to be routed to the appropriate support team member. Another mixed embodiment of the present invention is to include precise individual button requests, but where the system includes a general voice command request button to allow for non-conventional requests. In one embodiment, as shown in FIG. 7, the application includes notice on the dashboard of which room the user is located in and a tab showing a number of open requests or completed requests allowing a patient to review what has already been requested.

Figure 8:
FIG. 8 is a graphical user interface of a request placement system for a provider team-facing application for different requests in a medical facility according to one embodiment of the present invention.

FIG. 8 is a graphical user interface for a provider team member-facing application for different requests in a medical facility according to one embodiment of the present invention. FIG. 8 provides an alternative embodiment of a GUI for inputting requests on a provider team member device. As is able to be seen from the difference between FIGS. 7 and 8, the exact categories displayed on the application according to the present invention are able to vary according to the present invention. For example, categories such as "my room," food+beverage," "personal items," and "personal requests," are able to be used in one embodiment, such as is shown in FIG. 7, while in another embodiment, as shown in FIG. 8, request categories such as "deliver stretcher," "clean patient room," "clean spill," "replace sharps," "remove trash," "replace toilet paper," "clean bathroom," and "clean floor" are used. Alternatively, the categories shown in FIG. 8 as able to be subcategories or individual request buttons beneath a larger category such as "my room" or "personal requests."

In one embodiment, the GUI shown in FIG. 8 is also able to be used as a GUI screen in a patient-facing application, allowing patients to request services from a provider team member or concierge.

Figure 9:
FIG. 9 is a graphical user interface of a request placement system for a patient-facing application with personalized recommended items according to one embodiment of the present invention.

FIG. 9 is a graphical user interface of a dashboard for a patient-facing application with personalized recommended items according to one embodiment of the present invention. In one embodiment, a patient-facing application is able to include a list of most popular items, or categories of items, that have been ordered (either for the overall network of the system at multiple facilities or for a particular medical facility) such that more likely relevant items are presented up front to a patient (e.g., cold drinks, hot drinks, etc.). In one embodiment, the most popular item list is updated at regular intervals (e.g., every day, every week, every year, etc.) based on an updated total number of requests for each item or category of item and/or based on a number of requests for each item or category of item for a particular period of time (e.g., within the last day, the last week, etc.).

In one embodiment, the patient-facing application includes a recommended item list customized for particular patients, particular groups of patients, and/or for particular facilities. In one embodiment, the recommended item list is generated by an artificial intelligence recommendation system based on particular patient information (e.g., allergy information, medical history, current medical issues, medication, etc.) and/or based on common requests made by the patient (or similar patients) in the past. The platform then allows for selection of the full list of available requests apart from selected lists of most popular or recommended items. One of ordinary skill in the art will understand that the list of popular items or recommended items is not limited to merely four items or any particular number of items and the numbers in each category is able to vary according to different embodiments of the present invention.

In one embodiment, the application is operable to receive a request to initiate a text, audio, and/or video call with other connected patients on the application and/or with one or more support team members in order to make requests or simply communicate. In one embodiment, the available recipients of a call from a particular patient are able to be added by an administrator account or is based on specific unique codes for support team members or patients entered onto the patient profile. This limits the ability of a patient to communicate with support team members outside their network or, even more importantly, with patients they do not know, preventing abuse and harassment through the system. The ability to communicate through video over the platform is very useful for less verbal patients, especially if they wish to communicate through a sign language.

In one embodiment, the system of the present invention is operable to receive data from one or more cameras, other visual sensors (e.g., LiDAR), auditory sensors, integrated bed sensors (e.g., temperature sensors, pressure sensors, etc.), or other sensors positioned within or proximate to a patient's room. Specifically, in this embodiment, the artificial intelligence platform is able to receive sensor data and automatically generate requests, especially to nursing staff, if an emergency is identified. This is helpful for allowing for automated alerts even in situations where a patient is unable to generate their own request, such as when a patient is having a seizure. The system is able to leverage machine vision artificial intelligence to analyze video or images from the one or more cameras or other visual sensors to identify characteristic signs of patient health issues (e.g., rapid movement of patient in particular ways, identifying a patient has fallen out of bed or is an uncomfortable position, identifying specific unusual coloration in the video such as blood on the patient, identifying infections, etc.). In another example, if an administrator enters into a facility and sees a spilled drink on the ground, the administrator device is able to take a photo or video and upload it to the platform and, based on automatic AI-driven visual analysis, a request is able to be generated and transmitted to an appropriate support team member. In another example, a provider device is able to take a photo or video of a wheelchair with a broken or malfunctioning component through the app, and the AI-driven visual analysis of the platform determines that the wheelchair needs repair. The platform routes a request to a maintenance team member to repair the wheelchair based on this analysis. Similarly, sensors such as integrated bed sensors are able to automatically flag movement of the patient in an unusual way (e.g., characteristic of a seizure or other episode) or a fever of the patient via an integrated bed temperature sensor.

In addition to health issues, integration with cameras and other visual sensors is also able to be used to determine compliance with a particular medication or food regime. In one embodiment, a notification is automatically transmitted to one or more support team member profiles or provider team profiles if a particular patient does not eat or take medication within a certain time period. This helps to ensure that a patient is able to stay healthy. In one embodiment, the cameras are further able to automatically interpret facial expressions in response to a request, a meal, or general conditions to determine a patient comfort level. In one embodiment, if a patient comfort level is recognized by the artificial intelligence machine vision system as being too low, then a request is automatically generated that the AI system determines is likely to improve a patient's mood, or a prompt for a support team member to determine a suitable request is generated. Alternatively, if the mood is particularly low, then the user device is operable to automatically send a text or audio notification asking if there are any particular requests that a patient has. In one embodiment, the cameras or other visual sensors are further capable of recognizing gestures directed from a patient (e.g., thumbs up, thumbs down, etc.), which is particularly useful for non-verbal patients to communicate feelings about particular issues or request help or a service. In another embodiment, the present invention provides for remote requests from family members. The present invention is operable to suggest requests to family members based on analysis of image and/or video information or analysis of any other information provided to the platform, including sensor data, and a family member application is operable to receive input from the family member to select one or more requests for a support team member to complete.

In one embodiment, the patient-facing application includes at least one facility information page for providing information regarding the facility in which a patient is staying. Information includes, by way of example and not limitation, locations of bathrooms, cafeterias, vending machines, or other locations of interest (and optionally including maps identifying these locations), names or other information regarding support team members, and provider-team members, and/or general information regarding the facility.

In one embodiment, the system is operable to automatically generate recurring requests to essentially add these requests to the schedule. In one embodiment, recurring requests are generated based on manual input from a patient profile or an administrator or support team member profile. Common examples of recurring requests include medication delivery or regularly scheduled meal times. In one embodiment, recurring requests are able to be automatically generated by an artificial intelligence scheduling module based on patterns of behavior from one or more particular patient profiles.

Support Team-Facing Application

Figure 10:
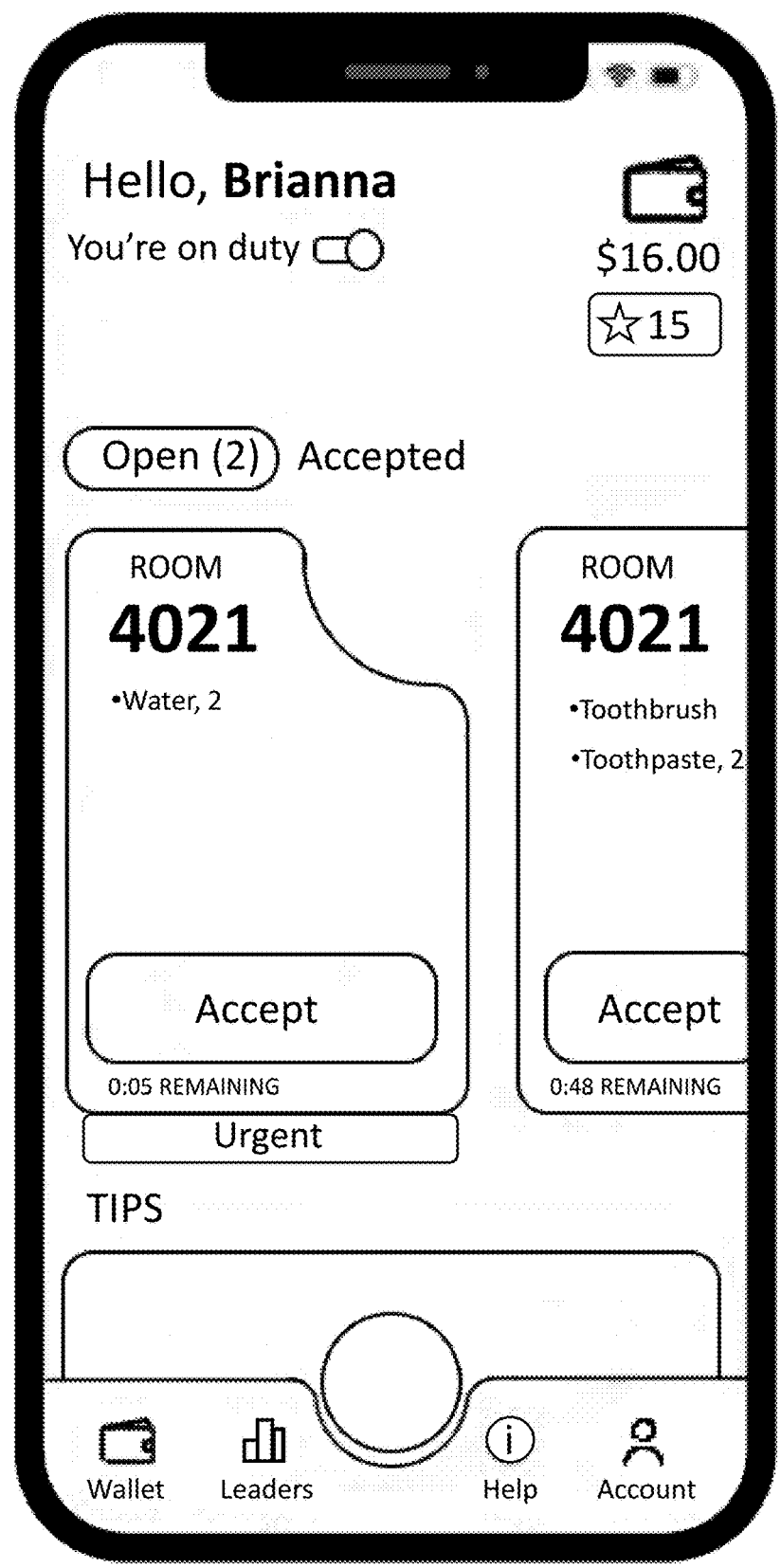
FIG. 10 is a graphical user interface for a support team member-facing application for receiving and accepting requests from patients according to one embodiment of the present invention.

FIG. 10 is a graphical user interface for a support team-facing application for receiving and accepting requests from patients according to one embodiment of the present invention. The GUI illustrated in FIG. 10 is a concierge-facing application; however, one of ordinary skill in the art will appreciate that the present invention includes applications and interfaces for each support team member, which are operable to be customized based on the requests received, commands executed, requests sent, or other functionality recited herein for each participant. In one embodiment, the present invention includes a support team-facing application operable to track current requests for which a support team member is responsible at a given time as well as past repeated requests. The application is able to facilitate receiving new requests from patients. In the embodiment depicted in FIG. 10, requests are able to be presented as cards with details regarding the room number, contents of the request, name of the patient, a distance to the room, and/or an amount of time left to complete a request. The support team member is then able to accept or not accept the request and carry out the request, preferably within the amount of time left to complete the request. The application preferably provides a number of open requests available and a number of currently accepted, but as of yet uncompleted requests. In one embodiment, specific requests are marked as urgent, indicating they need to be done more quickly.

In one embodiment, the application includes a slider or other graphical element able to be manipulated to designate the support team member as active (i.e., on duty) or inactive (i.e., not on duty) at any given time. In one embodiment, requests are not able to come to a profile designated as inactive at a given time period.

In one embodiment, support team profiles are able to be easily associated with a care facility ecosystem via tapping a user device with the profile logged in on another user device already in the system, or an administrator device. In another embodiment, support team profiles each have associated unique codes (e.g., QR codes) able to be scanned by another support team profile already within the ecosystem to add the new support team profile to the ecosystem.

Different financial models are able to be used for the support team members. Under a traditional model, the support team members are able to be salaried employees and not paid by the completed request. In this embodiment, the application is useful for tracking a total number of requests completed, a total amount of time spent completing requests over a time period, and/or a number of requests completed per unit time, allowing for both personal and supervisor review of efficiency of each support team member, and allowing for easier identification of areas of improvement (e.g., areas where one support team member takes an abnormally long amount of time for a specific type of request relative to other support team members). In one embodiment, statistics regarding the amount of time spent on specific types of requests is able to be used as a data input to the artificial intelligence-based routing system, by decreasing the chance that support team members spending a larger amount of time completing specific types of requests are assigned those types of requests in the future. In one embodiment, a number of requests completed within a certain time period (e.g., one day, one week, etc.) is displayed on the application (e.g., denoted by a star).

One of ordinary skill in the art will understand that in some embodiments of the present invention, an administrator profile or a particular nursing profile is able to receive requests generated through the system for a particular medical facility or ward of a medical facility. The system is able to receive inputs to manually assign requests to particular support team members, or to receive inputs to modify the automatically assigned requests to change which support team member receives particular requests.

Alternatively, the applications and the ecosystem described by the present invention is able to support a gig-model. In this model, support team members within the facility are able to be compensated for each completed request, either from funds provided directly from the patient (e.g., requests include a designated amount of funds), via an employer, or from a mixed system (i.e., patient does not designate funds per request, but funds are automatically allocated from a pool of funds allotted to each patient). In one embodiment, the artificial intelligence-based routing module is operable to automatically recommend an amount of funds for completing a particular request based on the contents of the request and/or particular difficulties regarding the request (e.g., difficulty of a particular patient, difficulty of a completing a request, length of time to complete a request, time until the request needs to be completed, etc.). This provides a system for incentivizing support team members to operate more efficiently and take a larger number of requests by providing a direct financial advantage. In this embodiment, a leaderboard functionality of the system is able to track a total amount of funds received by each support team member as a result of completing requests.

In one embodiment, a patient application is able to receive confirmation that a given request is complete and/or a rating for how well the request was satisfied by the support team. In one embodiment, the rating is provided as a text or voice based review, as a star rating, as a simple binary good-bad decision, and/or other ratings systems. In one embodiment, statistics regarding average ratings of individual support team members in completing specific types of requests are used as a data input to the artificial intelligence-based routing system, by decreasing the chance that support team members with lower average rating for specific types of requests are assigned those types of requests in the future. Alternatively, the system is able to receive satisfaction ratings in completing each request from the support team profile. In one embodiment, statistics regarding average satisfaction ratings for individual support team members in completing specific types of requests are used as a data input to the artificial intelligence-based routing system, by decreasing the chance that support team members with lower average satisfaction rating for specific types of requests are assigned those types of requests in the future.

One of ordinary skill in the art will understand that while the support team-facing application and patient-facing application are discussed as separate applications, these applications are able to be provided as a single application with different interfaces and functionality depending on the role of the specific user (e.g., support team, patient, visitor, administrative team, etc.).

Figure 11:
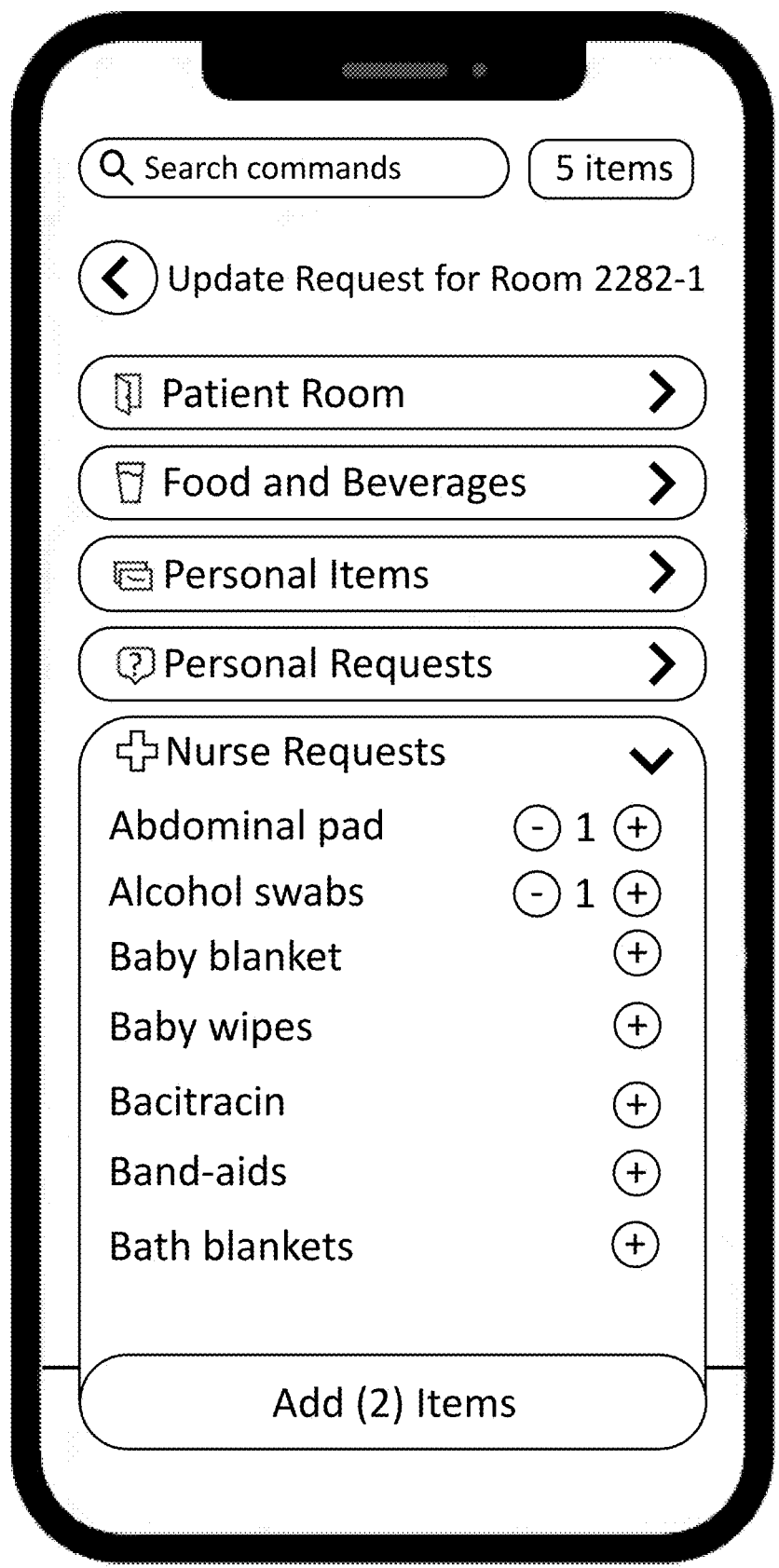
FIG. 11 is a graphical user interface for a request update page on a support team member-facing application according to one embodiment of the present invention.

FIG. 11 is a graphical user interface for a request update page on a support team-facing application according to one embodiment of the present invention. In one embodiment, the support team-facing application is ability to receive an ability to modify requests from patients. In one embodiment, modifications to the requests automatically generate confirmation messages transmitted to the patient profile, requiring the patient profile to approve such requests before the modification is made. In another embodiment, confirmation messages are not sent, or are only sent for particular types of changes (e.g., for deleting items). Modifying requests allows for more exact management of what was actually done for each request. For example, if the patient requests an item that is out of stock, modifying the request to delete that item is useful in tracking what parts of the request were actually completed to assist in tracking where quantities of each item are going. Additionally, it allows support teams to delete items that are likely to be dangerous to the patient (e.g., food items that the patient is allergic to) or to add items that the support team member believes is likely necessary in association with the requested items. For example, if the patient requests a new band-aid, the support team is able to add onto the request to add a new cotton swab and alcohol swab, as changing out the band-aid should also come with changing out these items.

Figure 12:
FIG. 12 is an activity summary page for a support team member-facing application including streak tracking according to one embodiment of the present invention.

FIG. 12 is a dashboard for a support team-facing application including streak tracking according to one embodiment of the present invention. FIG. 12 provides one example of gamification for support team members onboard the platform that allows for engaged participation by workers providing care to patients. In one embodiment, by utilizing continuously updating geolocation data and/or accelerometer data from a support team member user device, the system is able to determine the total distance traveled by the support team member over a period of time (or during the entirety of the support team member's service), allowing for information regarding how far the support team member has traveled in total. Support team member user devices are operable to be any user device known in the art, such as phones, watches, smart glasses, and tablets. In one embodiment, the support team member-facing application is operable to integrate with a third-party fitness device or application through an application programming interface (API) that is operable to use health data from such devices or applications (e.g., total steps, distance traveled, etc.) to integrate this information into the support team member-facing application. In one embodiment, the platform also provides additional data, such as total time worked, time worked over a particular time period, total money earned from completing particular requests, average time taken for particular types of requests, number of patients interacted within by the support team member, numbers of particular types of requests completed, number of consecutive days (or other time periods) on which the support team member completed requests, and/or other information regarding a support team member's participation with the support team member-facing application.

In one embodiment, the support team member-facing application is able to receive custom personal daily goals (or goals over different periods of time, such as weekly, monthly, or annual) for numbers of requests to complete, number of hours to work, amount of money to earn, number of patients to interact with, amount of distance to travel, and/or other parameters. In one embodiment, the support team member-facing application presents progress toward that goal through one or more graphics (e.g., a ring diagram as shown in FIG. 12). In one embodiment, the platform automatically imposes a base goal for support team members on the platform (e.g., 10 requests a day for each support team member). In one embodiment, the base goal is able to be overwritten via received input from the support team member profile to increase or increase the goal number or to shift the goal to a different parameter (e.g., shifting the goal from number of requests to a total time worked). By providing visual information regarding progress toward goals for the support team member, the platform increases engagement by the support team members in completing those goals.

Figure 13:
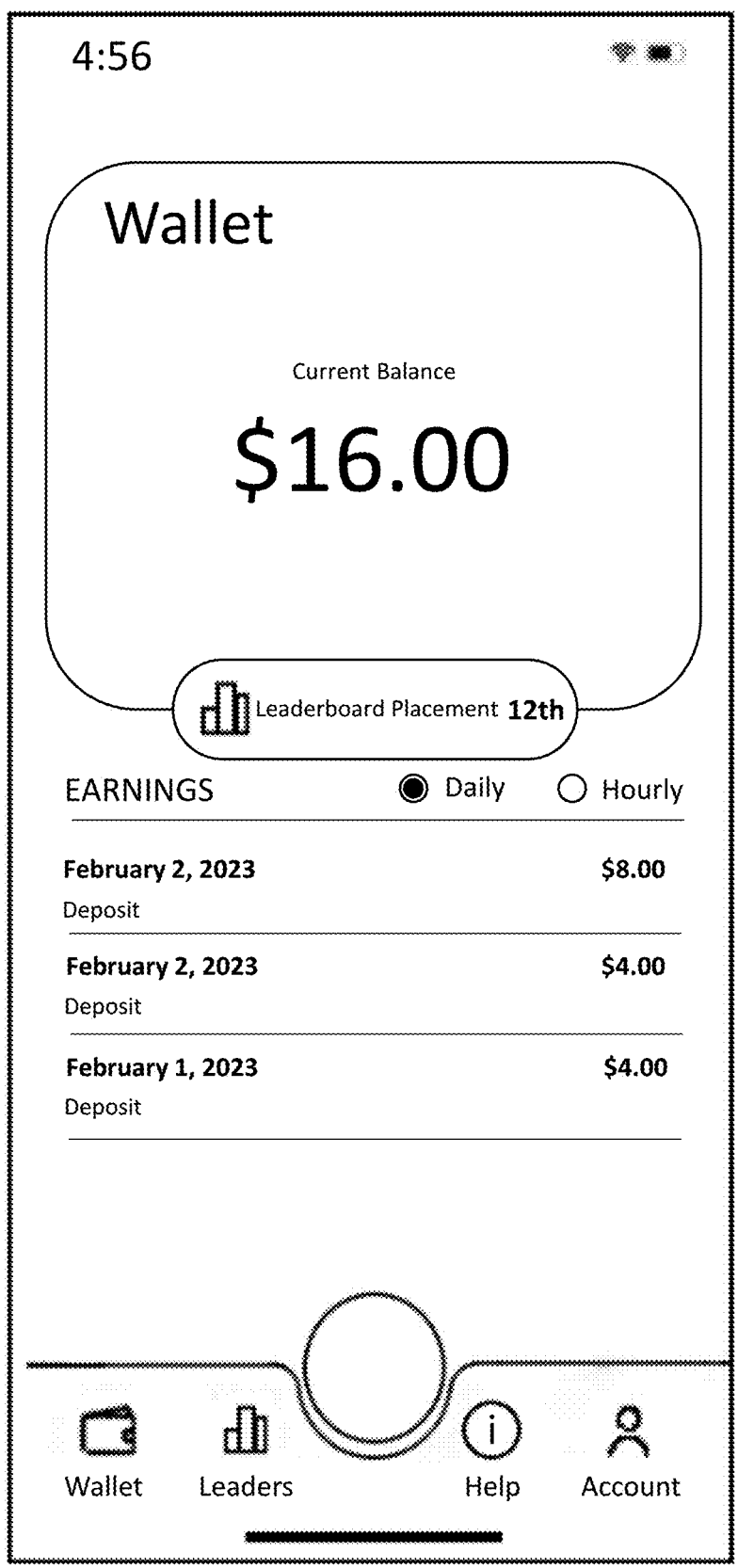
FIG. 13 is a graphical user interface for a wallet application for a support team member-facing application for managing support team member funds according to one embodiment of the present invention.

FIG. 13 is a graphical user interface for a wallet application for a support team member-facing application for managing support team member funds according to one embodiment of the present invention. In one embodiment, the support team member application is able to facilitate trade between a payer account (e.g., a patient financial account, an employer financial account, etc.) and a financial account associated with the support team member profile. The support team member application is then able to facilitate withdrawals from the financial account of the support team member profile to a personal financial account of the support team member and/or directly to cash or check in order to allow for actual payment of the support team member. The wallet application is able to be used for a traditional salaried model of the support team members, but is most applicable in the gig-model to allow for payments for individual requests completed to be collected on the support team member profile. In one embodiment, as shown in FIG. 13, the wallet functionality includes a list of deposits into the financial account (e.g., for each completed request, for each paycheck, etc.) and/or a list of withdrawals from the financial account to allow for more detailed analysis. In one embodiment, the payment list is able to be presented as an hour-by-hour breakdown and/or by a day-by-day breakdown, or via any other payment period (e.g., minute-by-minute, month-by-month, etc.).

Figure 14:
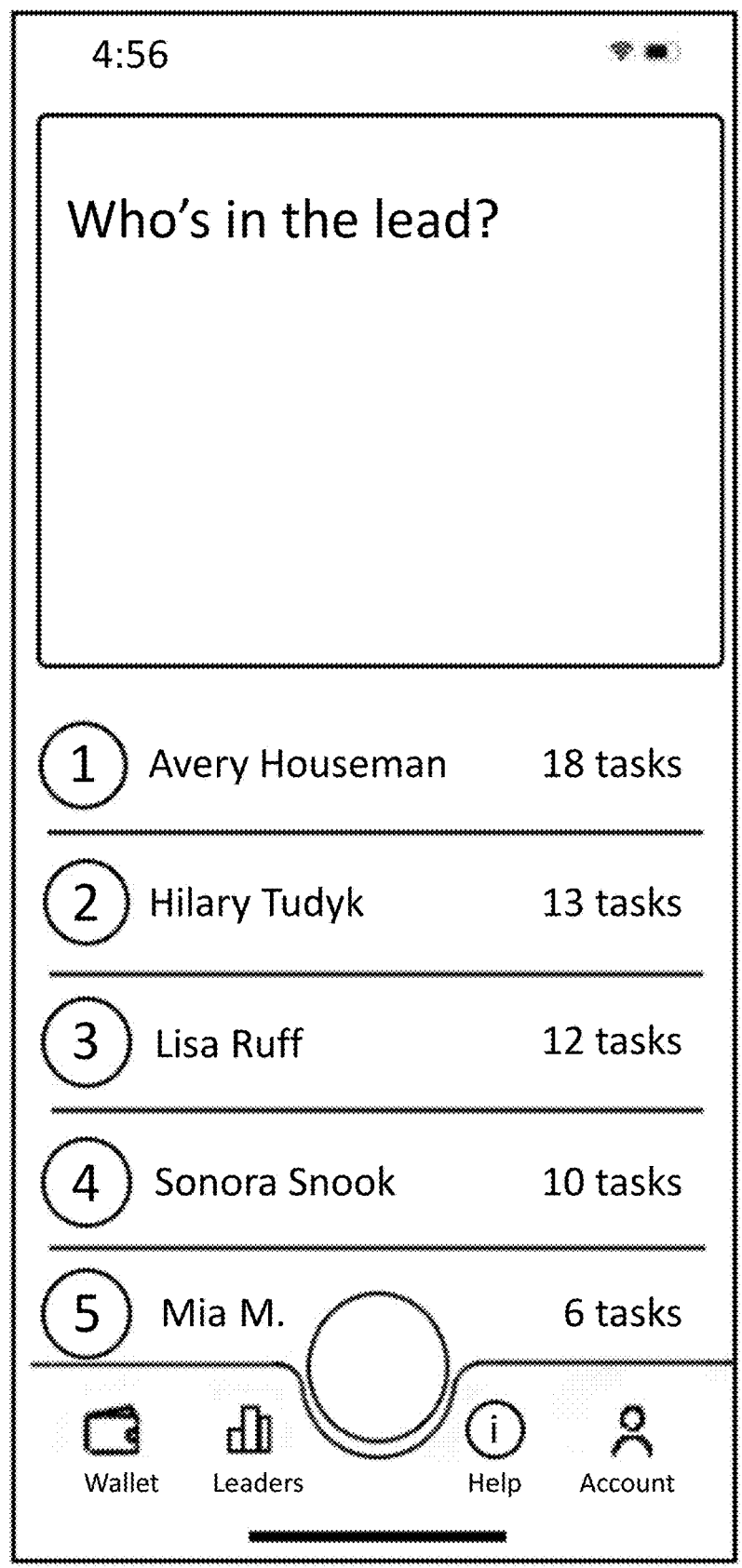
FIG. 14 is a graphical user interface for a leaderboard application for ranking support team members by streaks of completing commands and other factors for patients according to one embodiment of the present invention.

FIG. 14 is a graphical user interface for a leaderboard application for ranking support team members by streaks of completing requests and other factors for patients according to one embodiment of the present invention. In one embodiment, the support team member facing application provides a ranked list of support team members based on number of requests completed, current streak of completed requests, total value of requests completed, amount of time worked, and/or via one or more other metrics. The leaderboard provides for gamification of the employment and allows for a friendly competitive spirit to develop with regard to completing more requests and therefore more efficiently serving patient needs. In one embodiment, as shown in FIG. 14, the leaderboard interface is able to receive designations to like or otherwise react to a particular support team member's ranking on the leaderboard, allowing for expression of support between team members to encourage positivity.

One of ordinary skill in the art will understand that the present invention is able to have multiple different support team member-facing interfaces, configured for different types of support team members. For example, the ecosystem is able to include a concierge-facing application, specifically for concierges, a facility staff-facing application specifically for facility staff, or individual support team-facing interfaces for different support teams. These different applications are able to differ in terms of appearance, organization, or minor workflow differences, but that ultimately each is able to connect to the system and to each other to integrate into a single ecosystem.

Figure 15:
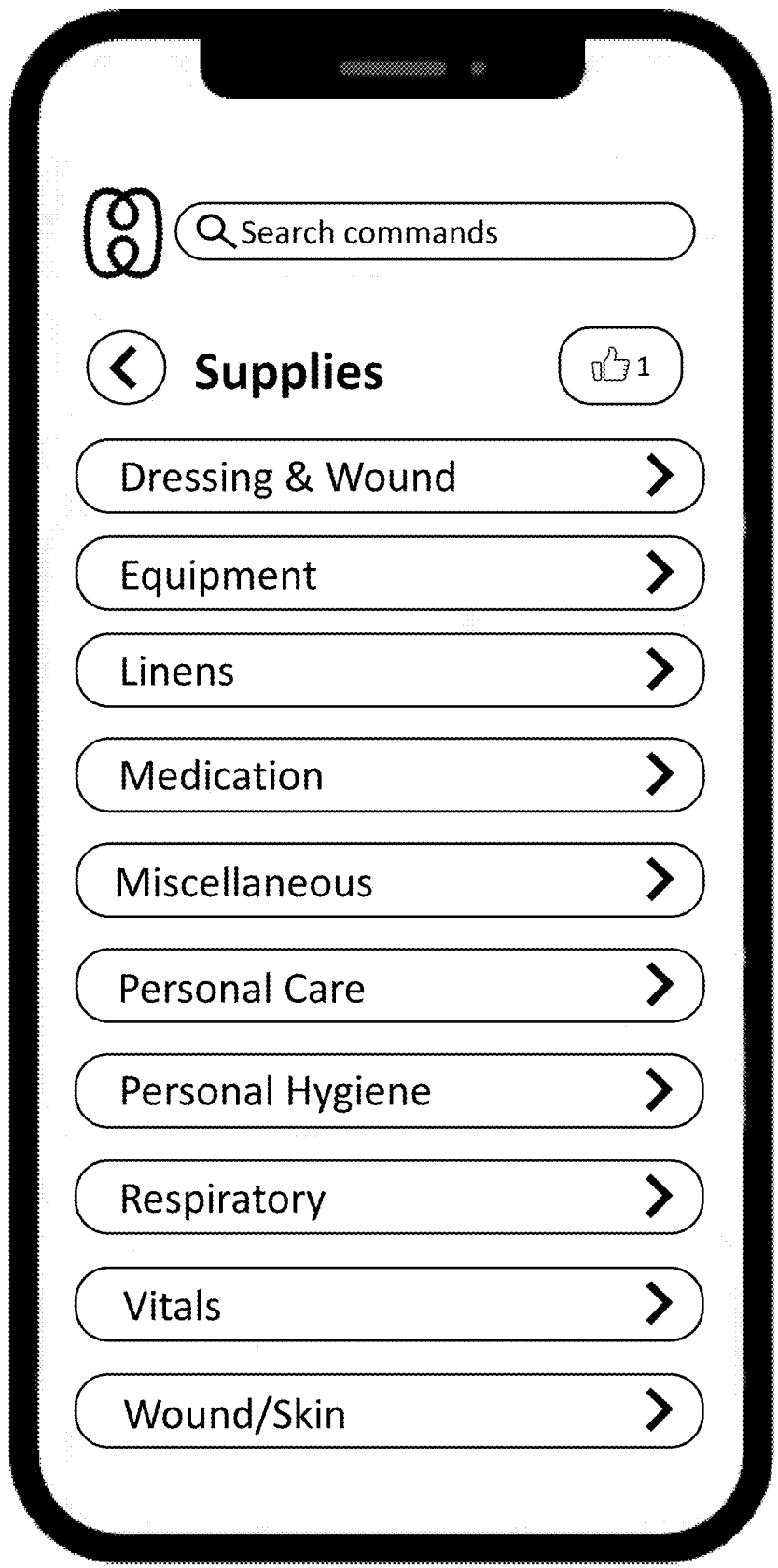
FIG. 15 is a graphical user interface for a menu for a provider team member-facing application for facilitating selecting commands used to create requests according to one embodiment of the present invention.

FIG. 15 is a graphical user interface for a provider team-facing application for facilitating selecting commands used to create requests according to one embodiment of the present invention. Through this provider team-facing application interface, the platform is able to receive requests for additional supplies from concierges or other provider team members for specific patient rooms, or for moving supplies between different non-patient room settings (e.g., different supply closets, nursing stations, etc.).

Alternatively, the interface shown in FIG. 15 is also able to be used as a supply management tool for keeping track of available supplies and restocking such supplies as needed. In one embodiment, the support team member-facing application includes or is integrated with an application for tracking quantities of supplies for a particular medical facility or a ward of a medical facility. In one embodiment, this supply tracker is able to integrate with the request system to automatically subtract items from the supply when requests are completed for particular patients and/or add items when regularly scheduled shipments of items come in. Furthermore, the supplies application is able to receive manual input from an administrator profile or a support team member profile to update the numbers or add new supply entries as necessary to correct potential discrepancies.

In one embodiment, the supply management and checking functionality is able to not only receive information regarding completed requests, but also provide information to the patient-facing application. For example, in one embodiment, if an item is noted to have run out, then a warning or notice is placed on the item within the patient-facing application that the item is sold out (or the button is removed or blocked from being interacted with) such that the patient is aware of the lack of availability. In one embodiment, when an item runs out of supply (or is close to running out of supply), then a warning notification is transmitted to an administrator profile and/or to one or more support team member profiles that the stock needs to be replenished. In one embodiment, warning notifications are only transmitted for particular designated items (e.g., items that have high importance to patient care).

Internal Wayfinder

Figure 16:
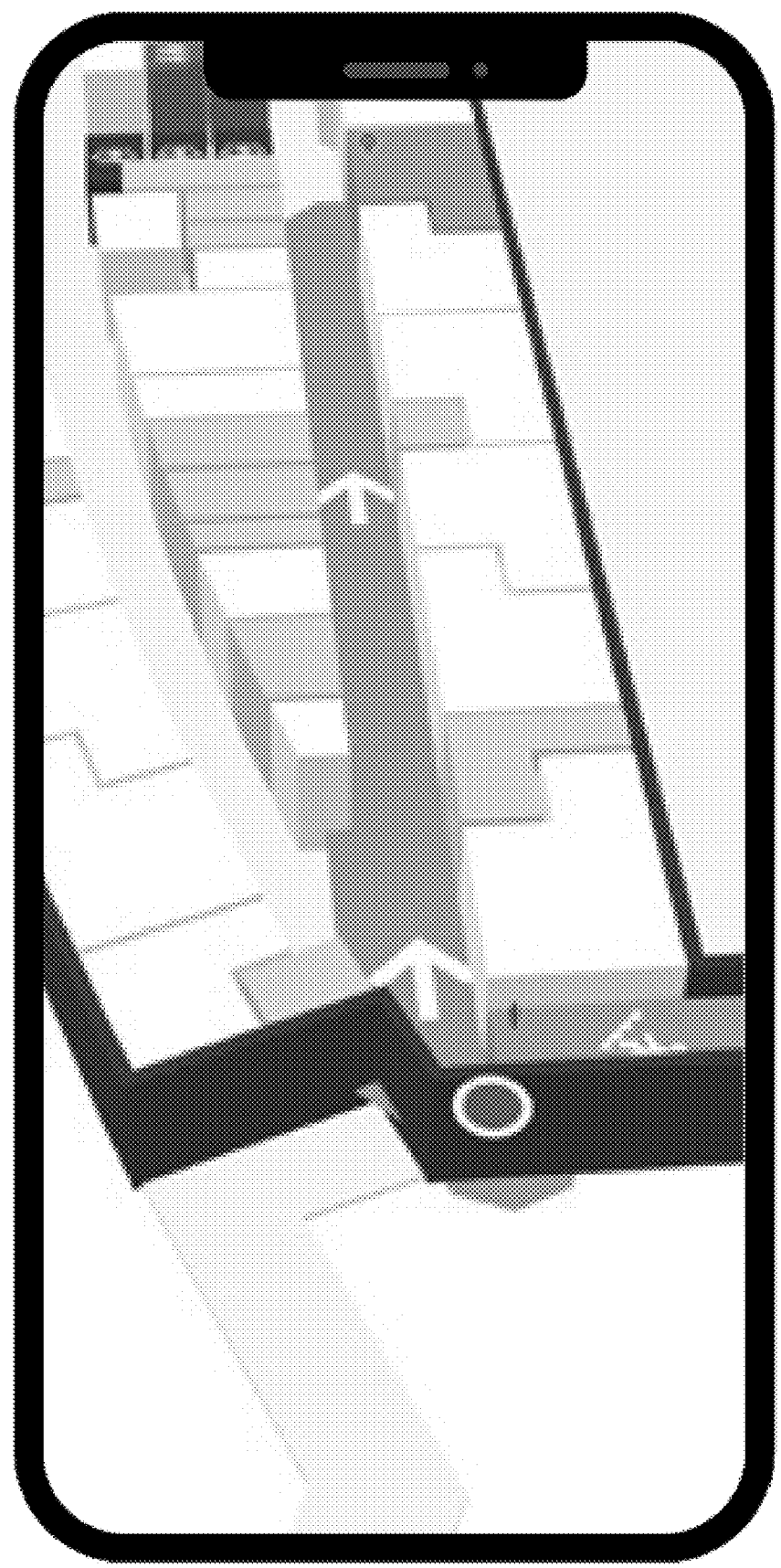
FIG. 16 is a graphical user interface for an in-facility guidance application according to one embodiment of the present invention.
Figure 17:
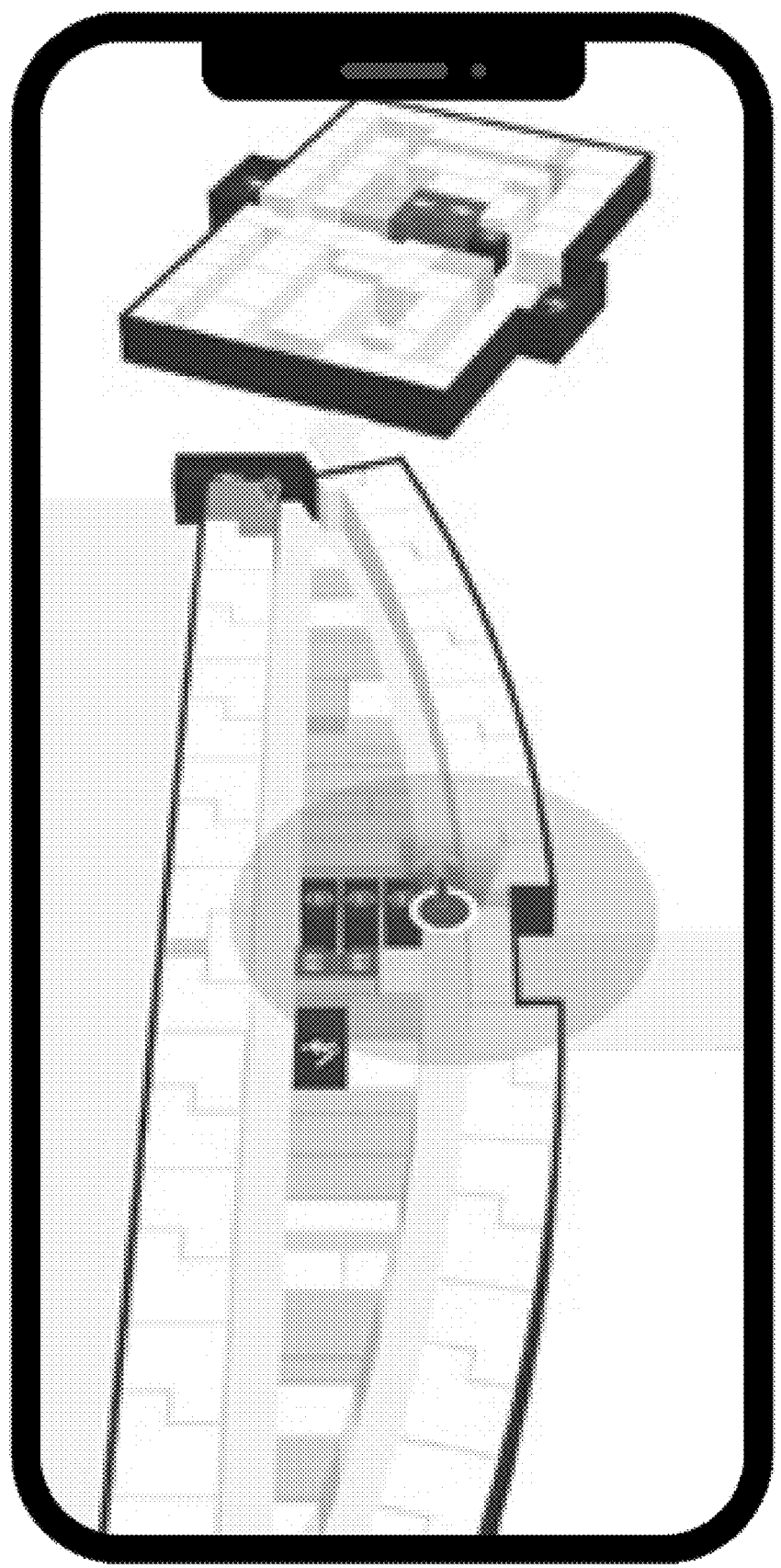
FIG. 17 is a graphical user interface for an in-facility guidance application according to one embodiment of the present invention.

FIGS. 16-17 show graphical user interfaces for an in-facility guidance application according to embodiments of the present invention. In one embodiment, the application utilizes a geolocation sensor in the user device to determine a present location of an individual utilizing the in-facility guidance application. The application is then able to receive a destination for a location within the facility (e.g., a room number, a patient name, etc.) and provides a recommended fastest allowed path through the facility for the individual to reach the desired location. The destination is operable to be generated based on a command or a request or is operable to be input manually by a user. For new team members, the wayfinding app shortens or eliminates training time spent learning the layout of a facility or environment. Traditionally, the training period for new team members to become oriented in a new environment such as a hospital or other medical facility such that the team members are able to navigate the new environment is approximately three weeks. By providing a wayfinding feature which includes the current position of a user in the environment, and which provides directions on a virtual representation of the environment to a destination within the environment, the present solution shortens or eliminates the training time for new team members for learning the new environment and increases efficiency for executing commands in an environment. This functionality is also useful for visitors to the facility, especially those that wish to, for example, a visit a particular family or friend patient and are not sure of where to go. The application provides far greater specificity of where to go than is provided in a traditional map act, which acts at a broader scale in outdoor environments, rather than an in-facility path.

In one embodiment, an artificial intelligence scheduling module of the server is operable to automatically set wellness check paths for one or more support team members and a schedule for when to perform such walks. These walks are useful for allowing for more particular monitoring of patient conditions and to distribute support team members to allow them to more easily respond to requests. In one embodiment, wellness check paths are set beforehand and are based on such factors are typical locations where a support team member is located, patients the support team member has most commonly interacted with, ratings provided by particular patients for particular support team members, and/or satisfaction ratings by support team members in interacting with particular patients. Additionally, the paths are preferably designed to keep support team members distributed widely throughout the paths while allowing for the most efficient and comprehensive paths for the support team members to cover the facility. Alternatively, the system is able to receive manually set paths and schedules for walks from an administrator profile. In one embodiment, particular patients are able to be manually or automatically designated as requiring additional care or additional check-ins, which automatically schedules additional visits to those patients for particular support team members.

FIG. 18 is a graphical user interface including a list of commands generated for a particular environment according to one embodiment of the present invention. In one embodiment, the server platform is operable to generate a list of all pending and/or pending and completed requests. This is useful, especially for operator or supervisor devices to manage these requests, understand the current division of workload within the system, and dynamically change or add commands as necessary. In one embodiment, the list includes an icon associated with the command, a name of the command, a description of the command, a service type of the command (e.g., item delivery, service request, emergency, etc.), a number of requirements in the command, a user or user type responsible for generating the command, a user or user type responsible for responding to the command, a designation of whether the command is part of a bundled command, an indication of whether the command is pending or completed, a time in which the command was generated, a time in which the command was completed, and/or other information. In one embodiment, each entry in the list includes a selectable button for allowing a user device to edit an individual command. In one embodiment, the list includes a search interface for ease of finding specific commands or command types, wherein the search interface is able to search across one or multiple fields of the command entries. In one embodiment, the list interface includes a click-selectable button for generating new commands.

FIG. 19 is a graphical user interface for managing a bundled command for a single room according to one embodiment of the present invention. A bundled command includes a plurality of subcommands, representing individual requests, all of which must be completed to satisfy the bundle command. A common use of the bundled command is for set routines, such as onboarding a new patient, preparing a room for a new patient, or cleaning a room after a patient leaves, but one of ordinary skill in the art will understand that bundle commands are not limited to these applications.

The bundled command interface includes a list of subcommands constituting the bundled command, including a name and/or description of the subcommands, quantities of the subcommands that need to be performed, and/or an order in which the subcommands are to be executed. In one embodiment, the interface is operable to accept inputs to delete individual subcommands, add additional subcommands, and/or move individual subcommands up or down in the order. In one embodiment, the interface is operable to receive an input to save changes made to the bundled command.

Figure 20:
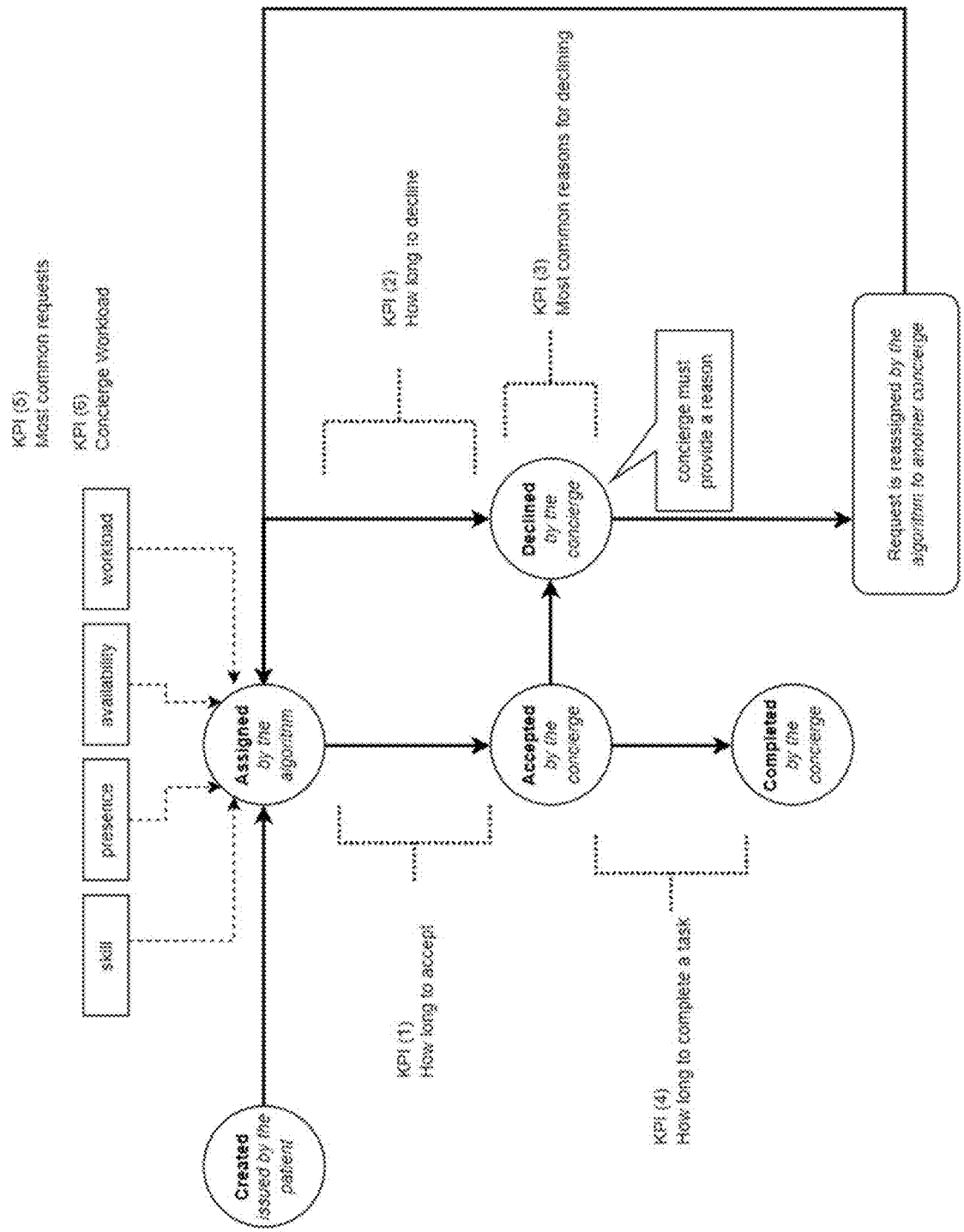
FIG. 20 is a schematic diagram for the delegation of requests generated by a patient device according to one embodiment of the present invention.

FIG. 20 is a schematic diagram for the delegation of requests generated by a patient device according to one embodiment of the present invention. According to the present invention, a request is generated by a patient device or a provider team device. The request is then assigned by the artificial intelligence module to one or more concierges (or other support team members) based on skills of each concierge (or support team member), which concierges (or support team members) are present and actively working, availability of concierges (or support team members), workload of concierges (or support team members), and/or additional factors. The requests are then able to be accepted or declined (or accepted and subsequently declined) by the one or more concierges. If the requests are accepted, they are then completed by the one or more concierges. If the requests are declined, then the platform automatically transmits a prompt to the one or more concierge devices for a rational for the decline. After receiving a decline from the one or more concierges, the artificial intelligence module of the platform then automatically reassigns the request to one or more additional concierges and continues this process until the requests are accepted and completed.

The server platform is operable to track several different key performance indicators (KPIs) associated with this process. In one embodiment, the KPIs until average overall times for concierges to accept requests, average times for specific concierges to accept requests, average overall times for concierges to decline requests, average times for specific concierges to decline requests, most common reasons for declining requests, average time between acceptance and completion of requests (overall for all concierges, for specific concierges, overall for all types of requests, for specific types of requests, etc.), most common request types, and/or average concierge workload. These KPIs are able to be used as actionable data for updating the system, hiring additional concierges, or other key decisions associated with the platform.

Figure 21:
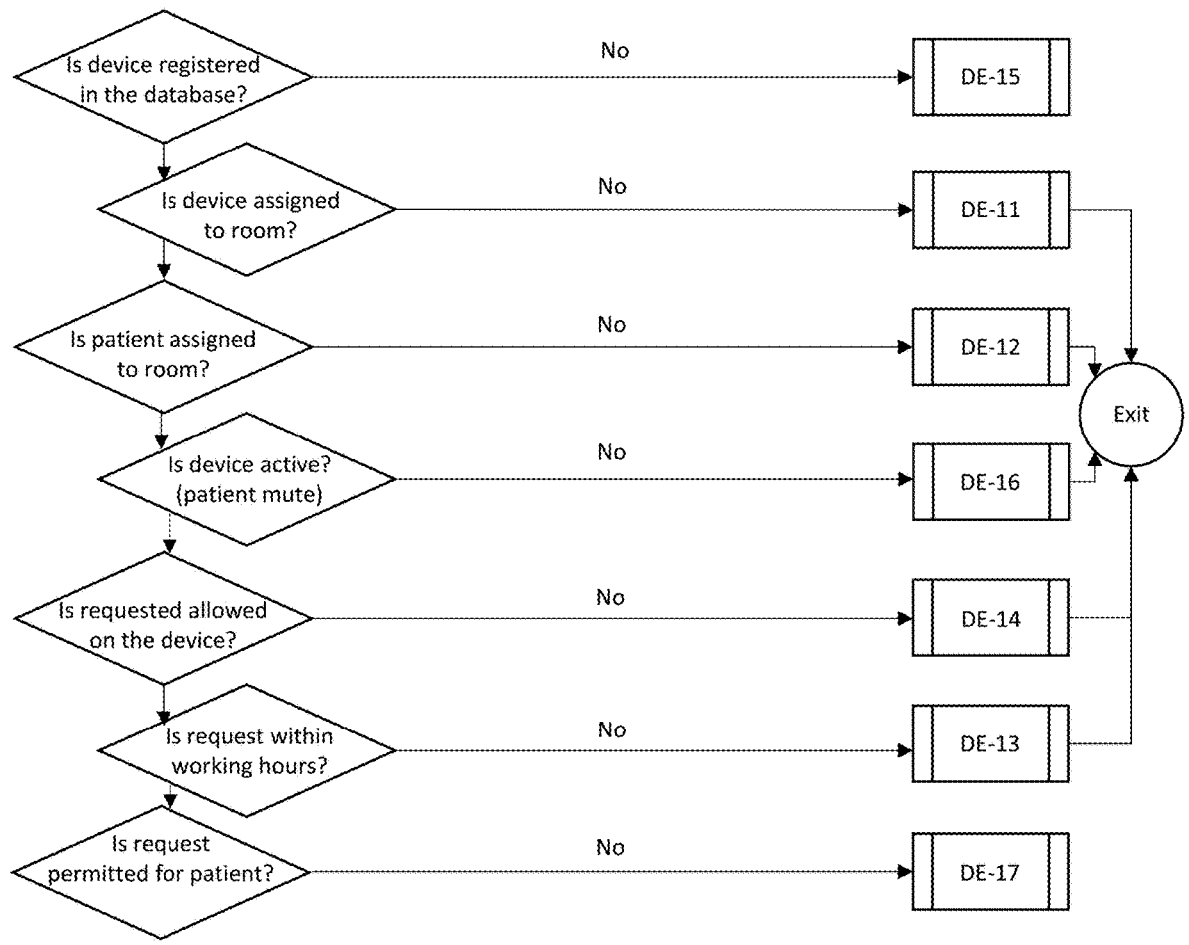
FIG. 21 illustrates a flow chart of pre-conditions for handling a request according to one embodiment of the present invention.

FIG. 21 illustrates a flow chart of pre-conditions for handling a request according to one embodiment of the present invention. In one embodiment, when a server platform receives a request, the sever platform automatically analyzes the requests to ensure that it meets several pre-conditions before routing it to an appropriate destination. Examples of pre-conditions to requests include, but are not limited to, whether the requesting device is registered in a database associated with the server platform (e.g., is on a registered or approved whitelist), whether the device has been assigned to a particular room, whether a patient has been assigned to the room where the device is assigned, whether the device is active (or is muted), whether the particular type of request is allowed for the device, whether the particular type of request is allowed for the associated patient, and/or whether the request is being made within working hours. If a request meets pre-conditions necessary for a particular system set-up, then the request is able to be routed to one or more appropriate support team members or the system is operable to prompt for additional information.

Figure 22:
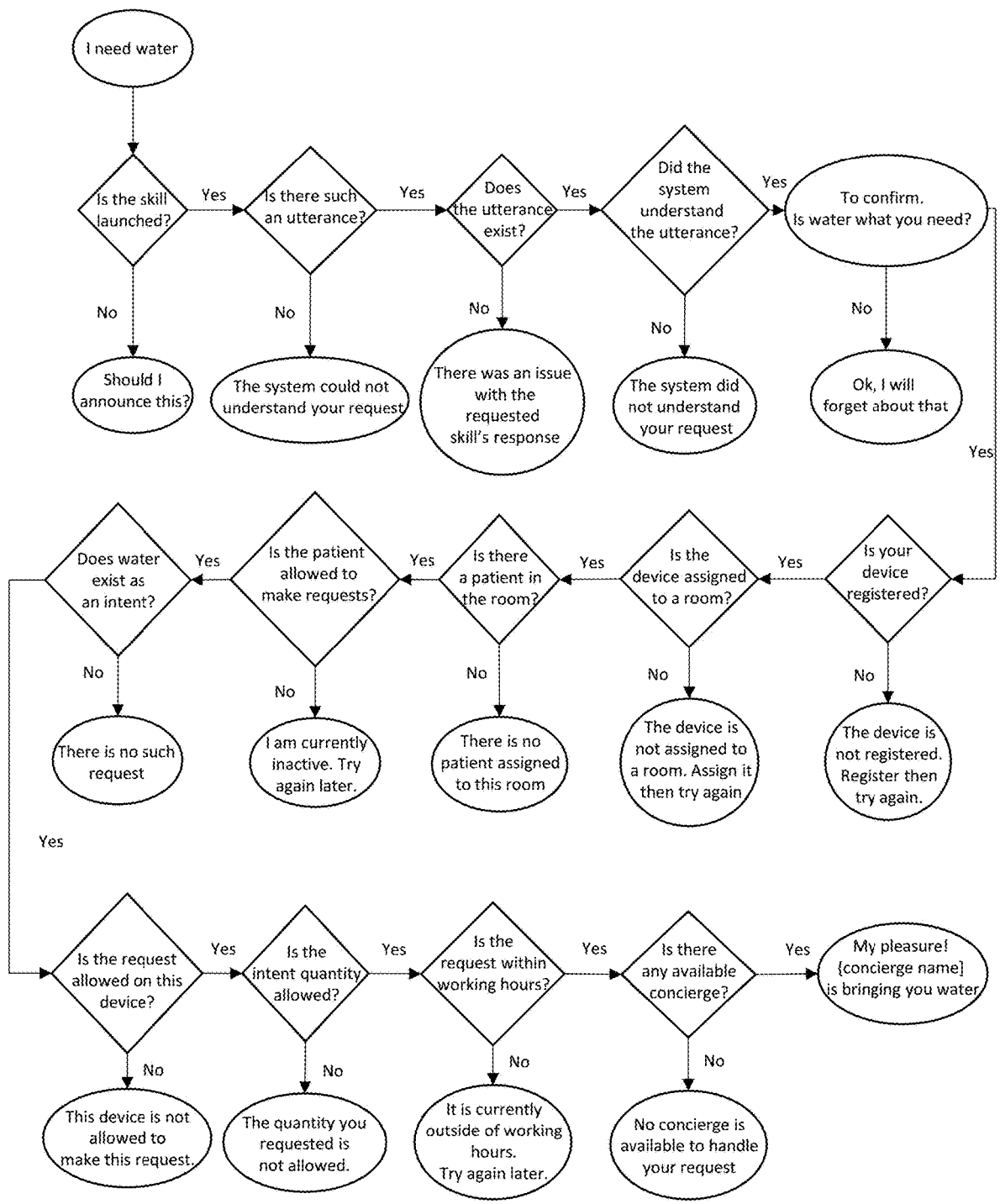
FIG. 22 illustrates a flow chart for handling and responding to requests according to one embodiment of the present invention.

FIG. 22 illustrates a flow chart for handling and responding to requests according to one embodiment of the present invention. With regard to the flow chart shown in FIG. 22, one of ordinary skill in the art will understand that not all of the steps of the flow chart need be present for all embodiments of the invention, and instead the invention is able to include more or fewer steps as needed or desired for a particular application. After receiving a request (e.g., for water), the platform first analyzes if the skill is launched and, if not, determines if to announce that it is unable to process the request. If the skill is launched, the platform determines if there is such an utterance and whether the utterance exists and, if not, provides a message stating that the system was unable to understand the request. The platform then determines if the system understood the utterance (e.g., is able to parse, using natural language processing, known vocabulary corresponding to the request), and if not, is able to inform the requester that the system did not understand the response. In one embodiment, the platform then generates a confirmation prompt for the device that send the request confirming that the platform's interpretation of the request is correct. If not, the platform automatically deletes the requests or reanalyzes the request and is then operable to receive additional requests.

If the confirmation is provided, the platform is able to check if the device is registered with the platform (e.g., is on an approved whitelist of an associated database of the platform). If the device is not registered, then a notification is provided to the device that the device is unregistered. If the device is registered, the platform checks that the device has been assigned to a room and that a patient has been designated for the room. If not, the platform sends a notification that a room or patient has not been associated with the device. If the device is properly associated with a room and patient, the platform checks whether the device or patient is permitted to make requests and, if not, sends a notification that the system is inactive and to try again later.

The platform is then able to check whether the received request corresponds to a valid request in the database via natural language processing or via matching the request to a list of valid requests. If not, the platform sends a notification that the request is not a valid or recognized request. Once the platform understands that a valid type of request is being made, the platform determines if the particular request is allowed for the specific requesting device or patient. This is useful for preventing a patient from ordering requests that are detrimental to their health (e.g., food they are allergic to). If the patient is not allowed to make the request, the platform is operable to send a notification that the request type is not allowed for the device or patient. If the request is generally allowed, the platform ensures that the intent quantity is also allowed. Whether a quantity for a request is allowed depends either on general limits on the platform (e.g., no device is allowed to order more than 12 food items at once) or limits associated with the specific device or patient (e.g., this patient is not able to order more than one dessert). If the amount is not allowed, then a notification is sent indicating that the quantity requested is not allowed. The platform then checks whether it is currently working hours and whether there is an available concierge to fulfill the request and sends a notification if these conditions are not met. If one embodiment, the platform checks if it is working hours by cross-referencing a schedule of working hours against a current time. In one embodiment, the platform checks if there is an available concierge by determining if any concierges are active, if any concierges have a workload below a preset threshold, and/or checking if concierges respond to a request within a predetermined timeframe. If all preconditions are met, then the system sends a confirmation message to the requesting device, confirming that the order will be completed.

Figure 23:
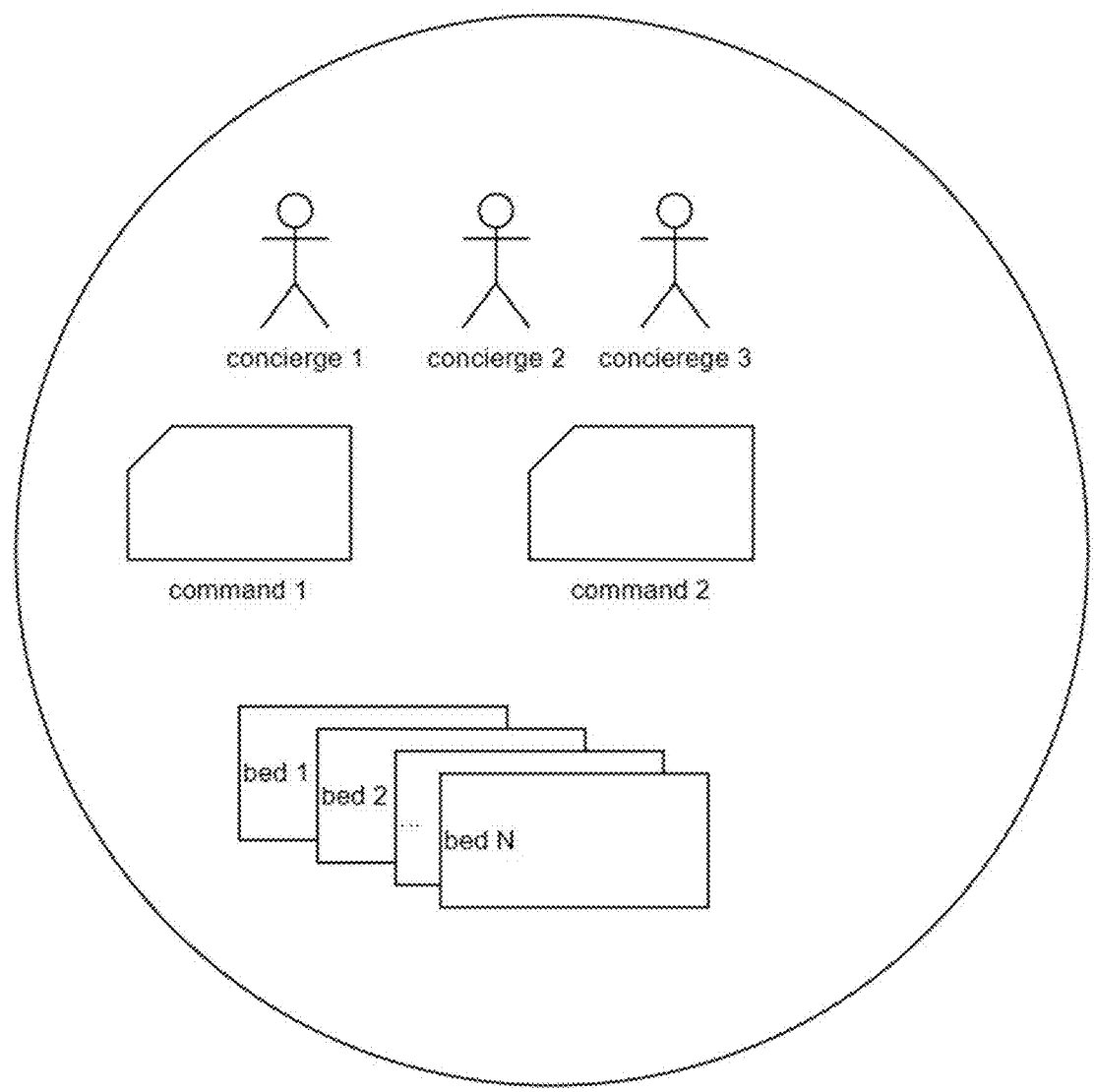
FIG. 23 illustrates a schematic diagram of a circle system for managing concierge activities according to one embodiment of the present invention.

FIG. 23 illustrates a schematic diagram of a circle system for managing concierge activities according to one embodiment of the present invention. The server platform is operable to receive designations or automatically generate designations of circular, or otherwise shaped, zones in which specific concierges, or support team members more broadly, are able to operate. In one embodiment, the zones are geographical designations, encompassing multiple patient rooms and/or other areas for which concierges are able to receive requests or for which the concierges are preferentially selected to complete requests. These areas are able to be redrawn as needed by an operator device or supervisor device (e.g., a medical facility manager) in order to reassess the domains in which specific concierges are able to work.

Figure 24:
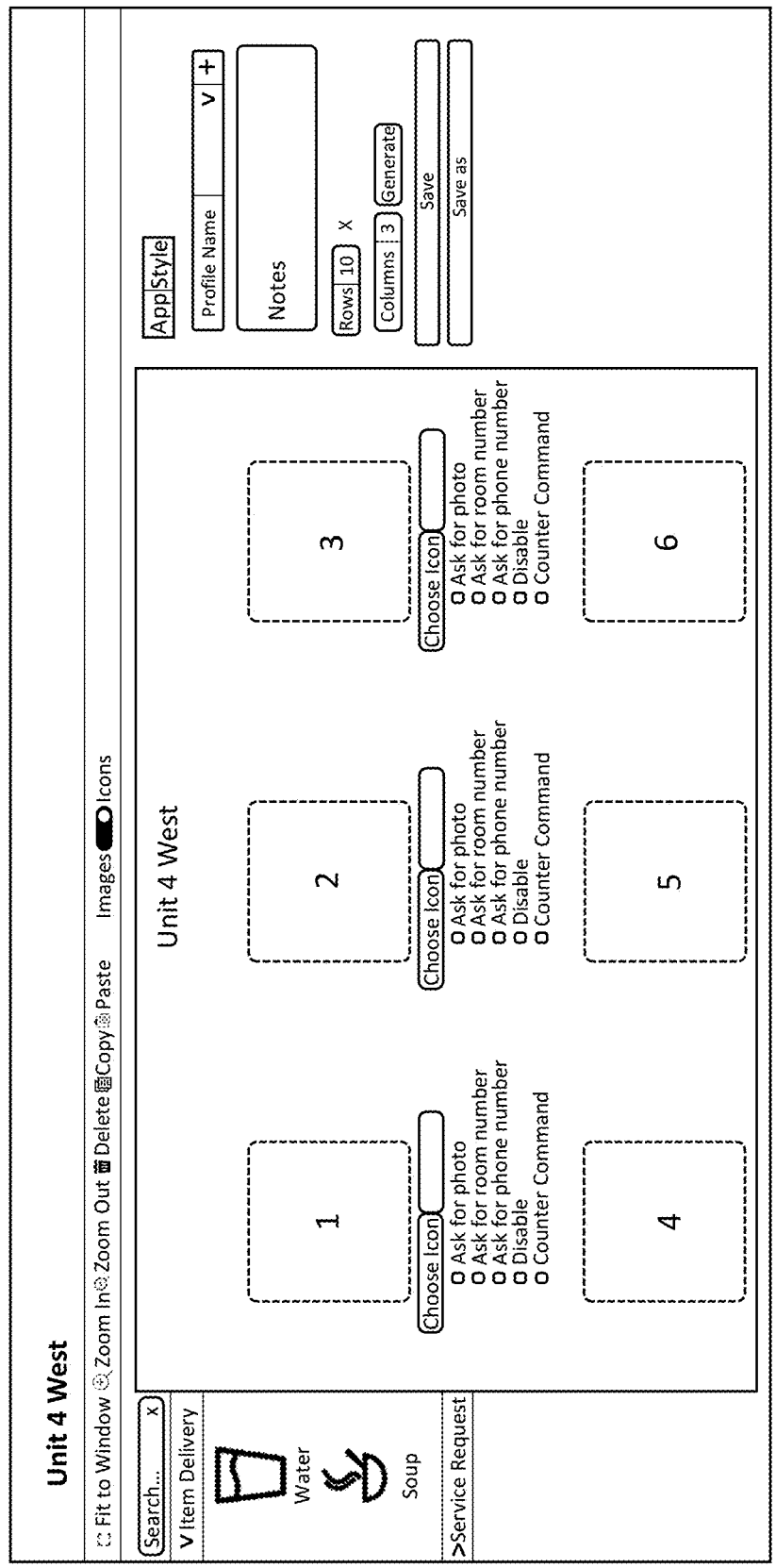
FIG. 24 illustrates a graphical user interface for customizing a provider team member-facing application according to one embodiment of the present invention.

FIG. 24 illustrates a graphical user interface for customizing a provider team-facing application according to one embodiment of the present invention. The interface is operable to include the ability to place a plurality of icons, including associated images or descriptions, as well as settings, such as to prompt for a room number, phone number, or photo, or to disable one or more permissions for the profile. This is able to be developed by an operator device or supervisor device in order to design a provider team-facing application, a concierge-facing application, or a patient-facing application that is customized for the particular needs of a particular facility.

In one embodiment, the support team member facing application includes an integrated social media functionality for facilitating, primarily, interactions and engagement between different support team members. In one embodiment, the social media functionality allows for uploading of videos by support team member profiles or provider team member profiles, leveraging connected video cameras on the support team member device or provider team member device, providing lessons or training for particular types of requests and/or for allowing uploading of words of encouragement, interesting and heartwarming stories, and/or other positive messages. Therefore, the functionality provides for both training and encouragement of other support team members and facilitates peer-based learning. In one embodiment, the application is operable to receive reactions (e.g., likes, laughs, etc.) for each video and/or comments for each video to encourage engagement. In one embodiment, the application allows support team member profiles to designate other support team member profile to subscribe to in order to allow them to receive content more easily from particular support team members and provider team members, able to include, for example, concierges and/or provider team members. In one embodiment, the social media functionality also includes embedded gamification tools, such as tracking a number of lessons made or number of lessons watched, a number of reactions to one's own videos, a number of comments on one's own videos, and/or other metrics that demonstrate interaction with the platform. The social media functionality of the present invention also provides for authorized users to create and provide content to all personnel or select groups of personnel. For example, a hospital executive account creates an inspirational video for all hospital employees and shares the video through the platform of the present invention. In another embodiment, a doctor user creates a text-based post sharing a story of how the doctor's team worked together to help a patient, and the text-based post is shared with all team members who completed a request for the patient's treatment or stay at the hospital.

In another embodiment, data and opinions about a medical facility is operable to be crowdsourced. Crowdsourcing includes different provider team members, support team members, concierges, patients uploading information about anything, especially lessons, and storing them in a database analogous to a library. The library is searchable by a variety of users. In one embodiment access to certain lessons is locked for a particular user. For example, access to lessons relating to medical care are not accessible to support team members or concierge users, but are only accessible to provider team members.

In one embodiment, the support team member-facing application is operable to integrate with one or more smart Internet-of-Things (IoT) devices to automatically respond to certain types of patient requests without requiring a support team member. By way of example and not limitation, the system is able to send commands to a television in a patient's room to automatically turn the television on, turn it off, change the channel, change the volume, or complete other requests. This is useful in situations where a patient is unable to reach a remote but does not require using up support team member or provider team member time for something capable of being performed automatically. In one embodiment, the system includes integrated software-based governors preventing certain changes from being made to particular devices (e.g., preventing television volume from going above a particular level). Other devices able to be integrated with the present invention include, but are not limited to, air conditioners, space heaters, patient beds (e.g., for adjusting position, firmness, temperature, and/or other parameters of the patient beds), curtains, automatic scent generators, and/or other devices. In one embodiment, particular devices are automatically disabled for particular patients (e.g., use of curtains are disabled for patients that need closer monitoring). In one embodiment, IoT devices including batteries are operable to automatically generate a battery change request when their battery lives drop below a preset threshold (e.g., 5%, 10%, etc.). Alternatively, for devices not connected via the network, battery change requests are automatically generated at preset time intervals based on an average battery life of the device.

In one embodiment, the system is able to integrate with one or more beacons for better establishing geolocation of patient or support team member user devices. Geolocation is operable to be determined according to any method known in the art such as global positioning system (GPS) technology. Furthermore, in one embodiment, the system automatically leverages geofencing technology to limit areas in which particular support team members move or limit options to patients to supplies or food from particular areas of the medical facility. The system is able to utilize any method of geofencing known in the art, including but not limited to, those described in U.S. Pat. No. 8,971,930 or U.S. Pat. No. 10,142,774, each of which is incorporated herein by reference in its entirety. Geofences are operable to be centroid geofences, such as circular geofences or circle geofences, or non-centroid geofences defined by a boundary that is dynamically defined within the system, such as those described in U.S. Pat. No. 11,870,861, which is incorporated herein by reference in its entirety. In one embodiment, one or more circles or polygons are used to virtually map a facility and personnel are grouped according to these circles or polygons. Requests are operable to be assigned according to the different groupings of personnel in each circle or polygon. These circles or polygons are operable to be customized by an administrator of a facility or operator device of the present invention, and provide for customizability of assignments for personnel within the facility. In one embodiment, personnel are not grouped merely according to a room, rooms, floors, or a wing, but rather their groupings are customized according to different needs of the medical facility. These polygons or circles are customizable in real-time or near real time such that personnel are operable to be assigned to different groups dynamically based on a need of a facility at any given time. Although groupings based on location have been described primarily with respect to one physical location, groupings are operable to be made across multiple environments or facilities, and are operable to include remote personnel. For example, transportation services team members are operable to serve multiple facilities based on a customized boundary created around these facilities. In another embodiment, administrative team members who serve the same facility or multiple facilities are grouped by time zones. In one embodiment, the artificial intelligence module of the present invention provides for automatically regrouping personnel based on requests assigned to certain personnel and a lack of requests assigned to other personnel. In another embodiment, the artificial intelligence module of the present invention is operable to suggest regrouping to a provider team member, an administrative team member, or other personnel with decision making authority, and regroup the personnel according to the instructions of that personnel.

In one embodiment, the platform checks and determines where a particular user device is relative to one or more geofences. In one embodiment, based on the location of the device relative to at least one geofence, the interface of the platform of the present invention changes to provide different available options, a difference appearance to the application, differing available support team members or provide team members, or in other ways. This means, for example, that for a supervisor or administrator entering a different facility or different floor, if such locations are defined by a geofence, that administrator is able to have a different list of available personnel to address a particular issue, different analytics regarding the performance of the particular location, and/or other information. In another example, for a provider team interface, the list of materials, or brands of materials, list of rooms, list of support team members, and other aspects are able to change as the provider team device enters a different geofenced-defined location.

The operator device or supervisor device of the present invention is operable to dynamically reassign personnel and send instructions to support team members and other personnel regarding relocation of supplies and specific directives for a given time period based on a health situation (e.g., a disease outbreak or a heightened risk of catching a disease for a time period, such as flu season), the presence of a VIP patient (e.g., a high profile figure such as a celebrity or politician), inventory shortage, or other factors. The operator device is operable to reassign any personnel of the present system according to the needs of the facility individually or in groups. The operator device is also operable to create custom commands and custom requests for users of the system of the present invention.

In one embodiment, the system is able to integrate with one or more third-party delivery or service providers via one or more APIs. Third-party integration effectively expands the network of service providers for a patient beyond the medical facility itself and also thereby expands the number of available services to be provided to the patient. By way of example and not limitation, the third-party providers are able to include food delivery, supply delivery, medication delivery, flower delivery, or other delivery services (e.g., GRUBHUB, DOORDASH, 1-800 FLOWERS, etc.), or care scheduling services (e.g., a cab service, UBER, LYFT, etc.) for scheduling transportation following a stay at the medical facility or for visitors to reach the patient.

In one embodiment, the system includes representational state transfer (REST)-based APIs, allowing for improved operational effectiveness and inter-system connectivity. In one embodiment, these REST-based APIs leverage Javascript Object Notation (JSON) files for efficient data exchange, and improved flexibility and interoperability across the platform. In one embodiment, the APIs are protected behind a gateway, orchestrating and securing data flow between component and external interfaces, which helps to maintain the integrity of the system.

In one embodiment, the system utilizes both relational and NoSQL databases, allowing for optimization of data handling and performance. This hybrid database approach allows for efficient processing of structured data and improved agility and scalability for large-scale datasets.

In one embodiment, the code used for the system is distributed across 70 different repositories, containing segments of the total code. This modular approach enhances organization and facilitates maintenance, updates, and collaborative development.

In one embodiment, the system includes over 800 different types of commands and is able to generate more different types.

The present invention also includes a family member interface or portal by which family members of patients are operable to provide instructions or notes to support team members. Currently, family members who visit patients in healthcare facilities provide notes and instructions to support team members at the facility in person. Family members who are remote from patients because they are travelling or live in another location are not able to currently provide instructions or notes to support team members efficiently and effectively. While the family member may call the healthcare facility, the family member often does not have direct contact with the relevant support team member(s) and instructions or notes from the family member are delayed. This causes patients to receive subpar treatment and unnecessary worry for family members regarding whether the patient is receiving adequate care. In one embodiment, the system is operable to designate specific other user profiles (e.g., family member profiles) as able to generate commands on behalf of a patient profile. This functionality provides for family members to provide instructions to support team members and other staff remotely for the benefit of a patient. For example, if a family member has a phone call or a video call with a patient and observes the patient is tired, the family member is able to instruct a support team member to prepare the patient for bed by dimming light and turning off electronics such as televisions. Presents or food are operable to be provided to the patient based on an instruction from a family member device in the event that family members, or other users, are unable to visit the patient. Provision of food, liquid, medication, or other items upon a command provided by a family member is helpful in ensuring the patient receives the best care possible because patients often express their true feelings and comfort level to family members more readily, and do not necessarily communicate their feelings, comfort level, or needs with support team members. This is especially useful in the event of low capacity, tired/sleeping, physically disabled, or otherwise incapacitated patients, for whom the family member is then able to care, without accessing the patient's device without their permission.

The present invention is useful not only for patients and facility caretakers, but also to insurance providers. In one embodiment, the platform automatically generates and transmits insurance reports regarding the stay to a designated insurance provider for the patient.

Industrial Applications

The present invention is not limited to only a paradigm of associating commands generated by patients, or customers or clients, with provider team members or support team members, but any system in which many workers are communicating, especially for applications with complex situations and more numerous interactions between different types of workers. One example of an environment outside of healthcare in which the present system is applicable is a factory, or other industrial plant.

Types of employees important in factories include line workers (including assemblers, fabricators, etc.), machine operators, foremen, stationary engineers, supervisors and other management personnel, occupational safety monitors, quality assurance officers, maintenance workers, machinists, cleaning staff, power engineers, cafeteria workers, waste treatment officers, food technologists, and/or other workers, often dependent on the specific food produced by the factory. The platform of the present invention is able to receive requests for a particular request (e.g., repairing a specific piece of machinery or equipment) and allocate employees to complete that particular request, or receive requests for fulfillment of a particular job (e.g., serving as a maintenance worker for a particular factory or area over a longer period of time, such as a day or month) and allocate employees to serve in the role of the requested job. The platform is able to assign requests only to employees actively serving at the job site (e.g., the factory), employees at the job site with a particular role, or employees across a broader ecosystem of multiple job sites, depending on the particular embodiment.

According to the present invention, the platform is operable to generate employee profiles based on input from one or more user devices associated with the employees, or via information onboarding from a supervisor device. In one embodiment, employee profiles include basic information regarding the employee, including a name, an age, contact information (e.g., email address or phone number), gender, sex, race, height, weight, relationship status, medical history, one or more interests, and/or other information. In one embodiment, the employee profiles include one or more designated skills, including both hard skills and soft skills, education level, potential roles, restricted roles, and/or certifications (e.g., certified electrician, air-conditioning certifications, etc.) of the employee. In one embodiment, employees are not necessarily limited to only a single function within the facility. By associating the employee with potential roles and certifications, the artificial intelligence module of the platform is able to dynamically allocate the employee to different situations. In one embodiment, the platform will not allocate an employee to a particular job unless it is included under the "potential roles" of the employee on the employee profile. In one embodiment, the platform will not allocate an employee to a particular job if it included under the "restricted roles" of the employee on the employee profile. In another embodiment, the employee profiles do not include potential roles and instead the platform is able to allocate automatically based on the known skills and certifications of the employee relative to those required for each job or request.

In one embodiment, rather than having a list of roles or skills for each employee, all employee profiles have a rating system (e.g., star rating) for each individual role or skill, reflecting that skills for completing each request exist not on a binary, but along a spectrum. This still allows the system to preferably not assign certain types of requests to employees who are not qualified, as those employees will have a rating of 0 (or otherwise critically low level). In one embodiment, requests or jobs, as a rule, are not assigned to employees with below a preset threshold rating of one or more related skills. In one embodiment, skill or role ratings for each employee profile are updated in real-time, such that manual assessments of satisfaction with completion of a request or job by the employee profile by another employee profile or supervisor profile allows are factored in by the artificial intelligence module for future allocations of that employee.

The platform is operable to generate and store analytics regarding a time to complete particular requests by each employee or team of employees and, optionally, store this information as part of an employee profile. In one embodiment, time to complete requests is based on a time when a request was transmitted relative to a time when a request was marked as complete by one or more profiles and/or when one or more sensors automatically detected that the request was completed. Based on these performance analytics, the artificial intelligence module is better able to determine which employees to assign requests for specific requests or jobs, especially in the event that multiple employees are free when multiple requests or jobs are generated and therefore proper matching of the different requests or jobs to the different employees is critical. The platform is further able to not only analyze average productivity of a particular employee on a particular job, but also the productivity of each employee over time. In this way, the platform is able to automatically generate requests reassigning employees to different jobs (e.g., rearranging the order of line workers) after a preset amount of time, driven by the highest productivity periods for each employee when they are assigned a new job.

Some requests of the industrial embodiment are able to be received by the platform from at least one employee profile. One example of an employee profile-generated type of request is a maintenance request for a machine or component that an employee notes is not working properly or at all. Some requests are able to be received by the platform from at least one supervisor profile. One example of a supervisor profile-generated type of request is a general request for additional workers to work on a particular production line (i.e., in response to increased demand for a particular type of product). These types of requests are able to be generated by voice command into a user device, though, as with the healthcare embodiments mentioned above, the system is also able to receive requests not via voice command (e.g., via text input, selection of one or more GUI input buttons, etc.).

In one embodiment, the platform is operable to directly integrate with one or more external messaging systems (e.g., social media messaging systems, email accounts, cellular messaging systems, etc.) and is operable to use natural language processing on incoming messages to generate requests at the prompting of external parties. For example, if emails are received requesting participation in a demand response program or to supply distributed energy resources for an electric power grid operator, then a request is generated for a power engineer to analyze these requests and choose to participate or not.

However, the system also allows for requests to be automatically generated. One paradigm for automatic generation of requests is for requests to be generated on a regular basis (e.g., every day, every month, etc.) or after a preset amount of time (i.e., time-based requests), based on administrator user settings for request generation. Examples of time-based requests that are able to be regularly generated include periodic reports (e.g., quality assurance reports, financial reports, etc.), regularly scheduled meetings (e.g., performance reviews), regular cleaning, and/or other requests. In one embodiment, time-based requests include periodic requests for a power engineer to renegotiate energy rates with at least one power grid operator. Additionally, requests are able to be automatically generated when an event is registered as having occurred (i.e., event-driven requests), either by manual input from at least one employee or supervisor profile or via automatic detection from one or more cameras or sensors. Examples of event-driven requests include generating requests for quality inspections after a run of a product is completed, requests for hosting a training meeting when a new employee is hired, and/or other events, especially those that are not at predictable, preset intervals and therefore cannot be adequately represented by merely the time-based requests.

A third type of automatically generated request is based on sensor input (and preferably based on analysis of the sensor input by the artificial intelligence module) from one or more cameras or sensors distributed throughout a factory or job site or attached to particular machinery. Examples of sensors able to generate data to prompt these types of requests include photo cameras (e.g., visual cameras, infrared cameras, ultraviolet (UV) cameras, etc.), video cameras (e.g., visual cameras, infrared cameras, ultraviolet (UV) cameras, etc.), LiDAR sensors, temperature sensors (e.g., thermocouples, resistance temperature detectors (RTDs), negative temperature coefficient (NTC) thermistors, etc.), humidity sensors, pH sensors, analyte sensors (e.g., operable to detect the presence or absence of particular molecules), pressure sensors, weight sensors, voltage sensors (e.g., resistive voltage dividers, capacitive voltage dividers, optical voltage sensors, inductive voltage sensors, fiber optic voltage sensors, etc.), current sensors (e.g., galvanometers, shunt resistors, Rogowski coils, etc.), motion sensors (e.g., passive infrared (PIR) motion sensors, microwave motion sensors, contact sensors, area reflective sensors, ultrasonic sensors, tomographic sensors, etc.), light-level sensors (e.g., photoresistors, photodiodes, phototransistors, etc.), water-detection sensors, radiation sensors, accelerometers, gyrometers, magnetometers, Hall effect sensors, seismometers, and/or other types of sensor. These sensors are able to be paired with one or more wireless antennas operable to communicate data from the sensors to the server platform, or are directed wired to the server platform such that the artificial intelligence module of the server platform is able to process the data and generate requests based on the data.

In one embodiment, the platform is operable to generate requests based on changes to local, state, or federal legislation or based on updated administrative government protocols (i.e., legislation-driven requests). In one embodiment, the server platform automatically updates with new legislation (e.g., via a web crawler, via direct API integration, etc.) or is manually updated with new legislation. The artificial intelligence module is operable to use natural language processing to determine 1. whether a given piece of legislation or administrative changes is relevant to the functioning of a job site or factory, 2. when the legislation takes effect, and 3. what changes need to be implemented in order to adhere to the legislation or administrative changes, and subsequently generates a request for one or more employees to address the functioning of the factory or job site in response to this legislation (e.g., via changing factory layout, adjusting employee hours, changing components or ingredients for products, changing maintenance check intervals, etc.).

In one embodiment, requests include an indication of a type of request (e.g., manually entered, time-based request, event-driven requests, sensor-driven requests, legislation-driven requests, etc.) and/or a basis on which the particular request was generated (e.g., a specific type of sensor that indicated an issue).

In one embodiment, the artificial intelligence module is operable to generate average baseline measurements for one or more of the sensors, such that abnormal readings are able to be more readily detected. In one embodiment, the average baseline measurements are time or seasonally based (i.e., the expected baseline changes based on the time of day or year). In one embodiment, the average measurements are not time or seasonally based. In one embodiment, sensor-driven request triggers are rules-based. For example, if the sensors readings are above a preset threshold number of standard deviations above the constructed baseline, then a related request is automatically generated to address the abnormality. In another embodiment, the sensor-driven request triggers are based on artificial intelligence-based analysis of the readings of the sensor, the change in those readings over time, the readings relative to other sensors, and/or other factors.

One implementation of sensor-driven request generation is for sensors embedded in or on machinery in the factory. For example, sensors within a given piece of equipment detect a current drop and a large temperature increase within a piece of equipment. In this embodiment, the platform automatically generates a request to one or more employees experienced with maintenance (or more particular to maintenance of that particular device) and/or a request to call the fire department for a potential factory fire. In another example, sensors detect lack of water being supplied to a machine dependent on water supply to function. In this embodiment, depending on the location of the sensor that detected the change in water flow, the platform is able to automatically generate a request for either a relevant maintenance worker and/or a request for a plumbing specialist.

However, sensor-driven requests according to the present invention are not only be generated based on sensors attached to machinery. In one embodiment, at least one light-level sensor in the factory or job site or external to the factory or job site is operable to detect when light levels are low, in conjunction with machinery sensors indicating one or more devices are still running. In response to this, the platform is operable to generate at least one request for the running devices to be turned off as appropriate. Additional examples include sensor detection of temperature or humidity within a factory or job site, or temperature or humidity analysis of an area outside a factory or jobsite. Based on these sensor readings, the server platform is able to automatically generate requests for air conditioning specialists to modify settings of the air conditioner either for comfort of employees within a facility and/or for maintaining appropriate conditions for machinery or products. In one embodiment, the platform receives manual input or otherwise automatically detects a new type of product is to be produced that is temperature sensitive. The platform is operable to automatically generate a request to an air conditioning specialist without needing to actually measure or fully rely on temperature sensor data.

Visual analysis of a factory or job site via visual sensors (e.g., photo cameras, video cameras, LiDAR sensors) also provides a potential source for data for sensor-driven requests. In one embodiment, the artificial intelligence module is operable to perform machine vision techniques using the visual sensor data, such as segmentation, to identify particular items shown within the visual sensor data. This allows the platform to develop not only a visual baseline reading for the entire environment captured by the visual sensor data as a whole, but also visual baselines for individual segments objects or components of objects within the environment. Machine vision-based abnormality detection by the artificial intelligence module is then able to detect when a particular machine, building part, component, floor, or other area becomes dirty, and automatically generate a request to a cleaner to clean the detected object. Furthermore, this baseline analysis is able to be used to determine if certain machines are broken or acting abnormally, allowing a request to be generated to a maintenance worker familiar with the particular device. The visual baseline analysis is also able to detect larger changes to the factory or job site, such as a structure collapse or fire, allowing for generation of maintenance requests, requests to contact emergency services, requests for medical aid, etc.

In one embodiment, based on sensor data from one or more visual sensors, the server platform is able to automatically detect a likely workplace safety event (e.g., based on an individual falling, detecting the presence of blood, or other factors). In response to a likely workplace safety event, the platform is operable to automatically generate requests for medical aid, requests for allocation of the job performed by the injured employee, and/or requests to legal counsel to assess the situation.

In one embodiment, the server platform is operable to receive put from one or more profiles or sensor data (e.g., visual sensor data, weight sensor data for a container containing several of the relevant parts, etc.) indicating that a particular part or component or ingredient necessary for manufacturing is low or empty. The server platform is operable to automatically generate requests for an inventory management specialist to order or other obtain additional parts or components to prevent a halt in the manufacturing. Alternatively, the server platform is operable to determine an average rate of usage of particular parts, components, or ingredients and automatically set a time-based request to be generated at a preset time before the supply is suspected to be exhausted based on the rate of usage.

In one embodiment, the platform is operable to receive manual input or sensor input (e.g., visual sensor data, weight sensor data, etc.) indicating that a threshold number of goods/products have been produced and that the goods and products must be transported for distribution or storage. In one embodiment, in response, the server platform generates a request to at least one foreman to assess that the threshold number has actually been exceeded and/or to one or more forklift drivers or other transportation workers to move the load to a different location. Furthermore, in one embodiment, a request is generated for at least one quality assurance officer to analyze the quality of the goods and assess whether they achieve legal and company standards. Similarly, the server platform is able to receive manual input or sensor input (e.g., visual sensor data, weight sensor data) indicating that one or more storage facilities for goods are full or close to being full. In response, the server platform is operable to generate a request to at least one administrator profile for ordering additional storage and/or for allocating additional products to distribution channels to prevent overcrowding or waste of products.

In one embodiment, the platform is operable to receive manual input or sensor input (e.g., visual sensor data, etc.) indicating that one or more specific goods is defective, misshapen, or otherwise does not need minimum tolerance standards. In this embodiment, the server platform is operable to automatically generate a request to a machinist to fix the component to reach tolerance levels and/or to discard the component if it is unable to be fixed.

In one embodiment, the server platform is in communication with a request display board positioned visibly above a factory or job site floor. In one embodiment, the server platform is operable to automatically update the request display board with names of employees assigned to different requests or jobs, allowing for easier checking by the employees of their appointed role.

In one embodiment, where a factory or job site includes an associated cafeteria, the platform is operable to generate requests when particular food items or food supplies are low based on sensor data (e.g., visual sensor data, weight sensor data, etc.) and/or based on input from one or more profiles. In one embodiment, the platform is operable to receive requests from one or more employee profiles for particular food items from the cafeteria or from external locations and to automatically assign chefs and/or transporters of the food as required.

In one embodiment, the platform is operable to receive requests for guidance in operating a particular machine or producing a particular type of good from one or more employee profiles. The platform is operable to assign one or more stationary engineers or other employee to respond to these questions and/or address associated issues.

In one embodiment, in response to input from one or more profiles or automatically based on sensor-data (e.g., visual sensor data), the platform is operable to detect that a new product type is being created. In response, the platform is operable to assign one or more packaging engineers to adjust labels for packaging or settings of a packaging or labeling machine to adjust to the shape and size of the new product being created.

Education Applications

Another example of an environment outside of healthcare in which the present system is applicable is in educational environments, such as schools or universities.

Types of employees important in schools include superintendents, deans or headmasters, principals, other administrative staff, full-time teachers, substitute teachers, cafeteria workers, janitorial workers, sports coaches, nurses, police officers, information technology (IT) specialists, and/or other workers. In addition, students make up the central focus of school environments.

Similar to the healthcare and industrial settings, the platform of the present invention is able to receive requests for a particular request (e.g., fixing a classroom projector) and allocate employees to complete that particular request, or receive requests for fulfillment of a particular job (e.g., substitute teacher for a particular classroom) and allocate employees to serve in the role of the requested job. The platform is able to assign requests only to employees actively serving at the school, to employees at the school with a particular role, or to employees across a broader ecosystem of multiple schools, depending on the particular embodiment.

According to the present invention, the platform is operable to generate employee profiles based on input from one or more user devices associated with the employees, or via information onboarding from a supervisor device. In one embodiment, employee profiles include basic information regarding the employee, including a name, an age, contact information (e.g., email address or phone number), gender, sex, race, height, weight, relationship status, medical history, one or more interests, and/or other information. In one embodiment, the employee profiles include one or more designated skills, including both hard skills and soft skills, education level, potential roles, restricted roles, and/or certifications (e.g., teaching degree, advanced placement (AP) certified, etc.) of the employee. In one embodiment, employees are not necessarily limited to only a single role within the school. By associating the employee with potential roles and certifications, the artificial intelligence module of the platform is able to dynamically allocate the employee to different situations. In one embodiment, the platform will not allocate an employee to a particular job unless it is included under the "potential roles" of the employee on the employee profile. In one embodiment, the platform will not allocate an employee to a particular job if it included under the "restricted roles" of the employee on the employee profile. In another embodiment, the employee profiles do not include potential roles and instead the platform is able to allocate automatically based on the known skills and certifications of the employee relative to those required for each job or request.

In one embodiment, rather than having a list of roles or skills for each employee, all employee profiles have a rating system (e.g., star rating) for each individual role or skill, reflecting that skills in completing each request exist not on a binary, but along a spectrum. This still allows the system to preferably not assign certain types of requests to employees who are not qualified, as those employees will have a rating of 0 (or otherwise critically low level). In one embodiment, requests or jobs, as a rule, are not assigned to employees with below a preset threshold rating of one or more related skills. In one embodiment, skill or role ratings for each employee profile are updated in real-time, such that manual assessments of satisfaction with completion of a request or job by the employee profile by another employee profile or supervisor profile allows are factored in by the artificial intelligence module for future allocations of that employee.

In one embodiment, the platform is also able to generate child profiles, including information regarding the child, such as a name, an age, contact information (e.g., email address or phone number), gender, sex, race, height, weight, medical history, allergy information, one or more interests, and/or other information. In one embodiment, the platform is operable to automatically integrate into (e.g., via APIs) one or more classwork submission and coursework completion programs, allowing the platform to receive copies of a child's work or data summarizing results for the child, which are able to be associated with the child profiles. In one embodiment, child disciplinary records are also able to be manually or automatically added to a child profile. The platform is operable to perform natural language processing to analyze the disciplinary record in order to analyze whether there are one or more other students with which a child collaborated in committing a disciplinary offense or against which the child behaved aggressively. Alternatively, one or more other children with which a child interacts positively are also able to be noted in the child profile.

Some requests of the educational embodiment are able to be received by the platform from at least one employee profile. One example of an employee profile-generated type of request is a request for repair of a projector in a classroom or another related IT issue. Some requests are able to be received by the platform from at least one supervisor profile. One example of a supervisor profile-generated type of request is a general request for a substitute teacher for a particular classroom. These types of requests are able to be generated by voice command into a user device, but, as with the healthcare and industrial embodiments mentioned above, the system is also able to receive requests not via voice command (e.g., via text input, selection of one or more GUI input buttons, etc.).

Another type of request, typically generated by supervisor profile is to assign substitute teachers or replacement teachers to classrooms where the previous teachers is on leave or has resigned. In one embodiment, the artificial intelligence module automatically assigns teachers to classrooms based on factors such as a home location for the teachers, whether the teacher has previously been assigned to a particular school or classroom, feedback ratings of a teacher's previous association with the school or classroom, and/or qualifications (e.g., grade level, subject, advanced course, AP material, etc.).

In one embodiment, requests include those generated by an employee profile associated with a teacher or other personnel for additional school supplies. In this instance, the platform is operable to generate a request for an administrator or other employee to obtain additional orders of the relevant school supply.

One request type able to be facilitated automatically or manually by the present invention is the allocation of different children to different homerooms or other classes. In one embodiment, the artificial intelligence module of the present invention is operable to assign children to classrooms based on attributes of each child's profile. For example, in one embodiment, the artificial intelligence module preferentially associates children who have similar overall grade point averages (GPAs) and/or similar scores in a particular subject, to ensure the classroom is able to be tailored specifically to children within a particular GPA cohort. In one embodiment, the artificial intelligence module prevents or minimizes the chance of children from being assigned to classrooms with other children with which the children have previously gotten in trouble or acted aggressively against.

The system also allows for requests to be automatically generated. One paradigm for automatic generation of requests is for requests to be generated on a regular basis (e.g., every day, every month, etc.) or after a preset amount of time (i.e., time-based requests), based on administrator user settings for request generation. Examples of time-based requests that are able to be regularly generated include periodic reports (e.g., classroom budget reports, classroom grade reports, etc.), regularly scheduled meetings (e.g., parent-teacher organization (PTO) meetings, parent teacher conferences, staff meetings, etc.), regular cleaning, and/or other requests. Additionally, requests are able to be automatically generated when an event is registered as having occurred (i.e., event-driven requests), either by manual input from at least one employee or supervisor profile or via automatic detection from one or more cameras or sensors. Examples of event-driven requests include grading deadlines for exams after the exam is administered.

In one embodiment, requests for additional help or tutoring are able to be received from at least one child profile or at least one employee profile (e.g., a teacher). Additionally, requests for additional help or tutoring are able to be automatically generated by the artificial intelligence module based on previous grade results associated with the child profile and/or based on natural language processing-based assessment of assignments submitted by the child profile to a platform associated with and integrated with the software platform of the present invention. For example, if the artificial intelligence module notes a large amount of a particular type of mistake over time for a child profile (e.g., grammar mistakes, handwriting mistakes, mathematical mistakes, overly short responses relative to the remainder of the class), then a request is automatically generated for a tutor to help the child with the particular relevant type of issue.

In one embodiment, the platform is operable to directly integrate with one or more external messaging systems (e.g., social media messaging systems, email accounts, cellular messaging systems, etc.) and is operable to use natural language processing on incoming messages to generate requests at the prompting of external parties. For example, if emails are received requesting a tutoring session, a patent-teacher conference, or a staff meeting, then a request is generated for a teacher to attend a meeting at a time designated in the communication.

In one embodiment, the platform is operable to generate requests when particular food items or food supplies are low based on sensor data (e.g., visual sensor data, weight sensor data, etc.) and/or based on input from one or more profiles. In one embodiment, the platform is operable to receive requests from one or more employee profiles or one or more child profiles for particular food items from the cafeteria or from external locations and to automatically assign chefs and/or transporters of the food as required. In one embodiment, the platform is operable to automatically prevent or reject orders for food that include ingredients that violate one or more dietary restriction rules in the child or employee profiles.

In one embodiment, the platform is operable to generate requests for bus drivers or other drivers for helping take children to and from a school. In one embodiment, the requests for bus drivers are automatically set to be sent at a specific time, based on the starting times and release times of the schools. In one embodiment, a schedule for all classes with number of attendees to be provided to the system and the artificial intelligence module automatically generates a request for bus drivers to drive on a specific path, wherein the path is based on a correlation between home locations for the child profiles and initial class start time for those child profiles. This allows to system to maximize efficiency in routing and requesting bus drivers. In one embodiment, the schedule associated with each child profile includes not only classes, but extracurricular times, allowing for requests to be generated for bus drivers beyond those requested at the typical class release time.

In one embodiment, one or more visual sensors (e.g., photo cameras, video cameras, LiDAR sensors, etc.) within or around a school are operable to transmit data to the server platform. In one embodiment, based on machine vision performed by the artificial intelligence module of the server platform, violent or aggressive events or instances of accidental injury at the school are able to be automatically generated. Based on identification of violent or aggressive events or accidental injury, requests are able to be generated for one or more nurses or other first aid providers and/or for one or more law enforcement officers. Alternatively, rather than being automatically generated, requests for responses to violent or aggressive events or instances of accidental injury are also able to be generated by an employee profile or child profile and transmitted to the server platform.

Staffing Center Applications

The present invention is able to be applied to a variety of staffing center applications, beyond specific applications in industrial, educational, or healthcare settings.

The platform of the present invention is able to receive requests and allocate employees to complete that particular request, or receive requests for fulfillment of a particular job and allocate employees to serve in the role of the requested job. The platform is able to assign requests only to employees actively serving at the job site, employees at the job site with a particular role, or employees across a broader ecosystem of multiple job sites, depending on the particular embodiment.

According to the present invention, the platform is operable to generate employee profiles based on input from one or more user devices associated with the employees, or via information onboarding from a supervisor device. In one embodiment, employee profiles include basic information regarding the employee, including a name, an age, contact information (e.g., email address or phone number), gender, sex, race, height, weight, relationship status, medical history, one or more interests, and/or other information. In one embodiment, the employee profiles include one or more designated skills, including both hard skills and soft skills, education level, potential roles, restricted roles, and/or certifications. In one embodiment, employees are not necessarily limited to only a single function within a job site. By associating the employee with potential roles and certifications, the artificial intelligence module of the platform is able to dynamically allocate the employee to different situations. In one embodiment, the platform will not allocate an employee to a particular job unless it is included under the "potential roles" of the employee on the employee profile. In one embodiment, the platform will not allocate an employee to a particular job if it included under the "restricted roles" of the employee on the employee profile. In another embodiment, the employee profiles do not include potential roles and instead the platform is able to allocate automatically based on the known skills and certifications of the employee relative to those required for each job or request.

In one embodiment, rather than having a list of roles or skills for each employee, all employee profiles have a rating system (e.g., star rating) for each individual role or skill, reflecting that skills in each request exist not on a binary, but along a spectrum. This still allows the system to preferably not assign certain types of requests to employees who are not qualified, as those employees will have a rating of 0 (or otherwise critically low level). In one embodiment, requests or jobs, as a rule, are not assigned to employees with below a preset threshold rating of one or more related skills. In one embodiment, skill or role ratings for each employee profile are updated in real-time, such that manual assessments of satisfaction with completion of a request or job by the employee profile by another employee profile or supervisor profile allows are factored in by the artificial intelligence module for future allocations of that employee.

The platform is operable to generate and store analytics regarding a time to complete particular requests by each employee or team of employees and, optionally, store this information as part of an employee profile. In one embodiment, time to complete requests is based on a time when a request was transmitted relative to a time when a request was marked as complete by one or more profiles and/or when one or more sensors automatically detected that the request was completed. Based on these performance analytics, the artificial intelligence module is better able to determine which employees to assign requests, especially in the event that multiple employees are free when multiple requests or jobs are generated and therefore proper matching of the different requests or jobs to the different employees is critical. The platform is further able to not only analyze average productivity of a particular employee on a particular job, but also the productivity of each employee over time. In this way, the platform is able to automatically generate requests reassigning employees to different jobs after a preset amount of time, driven by the highest productivity periods for each employee when they are assigned a new job.

Some requests of the industrial embodiment are able to be received by the platform from at least one employee profile. Some requests are able to be received by the platform from at least one supervisor profile. These types of requests are able to be generated by voice command into a user device, but, as with the healthcare, industrial, and educational embodiments mentioned above, the system is also able to receive requests not via voice command (e.g., via text input, selection of one or more GUI input buttons, etc.).

In one embodiment, the platform is operable to directly integrate with one or more external messaging systems (e.g., social media messaging systems, email accounts, cellular messaging systems, etc.) and is operable to use natural language processing on incoming messages to generate requests at the prompting of external parties.

The system also allows for requests to be automatically generated. One paradigm for automatic generation of requests is for requests to be generated on a regular basis (e.g., every day, every month, etc.) or after a preset amount of time (i.e., time-based requests), based on administrator user settings for request generation. Additionally, requests are able to be automatically generated when an event is registered as having occurred (i.e., event-driven requests), either by manual input from at least one employee or supervisor profile or via automatic detection from one or more cameras or sensors.

A third type of automatically generated request is based on sensor input (and preferably based on analysis of the sensor input by the artificial intelligence module) from one or more cameras or sensors distributed throughout a factory or job site or attached to particular machinery. Examples of sensors able to generate data to prompt these types of requests include photo cameras (e.g., visual cameras, infrared cameras, ultraviolet (UV) cameras, etc.), video cameras (e.g., visual cameras, infrared cameras, ultraviolet (UV) cameras, etc.), LiDAR sensors, temperature sensors (e.g., thermocouples, resistance temperature detectors (RTDs), negative temperature coefficient (NTC) thermistors, etc.), humidity sensors, pH sensors, analyte sensors (e.g., operable to detect the presence or absence of particular molecules), pressure sensors, weight sensors, voltage sensors (e.g., resistive voltage dividers, capacitive voltage dividers, optical voltage sensors, inductive voltage sensors, fiber optic voltage sensors, etc.), current sensors (e.g., galvanometers, shunt resistors, Rogowski coils, etc.), motion sensors (e.g., passive infrared (PIR) motion sensors, microwave motion sensors, contact sensors, area reflective sensors, ultrasonic sensors, tomographic sensors, etc.), light-level sensors (e.g., photoresistors, photodiodes, phototransistors, etc.), water-detection sensors, radiation sensors, accelerometers, gyrometers, magnetometers, Hall effect sensors, seismometers, and/or other types of sensor. These sensors are able to be paired with one or more wireless antennas operable to communicate data from the sensors to the server platform, or are directed wired to the server platform such that the artificial intelligence module of the server platform is able to process the data and generate requests based on the data.

In one embodiment, the platform is operable to automatically update a resume of an employee based on previous work experience executed via the platform. In this way, the platform better facilitates the user finding additional jobs through the platform or externally from the platform. In one embodiment, the platform is operable to match one or more employees to a job listing posted publicly or submitted by an employer directly to the platform via natural language processing (NLP) of a job description or job requirements and automatically generating a list of likely required traits for the particular job and matching those likely required traits with traits of the employee.

The system is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), transformers, and/or natural language processing (NLP). The system is operable to use any of the aforementioned learning techniques alone or in combination.

Further, the system is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The system is preferably operable to recommend and/or perform actions based on historical data, external data sources, ML, AI, NNs, and/or other learning techniques. The system is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

Figure 25:
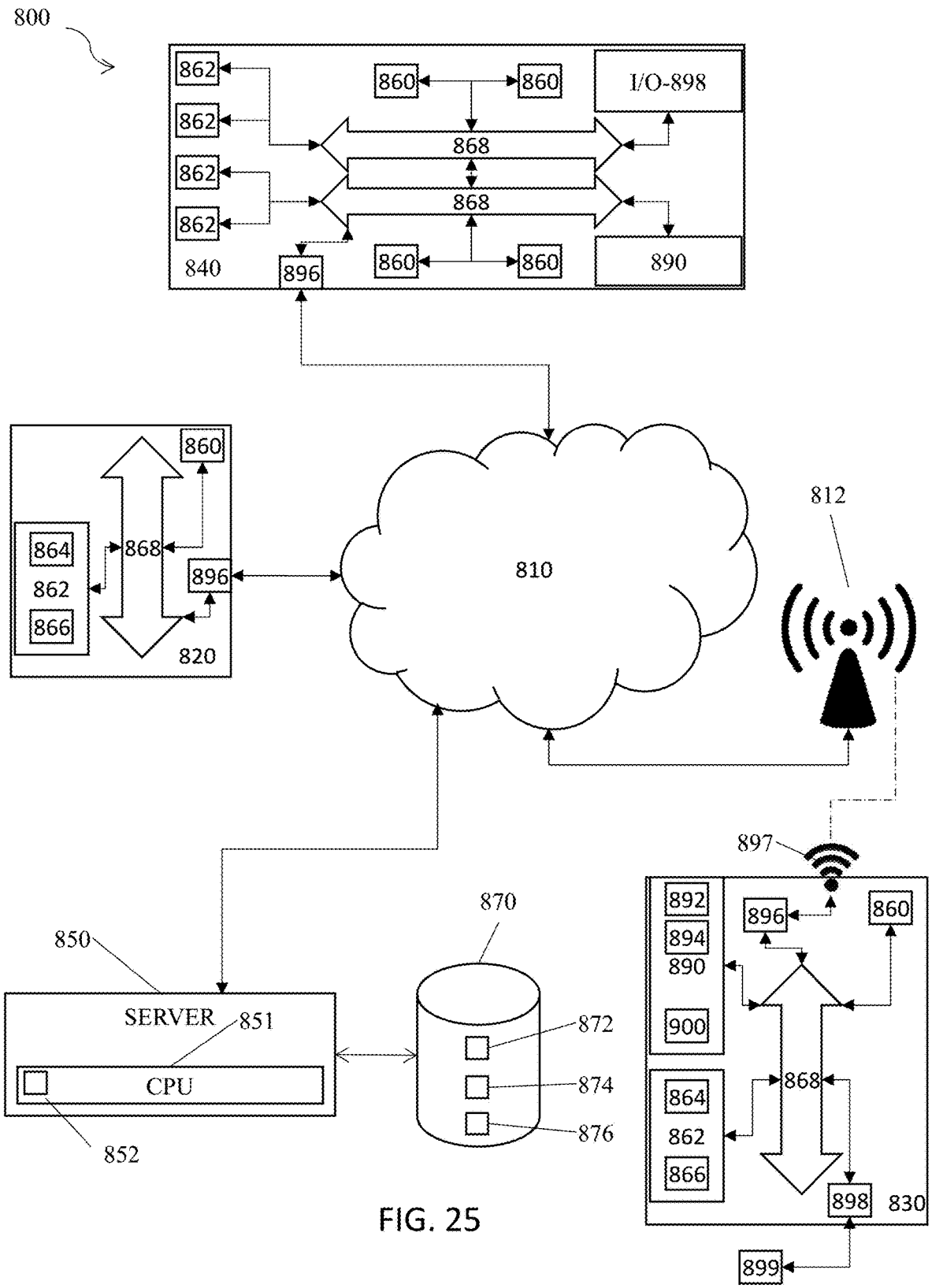
FIG. 25 is a schematic diagram of a system of the present invention.

FIG. 25 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 25, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 25, is operable to include other components that are not explicitly shown in FIG. 25, or is operable to utilize an architecture completely different than that shown in FIG. 25. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for managing requests and workflows to serve patients in a medical facility, comprising:
    at least one server in network communication with at least one support team device, at least one provider team device, at least one administrative team device, at least one family member device, and/or at least one patient device; and
    at least one operator device;
    wherein the at least one server is operable to generate a 3D internal map of a facility;
    wherein the at least one server is operable to receive one or more requests from the at least one patient device, the at least one administrative team device, the at least one provider team device, the at least one family member device, the at least one support team device, and/or from an artificial intelligence-based algorithm that predicts patient needs and/or creates routine care-maintenance requests implementing medical facility patient care policy;
    wherein an artificial intelligence module of the at least one server analyzes the one or more requests from the at least one patient device, the at least one administrative team device, the at least one provider team device, the at least one family member device, the at least one support team device, and/or the artificial intelligence-based algorithm and determines to which of the at least one support team device to send the one or more requests;
    wherein the at least one server is operable to automatically determine a number of requests in a queue of requests for the at least one support team device;
    wherein the at least one server is operable to automatically determine if the number of requests in the queue of requests is unbalanced based in part on the number of requests in the queue and projected length of time associated with the one or more requests from the at least one patient device;
    wherein the projected length of time associated with the one or more requests include an average length of time associated with completing the one or more request based on experience, skill set associated with the at least one support team device, and time to travel from a location of the at least one support team device to a location of the at least one patient device;
    wherein the at least one server is operable to automatically reroute the one or more requests based on the location of the at least one support team device not moving towards the location of the at least one patient device after a period of time;

wherein the at least one support team device to which the one or more requests are sent is based, at least in part, on a location, urgencies of the one or more requests, types of the one or more requests, and/or a sender of the one or more requests;

wherein the at least one server is operable to receive inputs from the at least one operator device to generate circles which represent virtual boundaries around a physical space in which providers or concierges are designated to receive requests and work within;

wherein the circles are geofence-defined locations;

wherein the geofence-defined locations include three-dimensional (3D) geofences;

wherein the at least one server is operable to change a display on a graphical user interface (GUI) of the at least one administrative team device based on the location of the at least one support team device within the 3D geofences;

wherein the change to the display on the GUI of the at least one administrative team device includes the at least one administrative team device displaying a different list of available personnel on the GUI of the at least one administrative team device;

wherein the at least one server is operable to change a display on a GUI of the at least one provider team device based on the location of the at least one provider team device within the 3D geofences;

wherein the change to the display on the GUI of the at least one provider team device includes a change in a list of materials, brands of materials, a list of rooms, and/or a list of support team members displayed on the GUI of the at least one provider team device;

wherein the time to travel from the location the at least one support team device to the location of the at least one patient device is based on the 3D geofences;

wherein the at least one server is configured to communicate with one or more cameras and wherein, based on machine vision interpretation of video data from the one or more cameras, the at least one server is operable to automatically generate requests;

wherein the video data includes a face of a patient, and wherein the artificial intelligence module is operable to automatically correlate a facial expression of the patient with a mood and generate the requests based on the correlated mood;

wherein the at least one server is operable to determine the location within the facility via the 3D geofences of the at least one support team device, the at least one patient device, the at least one administrative team device, the at least one provider team device, and/or the at least one family member device via a geolocation sensor;

wherein the at least one server is operable to create a destination within the facility based in part on the one or more requests received from the at least one patient device and the 3D geofences;

wherein the at least one server is operable to recommend a fastest path through the facility for the at least one support team device, the at least one administrative device, the at least one provider team device, and/or the at least one family member device to the destination; and wherein the fastest path through the facility to the destination is displayed via a GUI of the at least one support team device, the GUI of the at least one administrative device, a GUI of the at least one provider team device, and/or a GUI of the at least one visitor device.

2. The system of claim 1, where the at least one server is operable to update the circles based on subsequent messages from the at least one operator device.

3. The system of claim 1, wherein the at least one support team device includes a first support team device and a second support team device, wherein the first support team device is part of a group of devices on a first support team, wherein the second support team device is part of a group of devices on a second support team, wherein requests operable to be received by the first support team device are different from requests operable to be received by the second support team device.

4. The system of claim 1, wherein the platform is operable to designate one or more different support teams, each including a subset of the at least one support team device, wherein the platform is operable to determine which of the one or more different support teams to send the one or more requests, and wherein a first of the one or more different support teams includes a concierge team and a second of the one or more different support teams includes a facility employee team.

5. The system of claim 1, wherein the at least one server includes a crowdsourcing system for generating a library based on user input.

6. The system of claim 1, wherein the one or more requests available to be sent from the at least one patient device include unique requests compared to the one or more requests available to be sent from the at least one administrative team device, the at least one provider team device, and the at least one family member device.

7. The system of claim 1, wherein the at least one support team device includes at least one robot.

8. A system for managing requests and workflows to serve patients in a medical facility, comprising:
   at least one server in network communication with at least one support team device and at least one patient device; and
   at least one operator device;
   wherein the at least one server is operable to receive one or more requests from the at least one patient device;
   wherein the at least one server automatically analyzes the one or more requests from the at least one patient device and determines one or more devices of the at least one support team device to send the one or more requests;
   wherein the at least one server is operable to automatically determine a number of requests in a queue of requests for the at least one support team device;
   wherein the at least one server is operable to automatically determine if the number of requests in the queue of requests is unbalanced based in part on the number of requests in the queue and projected length of time associated with the one or more requests from the at least one patient device;
   wherein the projected length of time associated with the one or more requests include an average length of time associated with completing the one or more request based on experience, skill set associated with the at least one support team device, and time to travel from a location of the at least one support team device to a location of the at least one patient device;
   wherein the one or more devices of the at least one support team device to which the one or more requests are sent are determined based on the location of the one or more devices of the at least one support team device relative to the at least one patient device, and a number of recent requests already accepted by the one or more devices of the at least one support team device;

wherein the at least one server is operable to automatically reroute the one or more requests based on the location of the at least one support team device not moving towards the location of the at least one patient device after a period of time;

wherein the at least one server is operable to receive inputs from the at least one operator device to generate circles which represent virtual boundaries around a physical space in which providers or concierges are designated to receive requests and work within;

wherein the circles are geofence-defined locations;

wherein the geofence-defined locations include three-dimensional (3D) geofences;

wherein the at least one server is operable to change a display on a graphical user interface (GUI) of the at least one administrative team device based on the location of the at least one support team device within the 3D geofences;

wherein the change to the display on the GUI of the at least one administrative team device includes the at least one administrative team device displaying a different list of available personnel on the GUI of the at least one administrative team device;

wherein the at least one server is operable to change a display on a GUI of the at least one provider team device based on the location of the at least one provider team device within the 3D geofences;

wherein the change to the display on the GUI of the at least one provider team device includes a change in a list of materials, brands of materials, a list of rooms, and/or a list of support team members displayed on the GUI of the at least one provider team device;

wherein the at least one server is configured to communicate with one or more cameras and wherein, based on machine vision interpretation of video data from the one or more cameras, the at least one server is operable to automatically generate requests;

wherein the video data includes a face of a patient, and wherein an artificial intelligence module is operable to automatically correlate a facial expression of the patient with a mood and generate the requests based on the correlated mood;

wherein the at least one server is operable to generate a 3D internal map of a facility;

wherein the at least one server is operable to determine a location within the facility via the 3D geofences of the at least one support team device, the at least one patient device, at least one administrative team device, at least one provider team device, and/or at least one family member device via a geolocation sensor;

wherein the at least one server is operable to create a destination within the facility based in part on the one or more requests received from the at least one patient device and the 3D geofences;

wherein the at least one server is operable to recommend a fastest path through the facility for the at least one support team device, the at least one administrative device, the at least one provider team device, and/or the at least one family member device to the destination; and wherein the fastest path through the facility to the destination is displayed via a GUI of the at least one support team device, the GUI of the at least one administrative device, a GUI of the at least one provider team device, and/or a GUI of the at least one visitor device.

9. The system of claim 8, wherein the one or more requests are provided via at least one text input, at least one voice input, and/or selection of one or more icons on the GUI of the at least one support team device, the at least one administrative device, the at least one provider team device, and/or the at least one visitor device.

10. The system of claim 8, wherein the at least one server is operable to generate a plurality of support team profiles corresponding to the at least one support team device, and wherein the plurality of support team profiles each include information regarding individual expertise, special skills, working hours, and/or location information for a plurality of support team staff.

11. The system of claim 8, wherein the at least one support team device to which each of the one or more requests are sent is also based on locations of origins of a plurality of other requests received by the at least one server at approximately the same time.

12. The system of claim 8, wherein the at least one server is operable to receive financial incentive quantities associated with each of the one or more requests, and wherein the at least one server automatically add funds to a financial account associated with a support team device that accepts and completes the one or more requests.

13. The system of claim 8, wherein the at least one server is operable to directly communicate the one or more requests to a network-connected patient bed, and wherein the at least one server sends a command to the network-connected patient bed to automatically adjust one or more settings in line with the one or more requests.

14. A system for managing requests and workflows to serve patients in a medical facility, comprising:
at least one server in network communication with at least one support team device and at least one provider team device; and
at least one operator device;
wherein the at least one server is operable to generate a 3D internal map of a facility:
wherein the at least one server is operable to receive one or more requests from the at least one provider team device;
wherein an artificial intelligence module of the at least one server automatically analyzes the one or more requests from the at least one provider team device and determines to which of the at least one support team device to send the one or more requests;
wherein the at least one server is operable to automatically determine a number of requests in a queue of requests for the at least one support team device;
wherein the at least one server is operable to automatically determine if the number of requests in the queue of requests is unbalanced based in part on the number of requests in the queue and projected length of time associated with the one or more requests from the at least one patient device;
wherein the projected length of time associated with the one or more requests include an average length of time associated with completing the one or more request based on experience, skill set associated with the at least one support team device, and time to travel from a location of the at least one support team device to a location of the at least one patient device;
wherein the at least one support team device to which the one or more requests are sent is based on the location of the at least one support team device relative to at least one patient device, and/or based on a number of recent requests already accepted by the at least one support team device;

wherein the at least one server is operable to automatically reroute the one or more requests based on the location of the at least one support team device not moving towards the location of the at least one patient device after a period of time;

wherein the at least one server is operable to receive inputs from the at least one operator device to generate circles which represent virtual boundaries around a physical space in which providers or concierges are designated to receive requests and work within;

wherein the circles are geofence-defined locations;

wherein the geofence-defined locations include three-dimensional (3D) geofences;

wherein the at least one server is operable to change a display on a graphical user interface (GUI) of the at least one administrative team device based on the location of the at least one support team device within the 3D geofences;

wherein the change to the display on the GUI of the at least one administrative team device includes the at least one administrative team device displaying a different list of available personnel on the GUI of the at least one administrative team device;

wherein the at least one server is operable to change a display on a GUI of the at least one provider team device based on the location of the at least one provider team device within the 3D geofences;

wherein the change to the display on the GUI of the at least one provider team device includes a change in a list of materials, brands of materials, a list of rooms, and/or a list of support team members displayed on the GUI of the at least one provider team device;

wherein the time to travel to the location within the facility of the at least one support team device relative to the at least one patient device is based on the 3D geofences;

wherein the at least one server is configured to communicate with one or more cameras and wherein, based on machine vision interpretation of video data from the one or more cameras, the at least one server is operable to automatically generate requests;

wherein the video data includes a face of a patient, and wherein the artificial intelligence module is operable to automatically correlate a facial expression of the patient with a mood and generate the requests based on the correlated mood;

wherein the at least one server is operable to determine a location within the facility via the 3D geofences of the at least one support team device, the at least one patient device, at least one administrative team device, at least one provider team device, and/or at least one family member device via a geolocation sensor;

wherein the at least one server is operable to create a destination within the facility based in part on the one or more requests received from the at least one patient device and the 3D geofences;

wherein the at least one server is operable to recommend a fastest path through the facility for the at least one support team device, the at least one administrative device, the at least one provider team device, and/or the at least one family member device to the destination;

wherein the fastest path through the facility to the destination is displayed via a GUI of the at least one support team device, the GUI of the at least one administrative device, a GUI of the at least one provider team device, and/or a GUI of the at least one visitor device; and wherein the at least one server is operable to automatically determine a wellness check path for the at least one support team device within the facility based in part on the location within the facility of the at least one support team device.

15. The system of claim 14, wherein the one or more requests are provided to at least one voice assistant module, via at least one text input, and/or via selection of one or more icons on the GUI of the at least one support team device, the at least one administrative device, the at least one provider team device, and/or the at least one visitor device.

* * * * *